United States Patent
Castro-Palomino Laria et al.

(10) Patent No.: US 12,540,133 B2
(45) Date of Patent: Feb. 3, 2026

(54) POTENT AND SELECTIVE COMPOUNDS AS SEROTONIN 1B RECEPTOR MODULATORS

(71) Applicants: LEUKOS BIOTECH, S.L., Barcelona (ES); FUNDACIÓ INSTITUT DE RECERCA CONTRA LA LEUCÈMIA JOSEP CARRERAS, Barcelona (ES)

(72) Inventors: Julio Castro-Palomino Laria, Barcelona (ES); Juan Alberto Camacho Gómez, Navarra (ES); Ruth Muñoz Risueño, Barcelona (ES); Lise Clément-Demange, Barcelona (ES)

(73) Assignees: LEUKOS BIOTECH, S.L., Barcelona (ES); FUNDACIÓ INSTITUT DE RECERCA CONTRA LA LEUCÈMIA JOSEP CARRERAS, Barcelona (ES)

( * ) Notice: Subject to any disclaimer, the term of this patent is extended or adjusted under 35 U.S.C. 154(b) by 417 days.

(21) Appl. No.: 18/248,393

(22) PCT Filed: Oct. 7, 2021

(86) PCT No.: PCT/EP2021/077660
§ 371 (c)(1),
(2) Date: Apr. 10, 2023

(87) PCT Pub. No.: WO2022/074103
PCT Pub. Date: Apr. 14, 2022

(65) Prior Publication Data
US 2024/0166639 A1    May 23, 2024

(30) Foreign Application Priority Data
Oct. 8, 2020  (EP) .................................... 20382888

(51) Int. Cl.
| | |
|---|---|
| *C07D 413/10* | (2006.01) |
| *A61K 45/06* | (2006.01) |
| *A61P 35/02* | (2006.01) |
| *C07D 413/12* | (2006.01) |
| *C07D 413/14* | (2006.01) |

(52) U.S. Cl.
CPC ............ *C07D 413/10* (2013.01); *A61K 45/06* (2013.01); *A61P 35/02* (2018.01); *C07D 413/12* (2013.01); *C07D 413/14* (2013.01)

(58) Field of Classification Search
CPC .................................................. C07D 413/10
See application file for complete search history.

(56) References Cited

U.S. PATENT DOCUMENTS

| | | | |
|---|---|---|---|
| 5,801,170 | A | 9/1998 | Gaster et al. |
| 11,446,321 | B2 | 9/2022 | Munoz Risueno et al. |
| 2019/0365792 | A1 | 12/2019 | Munoz Risueno et al. |
| 2023/0122940 | A1 | 4/2023 | Munoz Risueno et al. |

FOREIGN PATENT DOCUMENTS

| | | |
|---|---|---|
| CN | 1261795 A | 8/2008 |
| WO | WO 94/15920 A1 | 7/1994 |
| WO | WO 95/15954 A1 | 6/1995 |
| WO | WO 2007/057742 A2 | 5/2007 |
| WO | WO 2007/077457 A2 | 7/2007 |
| WO | WO 2018/130685 A1 | 7/2018 |

OTHER PUBLICATIONS

McMahon et al. (2000).*
Pinedo et al. (2000).*
Barnes et al, Neuronal 5-HT Receptors and SERT, Tocris Scientific Review Series. https://www.tocris.com/literature/scientific-reviews/5-htreceptors. Retrieved from the internet Apr. 27, 2023. 16 pages.
Dizeyi et al., Expression of serotonin receptors and role of serotonin in human prostate cancer tissue and cell lines. Prostate. May 15, 2004;59(3):328-36.
Etxabe et al., Inhibition of serotonin receptor type 1 in acute myeloid leukemia impairs leukemia stem cell functionality: a promising novel therapeutic target. Leukemia. Nov. 2017;31(11):2288-2302.
Gurbuz et al., A selective serotonin 5-HT1B receptor inhibition suppresses cells proliferation and induces apoptosis in human uterine leiomyoma cells. Eur J Obstet Gynecol Reprod Biol. Nov. 2016;206:114-119.
Hood et al., Serotonin Signaling Through the 5-HT1B Receptor and NADPH Oxidase 1 in Pulmonary Arterial Hypertension. Arterioscler Thromb Vasc Biol. Jul. 2017;37(7):1361-1370.

(Continued)

*Primary Examiner* — Paul V Ward
(74) *Attorney, Agent, or Firm* — Casimir Jones, S.C.; Tristan A. Fuierer

(57) ABSTRACT

The present invention relates to new compounds of formula (I):

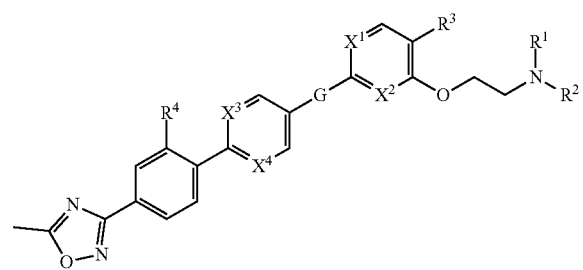

as modulators of serotonin receptor 1B (5-HTR$_{1B}$) also known as 5-hydroxytryptamine receptor 1B (5-HT$_{1B}$). The compounds are of potential utility in the treatment of diseases and conditions mediated by serotonin receptor type 1B (5-HTR$_{1B}$), such as cancer, including blood cancer and solid tumors, respiratory diseases and hepatic disorders.

14 Claims, 2 Drawing Sheets

(56) References Cited

OTHER PUBLICATIONS

Marin et al., 5-HT receptor-associated protein networks: new targets for drug discovery in psychiatric disorders? Curr Drug Targets. Jan. 2012;13(1):28-52.

Nagatomo et al., Functions of 5-HT2A receptor and its antagonists in the cardiovascular system. Pharmacol Ther. Oct. 2004;104(1):59-81.

Niture et al., Serotonin induced hepatic steatosis is associated with modulation of autophagy and notch signaling pathway. Cell Commun Signal. Nov. 8, 2018;16(1):78.

Sarrouilhe et al., Serotonin and cancer: what is the link? Curr Mol Med. 2015;15(1):62-77.

Soll et al., Expression of serotonin receptors in human hepatocellular cancer. Clin Cancer Res. Nov. 1, 2012;18(21):5902-10.

Roberts, et al., "Importance of h5-HT1B receptor selectivity for 5-HT terminal autoreceptor activity: an in vivo microdialysis study in the freely-moving guinea-pig," Neuropharmacology 36(4-5):549-57 (Apr.-May 1997).

Office Action for Chinese Application No. 202180068969.0, dated Jun. 27, 2025 (7 pages).

* cited by examiner

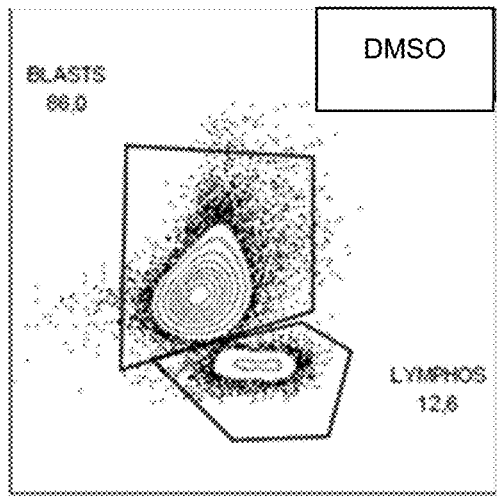
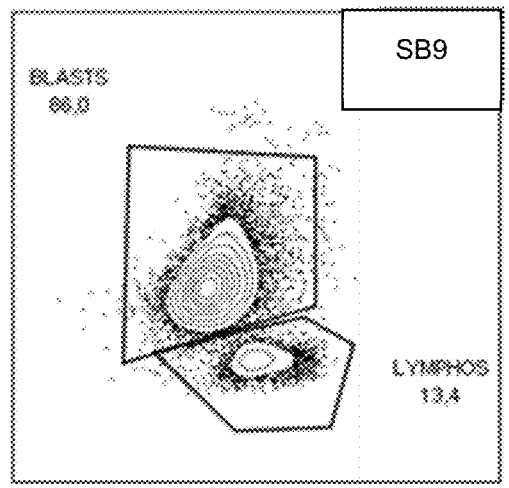
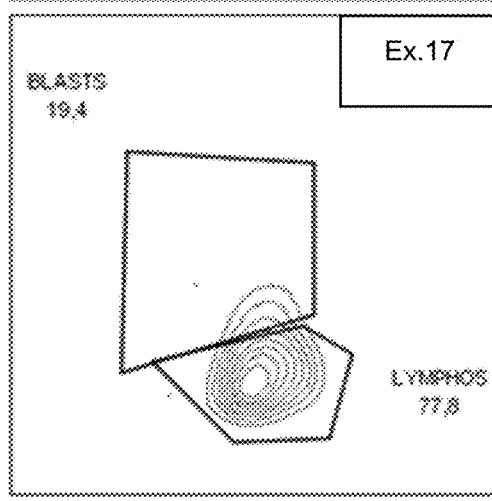
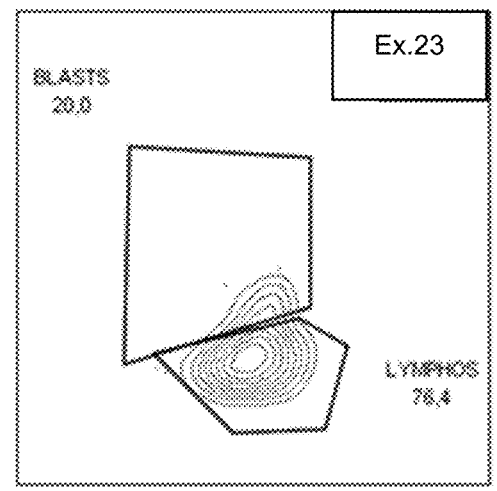
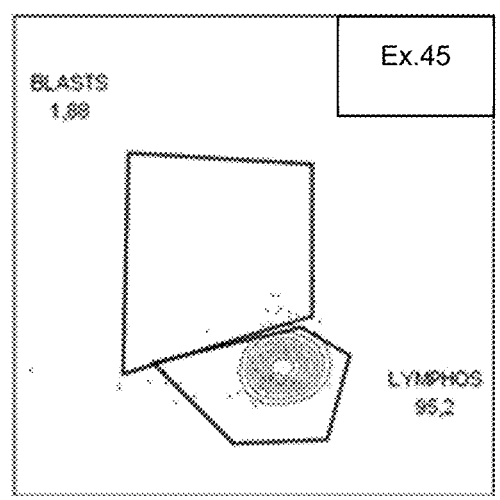
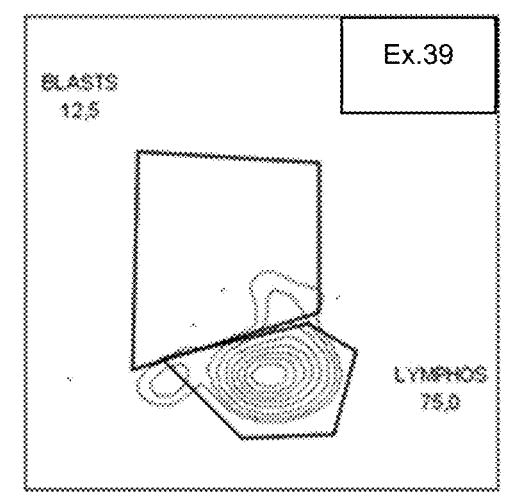

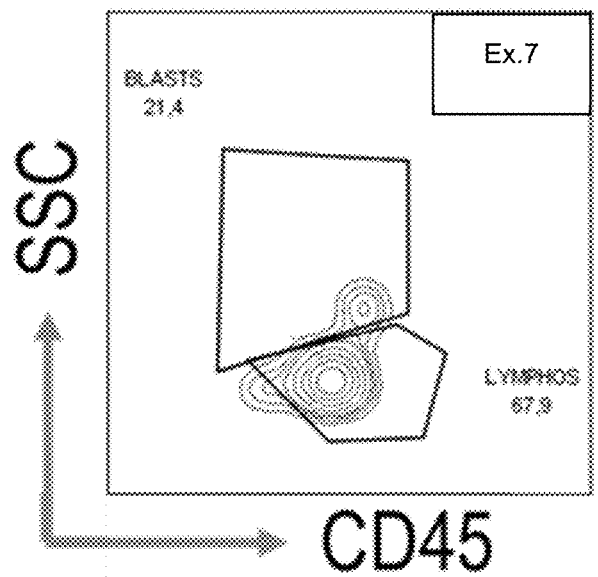
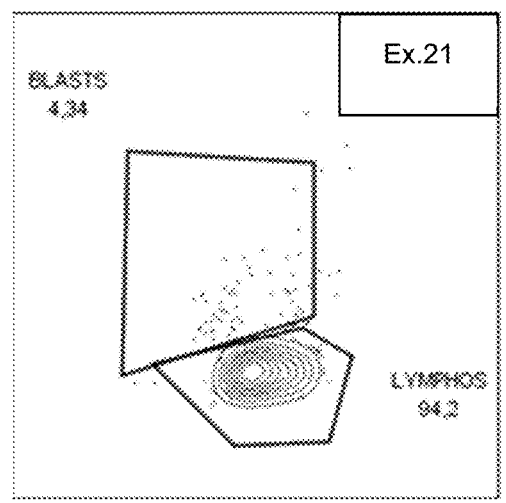
(cont.)

POTENT AND SELECTIVE COMPOUNDS AS SEROTONIN 1B RECEPTOR MODULATORS

CROSS-REFERENCE TO RELATED APPLICATIONS

This application is filed under the provisions of 35 U.S.C. § 371 and claims the priority of International Patent Application No. PCT/EP2021/077660 filed on 7 Oct. 2021 entitled "POTENT AND SELECTIVE COMPOUNDS AS SEROTONIN 1B RECEPTOR MODULATORS" in the name of Julio CASTRO-PALOMINO LARIA, et al., which claims priority to European Patent Application No. 20382888.4, filed on 8 Oct. 2020, both of which are hereby incorporated by reference herein in their entirety.

FIELD OF THE INVENTION

This invention relates to new potent and selective compounds as modulators of serotonin receptor 1B (5-HTR$_{1B}$) also known as 5-hydroxytryptamine receptor 1B (5-HT$_{1B}$). The compounds are of potential utility in the treatment of diseases and conditions mediated by serotonin receptor type 1B (5-HTR$_{1B}$), such as cancer, including blood cancer and solid tumors and respiratory diseases and hepatic disorders. The invention also relates to the use of such compounds as medicaments, to pharmaceutical compositions containing them, and to synthetic routes for their production.

BACKGROUND OF THE INVENTION

Serotonin (5-hydroxytryptamine, 5-HT) is a biogenic monoamine that acts as a neurotransmitter in the central nervous system (CNS), local mediator in the gut and vasoactive agent in the blood. It is synthesized by a two-step pathway from the essential amino-acid tryptophan. Most of the serotonin of the body is located in the periphery (Sarrouilhe D. et al, *Serotonin and Cancer: What is the Link?*, Current Molecular Medicine 2015, 15, 62-77).

Serotonin has been linked to a variety of CNS functions such as brain development, circadian rhythm, thermoregulation, cognition, pain, appetite, sexual drive, fear, mood, violent behavior, motor function and neuroendocrine secretion. Moreover, serotonin is implicated in many CNS and psychiatric disorders: Parkinson's disease, depression, hallucination, schizophrenia, bulimia, anxiety, addiction, chronic stress. Consequently, serotoninergic systems are targets for a large array of psychoactive compounds including antidepressants, antipsychotics and hallucinogens (Marin P. et al, *5-HT Receptor-Associated Protein Networks: New Targets for Drug Discovery in Psychiatric Disorders?*, Current Drug Targets, 2012, 13, 28-52).

Mammals employ 5-HT as a neurotransmitter within the central and peripheral nervous systems, and also as a local hormone in numerous other tissues, including the gastrointestinal tract, the cardiovascular system and immune cells. This multiplicity of function implicates 5-HT in a vast array of physiological and pathological processes. This plethora of roles has consequently encouraged the development of many compounds of therapeutic value, including various antidepressant, antipsychotic and antiemetic drugs (Barnes N. M. et al, *Neuronal 5-HT Receptors and SERT*, Tocris Scientific Review Series, https://www.tocris.com/literature/scientific-reviews/5-ht-receptors).

Part of the ability of 5-HT to mediate a wide range of actions arises from the imposing number of 5-HT receptors, which are divided into 7 families, all but one of which are members of the G-protein coupled receptor (GPCR) superfamily. The exception is the 5-HT$_3$ receptor, a Cysloop ligand-gated ion channel.

Particularly, The 5-HT$_1$ receptor family consists of five separate gene products: 5-HT$_{1A}$, 5-HT$_{1B}$, 5-HT$_{1D}$, 5-HT$_{1E}$, and 5-HT$_{1F}$ receptors. Each is encoded by a single, intronless reading frame and they share considerable sequence homology. All of these receptors couple to Gi/o to inhibit adenylyl cyclase and reduce cAMP levels, but additional signal transduction mechanisms have also been described. Several of these receptors are well known as autoreceptors that regulate the excitability of serotonin neurons and the release of serotonin, but also they are expressed in nonserotonergic neurons, where they can have analogous effects on other neurotransmitters.

In the case of 5-HT$_{1B}$ receptor, it is distributed broadly in the CNS in serotonergic and nonserotonergic neurons. This autoreceptor has been found to reduce serotonin synthesis and release and enhance reuptake via the serotonin transporter. Also, it inhibits the release of a range of different neurotransmitters, depending on the neuron types that express it. Systemic administration of 5-HT$_{1B}$ receptor agonists have several behavioral effects including increased locomotion, changes in brain reward mechanisms, and decreased aggression, whereas selective antagonists may have some procognitive potential. The expression of this receptor in diverse and potentially competing sets of neurons may impact its utility as a clinical target, although several 5-HT$_{1B/D}$ receptor agonists are effective as antimigraine treatments, 5-HT$_{1B}$ receptor knockout mice have been tested extensively and have a distinct phenotype characterized by increased aggression and, in most cases, predisposition for addiction-like behaviors (Barnes N. M. et al, *Neuronal 5-HT Receptors and SERT*, Tocris Scientific Review Series, https://www.tocris.com/literature/scientific-reviews/5-ht-receptors).

On the other hand, there was a study focused on the role of 5-HT$_{1B}$ receptor in uterine leiomyomas (UL) which cause a variety of complaints, such as abnormal uterine bleeding and fertility problems. The study demonstrated the relationship between the expression of 5-HT$_{1B}$ receptor and cell proliferation/death in UL cases. Overall, 5-HT$_{1B}$ receptor is involved in proliferation and survival of UL cells. The efficacy of 5-HT$_{1B}$ receptor antagonists needs to be tested in vivo in preclinical studies to better understand its role in tumor growth and potential therapeutic target for the development of medical therapies in the management of UL. (Gurbuz, N et al, *A selective Serotonin 5-HT1B receptor inhibition suppresses cells proliferation and clonoceoicty, and induces of apoptosis in human uterine leiomyoma*, Eur J Obstet Gynecol Reprod Biol. 2016 Nov: 206:114-119).

Others studies have indicated that serotonin has been implicated in the pathogenesis of pulmonary arterial hypertension (PAH) and has been recognized as a potent naturally occurring pulmonary vasoconstrictor and smooth muscle cell mitogen. Serotonin promotes pulmonary artery (PA) remodeling and proliferation of human PA smooth muscle cells (hPASMCs) via the 5-HT$_{1B}$ receptor and the serotonin transporter (SERT). Serotonin can induce cellular Sm-related kinase-regulated Nox1-induced ROS and Nrf-2 dysregulation, contributing to increased post-translational oxidative modification of proteins and activation of redox-sensitive signaling pathways in hPASMCs, associated with mitogenic responses. 5-HT$_{1B}$ receptors contribute to experimental pulmonary hypertension by inducing lung ROS production. This results suggest that 5-HT$_{1B}$ receptor-dependent cellular Src-related kinase-Nox1-pathways contribute to vascular remodeling in PAH. (Hood. K Y. et al. *Serotonin Signaling Through the 5-HT1B Receptor and NADPH Oxidase 1 in Pulmonary Arterial Hypertension*, Arterioscler Thromb Vasc Biol. 2017;37:1361-1370).

Additionally, recent studies demonstrate serotonin exhibits a growth stimulatory effect on several types of carcinoma, carcinoids and other tumour cells. In contrast, few data are available on serotonin involvement in cancer cell migration and metastatic processes. Serum serotonin level was found to be suitable for prognosis evaluation of urothelial carcinoma in the urinary bladder, adenocarcinoma of the prostate and renal cell carcinoma. (Sarrouilhe D. et al, *Serotonin and Cancer: What is the Link?*, Current Molecular Medicine 2015, 15, 62-77).

Others studies have demonstrated that serotonin receptors 1B and 2B are expressed in patients with hepatocellular cancer. Both receptors were associated with an increased proliferation index, and receptor 1B correlated with the size of the tumor. Serotonin antagonists of receptors 1B and 2B consistently decreased viability and proliferation in Huh7 and HepG2 cell lines. (Soll C. et al, *Expression of Serotonin Receptors in Human Hepatocellular Cancer*, Clin Cancer Res; 18(21) Nov. 1, 2012).

Additionally, it has been demonstrated that 5-HTR$_{1B}$ selective antagonist decreased serotonin-mediated cell steatosis in HepG2 cells. Also, it was demonstrated that serotonin positively modulates cell proliferation/survival and cell steatosis in liver cancer cells by inducing autophagy and activating Notch signaling. (Niture S. et al, *Serotonin induced hepatic steatosis is associated with modulation of autophagy and notch signaling pathway*, Cell Communication and Signaling (2018) 16:78).

5-HT has been involved in autocrine loops of growth factors contributing to cell proliferation in aggressive tumors, but several studies have shown that serotonin can also exert an antineoplastic effect via inhibition of angiogenesis. An in silica screening was performed to search for small molecules that induce terminal differentiation and apomorphine, an HTR1/2 antagonist, was identified. A study was conducted in immunodeficient mice, which were transplanted with human acute myeloid leukemia (AML) cells and left for 7 days for leukemia to be established. Afterwards, mice were treated every 2 days with apomorphine (5 mg/kg weight) or methiothepin (0.1 mg/kg weight) for 14 days. Both HTR1 antagonists produced a significant reduction in AML burden in bone marrow (BM) as compared to vehicle treated mice. Similarly, the clonogenic capacity of engrafted AML cells was impaired in both treated mice, stressing the effect of HTR inhibition in the selfrenewal capacity of AML cells. The results indicate that AML cells express HTR$_{1A}$ and HTR$_{1B}$ and their inhibition induces terminal differentiation and cell death. Interestingly, leukemia stem cells (LSCs) are more sensitive to HTR1 antagonists than more mature AML blasts. Therefore, HTR$_{1A}$ and HTR$_{1B}$ may constitute an interesting target for AML therapy. This study demonstrated the implication of HTR1 in cancer stem cells, and results highlight the biological role of HTR1s on leukemia maintenance, suggesting that HTR1 signaling is involved in survival of AML blasts and in LSC functionality. (Etxabe, A. et al, *Inhibition of serotonin receptor type 1 in acute myeloid leukemia impairs leukemia stem-cell functionality: A promising novel therapeutic target*, Leukemia, 2017, 1-15).

Other study has identified that serotonin is a well-known mitogen which mediates a wide variety of physiological effects via multiple receptors, of which receptor subtype 1B (5-HT$_{1B}$) has been identified in prostate cancer (PC) cell lines. Recently, 5-HT has been found to show growth promoting activity and to be functionally related to oncogenes. (Dizeyi N. et al, *Expression of Serotonin Receptors and Role of Serotoninin Human Prostate Cancer Tissue and Cell Lines*, The Prostate, 59: 328-336, 2004).

On the other hand, 5-HT$_{2A}$ receptor subtypes have been identified in both the central nervous system (CNS) and the periphery. 5-HT$_{2A}$ receptors have been found in many parts of the CNS including the cerebral cortex, basal ganglia, hippocampus, thalamus, cerebellum, and hypothalamus. In the periphery, 5-HT$_{2A}$ receptors are located in platelets, vascular smooth muscle, and uterine smooth muscle. 5-HT$_{2A}$ receptor has been implicated in various processes such as vascular smooth muscle contraction, extravascular smooth muscle contraction (including uterine contraction) and platelet aggregation (Nagatomo T et al, *Functions of 5-HT$_{2A}$ receptor and its antagonists in the cardiovascular system*, Pharmacology & Therapeutics 104 (2004) 59-81).

Related to patent documents, several patent applications disclosing compounds as modulators, agonists or antagonists, of 5-HT$_{1B}$ receptor, are addressed to CNS disorders such as migraine, depression, anxiety, schizophrenia, stress and pain, among others. See, for example, WO 2007/057742 A2.

Patent application WO 2018/130685 A1 discloses a combination therapy for treating cancer, particularly acute myeloid leukemia (AML), comprising an antineoplastic agent and a type 1 serotonin receptor (HTR1/5-HT$_1$) modulator, e.g. a HTR1 antagonist, specifically is described apomorphine, methiothepin and SB-224289 (SB9) as serotonin receptor antagonists. All of them cross readily the blood brain barrier, acting to on central nervous system (CNS), and in the case of apornorphine and methiothepin are non-selective 5-HT$_{1B}$ receptor modulators.

Patent application WO 95/15954 A1 discloses biphenylylamides compounds as 5-HT$_{1D}$ antagonists to be used in the treatment of various CNS, endocrine and gastrointestinal disorders.

Therefore, there is a great need for new treatment options related to 5-HT$_1$ receptor, in particular 5-HT$_{1B}$ receptor, that can be useful for the treatment of peripheral diseases related to said receptor. Such diseases are selected from cancer, including blood cancer and solid tumors, and respiratory diseases. In order to minimize side effects on CNS is desirable to develop new compounds with low penetration of the brain barrier and good selectivity over another 5-HT receptors, in particular good selectivity over the 5-HT$_{2A}$ receptor.

The problem to be solved by the present invention is to provide novel, more selective and safe 5-HT$_{1B}$ receptor modulators with improve polarity and less brain penetration compared to the prior art compounds.

SUMMARY OF THE INVENTION

In one of its aspects (aspect 1), the present invention refers to new compounds of formula (I):

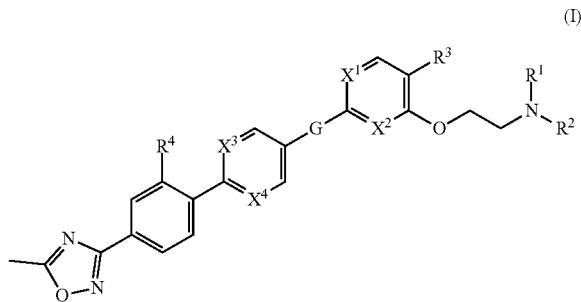

wherein:
G represents a group selected from:
  a) —C(O)NH,
  b) —NHC(O),
$X^1$, $X^2$, $X^3$ and $X^4$ represent a N atom or C—$R^5$ group,
$R^1$ and $R^2$ are independently selected from the group consisting of:
  a) hydrogen atom,
  b) linear or branched $C_1$-$C_6$ alkyl optionally substituted by 1, 2 or 3 substituents selected from -N($R^6$)$R^7$ and —O$R^6$, halogen atom and $C_3$-$C_6$ cycloalkyl,
  c) $C_3$-$C_6$ cycloalkyl,
or $R^1$ and $R^2$ form together with the nitrogen atom to which they are attached a four to six-membered heterocyclic group, comprising additionally a second heteroatom selected from N and O;
$R^3$ represents a group selected from:
  a) cyano group, and
  b) halogen atom,
$R^4$ represents a group selected from:
  a) halogen atom,
  b) $C_3$-$C_4$ cycloalkyl group,
  c) $C_1$-$C_3$ alkoxy group,
  d) $C_1$-$C_3$ haloalkyl group,
  e) cyano group,
$R^5$ represents a group selected from:
  a) hydrogen atom,
  b) $C_1$-$C_3$ alkyl,
  c) halogen atom,
$R^6$ and $R^7$ represent independently a group selected from:
  a) $C_1$-$C_3$ alkyl,
  b) hydrogen atom,
with the proviso that at least one of the $X^1$, $X^2$, $X^3$ and $X^4$ represent a N atom, and pharmaceutically acceptable salts thereof.

Other aspects of the present invention are followed described.

In a second aspect, the present invention refers to processes for the preparation of the compounds defined in the first aspect.

In a third aspect, the present invention refers to pharmaceutical compositions comprising an effective amount of a compound defined in the first aspect.

In a fourth aspect, the present invention refers to a combination product comprising a compound as defined in the first aspect and another therapeutic agent selected from agents for treating cancer, respiratory diseases and hepatic disorders. Cancer is selected from blood cancer such as acute myeloid leukemia (AML), and solid tumors, respiratory diseases may be, among others, pulmonary arterial hypertension, and hepatic disorders may be, among others nonalcoholic steatohepatitis.

In a fifth aspect, the present invention relates to the use of the compounds of the first aspect for the manufacture of a medicament, in particular for treating diseases that can be ameliorated by antagonism of serotonin receptor type 1 (HTR1), in particular by antagonism of 5-$HTR_{1B}$; wherein the disease or pathological condition susceptible of improvement by antagonism of serotonin receptor 5-$HTR_{1B}$ may be selected from cancer, respiratory diseases and hepatic disorders. Cancer is selected from blood cancer such as acute myeloid leukemia (AML), and solid tumors, respiratory diseases may be, among others, pulmonary arterial hypertension, and hepatic disorders may be, among others nonalcoholic steatohepatitis.

In a sixth aspect, the present invention relates to methods for the treatment of diseases that can be ameliorated by antagonism of serotonin receptor 5-$HTR_{1B}$, by administration of the compounds defined in the first aspect or the pharmaceutical compositions of the third aspect or the combination product of the fourth aspect to a subject in need of said treatment.

In a seventh aspect, the present invention relates to a compound as defined in the first aspect, a pharmaceutical composition as defined in the third aspect or a combination product as defined in the fourth aspect for use as a medicament.

In an eight aspect the present invention relates to a compound as defined in the first aspect, a pharmaceutical composition as defined in the third aspect or a combination product as defined in the fourth aspect for use in the treatment of a disease or pathological condition selected from the group consisting of cancer, respiratory diseases and hepatic disorders. Cancer is selected from blood cancer such as acute myeloid leukemia (AML), and solid tumors, respiratory diseases may be, among others, pulmonary arterial hypertension, and hepatic disorders may be, among others nonalcoholic steatohepatitis.

BRIEF DESCRIPTION OF THE DRAWINGS

FIG. 1 illustrates the flow cytometry histograms representing selectivity of several compounds against leukemic cells. Legend: Blast (leukemic cells), Lymphos (healthy cells). Number: % lives cells. SSC: side scatter, CD45: receptor-linked protein tyrosine phosphatase that is expressed on all leucocytes.

DETAILED DESCRIPTION OF INVENTION

As it is said before, the compounds of the invention are useful in the treatment or prevention of diseases known to be susceptible to amelioration by treating with modulators/antagonists of serotonin receptor type 1 (HTR1), in particular modulators/antagonists of the 5-$HTR_{1B}$ receptor. Such diseases are, for example, cancer, respiratory diseases and hepatic disorders. Cancer is selected from blood cancer such as acute myeloid leukemia (AML), and solid tumors, respiratory diseases may be, among others, pulmonary arterial hypertension, and hepatic disorders may be, among others nonalcoholic steatohepatitis.

Accordingly, the derivatives of the present invention and pharmaceutically acceptable salts thereof, and pharmaceutical compositions comprising such compounds and/or salts thereof, may be used in a method of treatment of pathological conditions or disease of human body which comprises administering to a subject in need of said treatment, an effective amount of a compound of the invention or a pharmaceutically acceptable salt thereof.

As used herein, the term halogen atom is used to designate an atom selected from the group consisting of chlorine, fluorine, bromine or iodine atom, preferably bromine, fluorine or chlorine atom.

As used herein the term alkyl is used to designate linear or branched hydrocarbon radicals ($C_nH_{2n+1}$). Examples include methyl, ethyl, n-propyl, i-propyl, n-butyl, sec-butyl, tert-butyl, n-pentyl, 1-methyl-butyl, 2-methyl-butyl, isopentyl, 1-ethylpropyl, 1,1-dimethylpropyl, 1,2-dimethylpropyi, n-hexyl, 1-ethylbutyl, 2-ethylbutyl, 1,1-dimethylbutyl, 1,2-dirnethylbutyl, 1,3-dirriethylbutyl, 2,2-dimethylbutyl, 2,3-dimethylbutyl, 2-methylpentyl and 3-methylpentyl. The term $C_n$-$C_m$ alkyl is therefore to be understood as designating an alkyl comprising n to m carbon atoms.

As used herein, the term $C_n$-$C_m$ alkoxy is used to designate radicals which contain a linear or branched $C_n$-$C_m$ alkyl group linked to an oxygen atom. Preferred alkoxy radicals include methoxy, ethoxy, n-propoxy, i-propoxy, n-butoxy, sec-butoxy and tert-butoxy.

As used herein, the term $C_n$-$C_m$ cycloalkyl is used to designate hydrocarbon cyclic groups ($C_nH_{2n-1}$) having n to m carbon atoms. Such cycloalkyl groups include, by way of example, single ring structures such as cyclopropyl, cyclobutyl, cyclopentyl and cyclohexyl.

As used herein, the term haloalkyl is used to designate alkyl groups wherein one or more of their hydrogen atoms have been replace by a halogen atom. Preferred haloalky radicals include chloromethyl, dichloromethyl, trichloromethyl, fluoromethyl, difluoromethyl and trifluoromethyl.

As used herein, the term four to six-membered heterocyclyl is used to designate saturated rings having four to six-members comprising carbon and a second heteroatom selected from N and O as part of the ring. The heterocyclyl groups include, for example, azetidinyl, pyrrolidinyl, piperidinyl, morpholinyl and piperazinyl.

As used herein, some of the atoms, radicals, chains or cycles present in the general structures of the invention are "optionally substituted". This means that these atoms, radicals, chains or cycles can be either unsubstituted or substituted in any position by one or more, for example 1, 2 or 3 substituents, whereby the hydrogen atoms bound to the unsubstituted atoms, radicals, chains or cycles are replaced by chemically acceptable atoms, radicals, chains or cycles. When two or more substituents are present, each substituent may be the same or different.

As used herein, the term pharmaceutically acceptable salt is used to designate salts with a pharmaceutically acceptable acid or base. Pharmaceutically acceptable acids include both inorganic acids, for example hydrochloric, sulphuric, phosphoric, diphosphoric, hydrobromic, hydroiodic and nitric acid and organic acids, for example citric, fumaric, maleic, malic, mandelic, ascorbic, oxalic, succinic, tartaric, benzoic, acetic, methanesulphonic, ethanesulphonic, benzenesulphonic or p-toluenesulphonic acid. Pharmaceutically acceptable bases include alkali metal (e.g. sodium or potassium), alkali earth metal (e.g. calcium or magnesium) hydroxides, and organic bases, for example alkyl amines, phenylalkyl amines and heterocyclic amines.

Other preferred salts according to the invention are quaternary ammonium compounds wherein an equivalent of an anion ($X^{-n}$), wherein "–n" indicates the negative charge of the anion and is typically –1, –2 or –3, is associated with the positive charge of the N atom. $X^{-n}$ may be an anion of various mineral acids such as, for example, chloride, bromide, iodide, sulphate, nitrate, phosphate, or an anion of an organic acid such as, for example, acetate, maleate, fumarate, citrate, oxalate, succinate, tartrate, malate, mandelate, trifluoroacetate, methanesulphonate and ptoluenesulphonate. $X^{-n}$ is preferably an anion selected from chloride, bromide, iodide, sulphate, nitrate, acetate, maleate, oxalate, succinate or trifluoroacetate. More preferably, $X^-$ is chloride, bromide, trifluoroacetate or methanesulphonate.

According to one embodiment of the present invention in the compounds of formula (I), $R^1$ and $R^2$ are linear or branched $C_1$-$C_3$ alkyl. In a preferred embodiment $R^1$ and $R^2$ are methyl groups.

According to one embodiment of the present invention in the compounds of formula (I), G represents —C(O)NH— wherein the carbonyl group is linked to the cycle comprising $X^3$ and $X^4$ and the amine group is linked to the cycle comprising $X^1$ and $X^2$.

According to one embodiment of the present invention in the compounds of formula (I), $R^3$ is cyano group.

According to one embodiment of the present invention in the compounds of formula (I), $R^4$ is selected from halogen atom and $C_3$-$C_4$ cycloalkyl group. In a preferred embodiment, $R^4$ is selected from chlorine atom, fluorine atom and cyclopropyl group.

According to one embodiment of the present invention in the compounds of formula (I), the core:

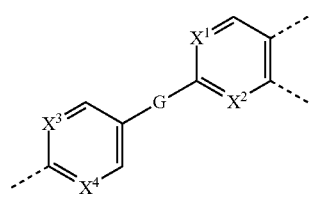

is selected from:

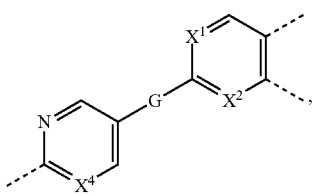

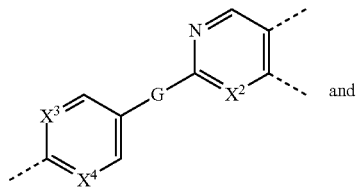

and

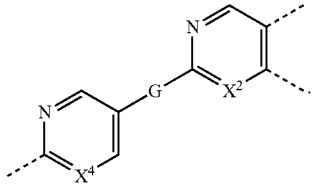

In a preferred embodiment, the core:

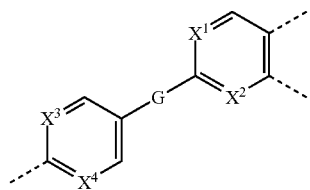

is:

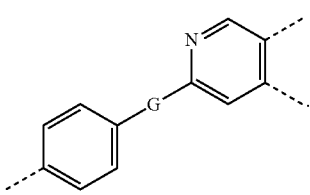

In another preferred embodiment, the core:

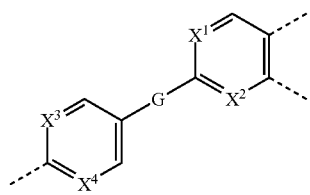

is:

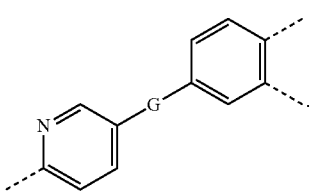

In another preferred embodiment, the core:

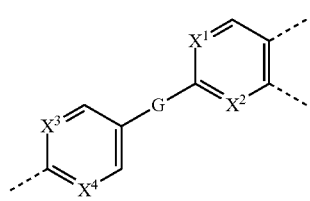

is:

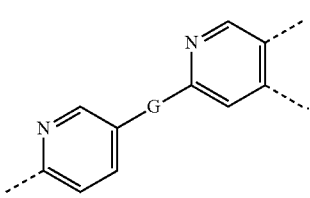

According to one embodiment of the present invention the compounds of formula (I) have one of the following formula (Ia), (Ib) and (Ic)

(Ia)

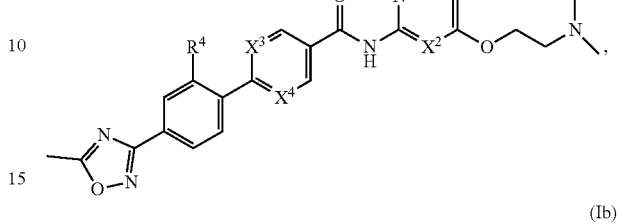

(Ib)

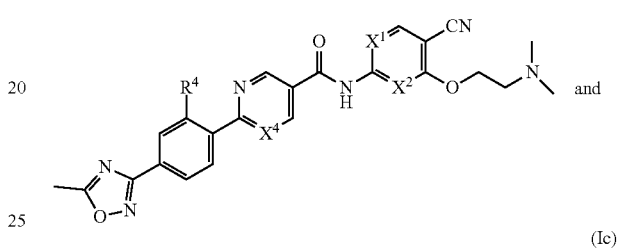

and

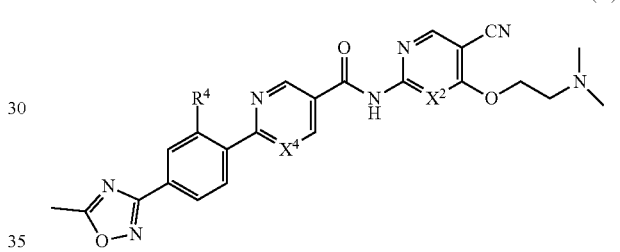

(Ic)

wherein $R^4$ represents a group selected from halogen atom and cyclopropyl group.

Individual compounds of the present invention include:
N-(4-bromo-3-(2-(dimethylamino)ethoxy)phenyl)-6-(2-cyclopropyl-4-(5-methyl-1,2,4-oxadiazol-3-yl)phenyl) nicotinamide
N-(4-bromo-3-(2-(dimethylamino)ethoxy)phenyl)-6-(2-fluoro-4-(5-methyl-1,2,4-oxadiazol-3-yl)phenyl)nicotinamide
N-(4-bromo-3-(2-(dimethylamino)ethoxy)phenyl)-6-(2-chloro-4-(5-methyl-1,2,4-oxadiazol-3-yl)phenyl)nicotinamide
N-(4-bromo-3-(2-(dimethylamino)ethoxy)phenyl)-6-(4-(5- ethyl-1,2,4-oxadiazol-3-yl)-2-(trifluoromethyl)phenyl)nicotinamide
N-(4-bromo-3-(2-(dimethylamino)ethoxy)phenyl)-6-(2-methoxy-4-(5-methyl-1,2,4-oxadiazol-3-yl)phenyl) nicotinamide
N-(4-bromo-3-(2-(dimethylamino)ethoxy)phenyl)-6-(2-cyano-4-(5-methyl-1,2,4-oxadiazol-3-yl)phenyl)nicotinamide
N-(4-cyano-3-(2-(dimethylamino)ethoxy)phenyl)-6-(2-cyclopropyl-4-(5-methyl-1,2,4-oxathazol-3-yl)phenyl) nicotinamide
N-(4-cyano-3-(2-(dimethylamino)ethoxy)phenyl)-6-(2-fluoro-4-(5-methyl-1,2,4-oxadiazol-3-yl)phenyl)nicotinamide
6-(2-chloro-4-(5-methyl-1,2,4-oxadiazol-3-yl)phenyl)-N-(4-cyano-3-(2-(dimethylamino)ethoxy)phenyl)nicotinamide N-(4-cyano-3-(2-(dimethylamino)ethoxy)phenyl)-6-(4-(5-methyl-1,2,4-oxadiazol-3-yl)-2-(trifluoromethyl)phenyl)nicotinamide N-(4-cyano-3-(2-(dimethylamino)ethoxy)phenyl)-6-(2-methoxy-4-(5-methyl-1,2,4-oxadiazol-3-yl)phenyl)nicotinamide N-(4-cyano-3-(2-(dimethylamino)ethoxy)phenyl)-6-(2-cyano-4-(5-methyl-1,2,4-oxadiazol-3-yl)phenyl)nicotinamide N-(4-bromo-3-(2-(dimethylamino)ethoxy)phenyl)-2-(2-cyclopropyl-4-(5-methyl-1,2,4-oxadiazol-3-yl)phenyl)pyrimidine-5-carboxamide N-(4-cyano-3-(2-(dimethylamino)ethoxy)phenyl)-2-(2-cyclopropyl-4-(5-methyl-1,2,4-oxadiazol-3-yl)phenyl)pyrimidine-5-carboxamide N-(5-bromo-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide N-(5-bromo-4-(2-(dimethylamino)ethoxy)pyridin-2-yl)-2'-fluoro-4'-(5-methyl-1,2,4-oxadiazol-3-yl)-[1,1'-biphenyl]-4-carboxamide N-(5-bromo-4-(2-(dimethylamino)ethoxy)pyridin-2-yl)-2'-chloro-4'-(5-methyl-1,2,4-oxadiazol-3-yl)-[1,1'-biphenyl]-4-carboxamide N-(5-bromo-4-(2-(dimethylamino)ethoxy)pyridin-2-yl)-4'-(5-methyl-1,2,4-oxadiazol-3-yl)-2'-(trifluoromethyl)-[1,1'-biphenyl]-4-carboxamide N-(5-bromo-4-(2-(dimethylamino)ethoxy)pyridin-2-yl)-2'-methoxy-4'-(5-methyl-1,2,4-oxadiazol-3-yl)-[1,1'-biphenyl]-4-carboxamide N-(5-bromo-4-(2-(dimethylamino)ethoxy)pyridin-2-yl)-2'-cyano-4'-(5-methyl-1,2,4-oxadiazol-3-yl)-[1,1'-biphenyl]-4-carboxamide N-(5-cyano-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide N-(5-cyano-4-(2-(dimethylamino)ethoxy)pyridin-2-yl)-2'-fluoro-4'-(5-methyl-1,2,4-oxadiazol-3-yl)-[1,1'-biphenyl]-4-carboxamide 2'-chloro-N-(5-cyano-4-(2-(dimethylamino)ethoxy)pyridin-2-yl)-4'-(5-methyl-1,2,4-oxadiazol-3-yl)-[1,1'-biphenyl]-4-carboxamide N-(5-cyano-4-(2-(dimethylamino)ethoxy)pyridin-2-yl)-4'-(5-methyl-1,2,4-oxadiazol-3-yl)-2'-(trifluoromethyl)-[1,1'-biphenyl]-4-carboxamide N-(5-cyano-4-(2-(dimethylamino)ethoxy)pyridin-2-yl)-2'-methoxy-4'-(5-methyl-1,2,4-oxadiazol-3-yl)-[1,1'-biphenyl]-4-carboxamide 2'-cyano-N-(5-cyano-4-(2-(dimethylamino)ethoxy)pyridin-2-yl)-4'-(5-methyl-1,2,4-oxadiazol-3-yl)-[1,1'-biphenyl]-4-carboxamide N-(5-bromo-6-(2-(dimethylamino)ethoxy)pyridin-2-yl)-2'-cyclopropyl-4'-(5-methyl-1,2,4-oxadiazol-3-yl)-[1,1'-biphenyl]-4-carboxamide N-(5-bromo-6-(2-(dimethylamino)ethoxy)pyridin-2-yl)-2'-fluoro-4'-(5-methyl-1,2,4-oxadiazol-3-yl)-[1,1'-biphenyl]-4-carboxamide N-(5-bromo-6-(2-(dimethylamino)ethoxy)pyridin-2-yl)-2'-chloro-4'-(5-methyl-1,2,4-oxadiazol-3-yl)-[1,1'-biphenyl]-4-carboxamide N-(5-cyano-6-(2-(dimethylamino)ethoxy)pyridin-2-yl)-2'-cyclopropyl-4'-(5-methyl-1,2,4-oxadiazol-3-yl)-[1,1'-biphenyl]-4-carboxamide N-(5-cyano-6-(2-(6methylamno)ethoxy)pyridin-2-yl)-2'-fluoro-4'-(5-methyl-1,2,4-oxadiazol-3-yl)-[1,1'-biphenyl]-4-carboxamide 2'-chloro-N-(5-cyano-6-(2-(dimethylamino)ethoxy)pyridin-2-yl)-4'-(5-methyl-1,2,4-oxadiazol-3-yl)-[1,1'-biphenyl]-4-carboxamide N-(5-bromo-4-(2-(dimethylamino)ethoxy)pyrimidin-2-yl)-2'-cyclopropyl-4'-(5-methyl-1,2,4-oxadiazol-3-yl)-[1,1'-biphenyl]-4-carboxamide N-(5-bromo-4-(2-(dimethylamino)ethoxy)pyrimidin-2-yl)-2'-fluoro-4'-(5-methyl-1,2,4-oxadiazol-3-yl)-[1,1'-biphenyl]-4-carboxamide N-(5-bromo-4-(2-(dimethylamino)ethoxy)pyrimidin-2-yl)-2'-chloro-4'-(5-methyl-1,2,4-oxadiazol-3-yl)-[1,1'-biphenyl]-4-carboxamide N-(5-cyano-4-(2-(dimethylamino)ethoxy)pyrimidin-2-yl)-2'-cyclopropyl-4'-(5-methyl-1,2,4-oxadiazol-3-yl)-[1,1'-biphenyl]-4-carboxamide N-(5-cyano-4-(2-(dimethylamno)ethoxy)pyrimidin-2-yl)-2'-fluoro-4'-(5-methyl-1,2,4-oxadiazol-3-yl)-[1,1'-biphenyl]-4-carboxamide 2'-chloro-N-(5-cyano-4-(2-(dimethylamino)pyrimidin-2-yl)-4'-(5-methyl-1,2,4-oxadiazol-3-yl)-[1,1'-biphenyl]-4-carboxamide N-(5-bromo-4-(2-(dimethylamino)ethoxy)pyridin-2-yl)-6-(2-cyclopropyl-4-(5-methyl-1,2,4-oxadiazol-3-yl)phenyl)nicotinamide N-(5-bromo-4-(2-(dimethylamino)ethoxy)pyridin-2-yl)-6-(2-fluoro-4-(5-methyl-1,2,4-oxadiazol-3-yl)phenyl)nicotinamide N-(5-bromo-4-(2-(dimethylamino)ethoxy)pyridin-2-yl)-6-(2-chloro-4-(5-methyl-1,2,4-oxadiazol-3-yl)phenyl)nicotinamide N-(5-bromo-4-(2-(dimethylamino)ethoxy)pyridin-2-yl)-6-(4-(5-methyl-1,2,4-oxadiazol-3-yl)-2-(trifluoromethyl)phenyl)nicotinamide N-(5-bromo-4-(2-(dimethylamino)ethoxy)pyridin-2-yl)-6-(2-methoxy-4-(5-methyl-1,2,4-oxadiazol-3-yl)phenyl)nicotinamide N-(5-bromo-4-(2-(dimethylamino)ethoxy)pyridin-2-yl)-6-(2-cyano-4-(5-methyl-1,2,4-oxadiazol-3-yl)phenyl)nicotinamide N-(5-cyano-4-(2-(dimethylamino)ethoxy)pyridin-2-yl)-6-(2-cyclopropyl-4-(5-methyl-1,2,4-oxadiazol-3-yl)phenyl)nicotinamide N-(5-cyano-4-(2-(dimethylamino)ethoxy)pyridin-2-yl)-6-(2-fluoro-4-(5-methyl-1,2,4-oxadiazol-3-yl)phenyl)nicotinamide 6-(2-chloro-4-(5-methyl-1,2,4-oxadiazol-3-yl)phenyl)-N-(5-cyano-4-(2 (dimethylamino)ethoxy)pyridin-2-yl)nicotinamide N-(5-cyano-4-(2-(dimethylamino)ethoxy)pyridin-2-yl)-6-(4-(5-methyl-1,2,4-oxadiazol-3-yl)-2-(trifluorornethyl)phenyl)nicotinamide N-(5-cyano-4-(2-(dimethylamino)ethoxy)pyridin-2-yl)-6-(2-methoxy-4-(5-methyl-1,2,4-oxadiazol-3-yl)phenyl)nicotinamide N-(5-cyano-4-(2-(dimethylamino)ethoxy)pyridin-2-yl)-6-(2-cyano-4-(5-methyl-1,2,4-oxadiazol3-yl)phenyl)nicotinamide N-(5-bromo-6-(2-(dimethylamino)ethoxy)pyridin-2-yl)-6-(2-cyclopropyl-4-(5-methyl-1,2,4-oxadiazol-3-yl)phenyl)nicotinamide N-(5-bromo-6-(2-(dimethylamino)ethoxy)pyridin-2-yl)-6-(2-fluoro-4-(5-methyl-1,2,4-oxadiazol-3-yl)phenyl)nicotinamide N-(5-bromo-6-(2-(dimethylamino)ethoxy)pyridin-2-yl)-6-(2-chloro-4-(5-methyl-1,2,4-oxadiazol-3-yl)phenyl)nicotinamide N-(5-cyano-6-(2-(dimethylamino)ethoxy)pyridin-2-yl)-6-(2-cyclopropyl-4-(5-methyl-1,2,4-oxadiazol-3-yl)phenyl)nicotinamide N-(5-cyano-6-(2-(dimethylamino)ethoxy)pyridin-2-yl)-6-(2-fluoro-4-(5-methyl-1,2,4-oxadiazol-3-yl)phenyl)nicotinamide 6-(2-chloro-4-(5-methyl-1,2,4-oxadiazol-3-yl)phenyl)-N-(5-cyano-6-(2-(dimethylamino)ethoxy)pyridin-2-yl)nicotinamide N-(5-bromo-4-(2-(dimethylamino)ethoxy)pyrimidin-2-yl)-6-(2-cyclopropyl-4-(5-methyl-1,2,4-oxadiazol-3-yl)phenyl)nicotinamide N-(5-bromo-4-(2-(dimethylamino)ethoxy)pyrimidin-2-yl)-6-(2-fluoro-4-(5-methyl-1,2,4-oxadiazol3-yl)phenyl)nicotinamide N-(5-bromo-4-(2-(dimethylamino)ethoxy)pyrimidin-2-yl)-6-(2-chloro-4-(5-methyl-1,2,4-oxadiazol-3-yl)phenyl)nicotinamide N-(5-cyano-4-(2-(dimethylamino)ethoxy)pyrimidin-2-yl)-6-(2-cyclopropyl-4-(5-methyl- 1,2,4-oxadiazol-3-yl)phenyl)nicotinamide N-(5-cyano-4-(2-(dimethylamino)ethoxy)pyrimidin-2-yl)-6-(2-fluoro-4-(5-methyl-1,2,4-oxadiazol-3-yl)phenyl)nicotinamide 6-(2-chloro-4-(5-methyl-1,2,4-oxadiazol-3-yl)phenyl)-N-(5-cyano-4-(2-(dimethyamino)ethoxy)pyrimidin-2-yl)nicotinamide N-(5-bromo-4-(2-(dimethylamino)ethoxy)pyridin-2-yl)-2-(2-cyclopropyl-4-(5-methyl-1,2,4-oxadiazol-3-yl)phenyl)pyrimidine-5-carboxamide N-(5-cyano-4-(2-(dimethylamino)ethoxy)pyridin-2-yl)-2-(2-cyclopropyl-4-(5-methyl-1,2,4-oxadiazol-3-yl)phenyl)pyrimidine-5-carboxamide 4-bromo-3-(2-(dimethylamino)ethoxy)-N-(6-(2-fluoro-4-(5-methyl-1,2,4-oxadiazol-3-yl)phenyl)pyridin-3-yl)benzamide 4-bromo-N-(6-(2-cyclopropyl-4-(5-methyl-1,2,4-oxadiazol-3-yl)phenyl)pyridin-3-yl)-3-(2-(dimethylamino)ethoxy)benzamide 4-bromo-N-(6-(2-chloro-4-(5-methyl-1,2,4-oxadiazol-3-yl)phenyl)pyridin-3-yl)-3-(2-(dimethylamino)ethoxy)benzamide 4-bromo-3-(2-(dimethylamino)ethoxy)-N-(6-(4-(5-methyl-1,2,4-oxadiazol-3-yl)-2-(trifluoromethyl)phenyl)pyrdin-3-yl)benzamide 4-bromo-3-(2-(dimethylamino)ethoxy)-N-(6-(2-methoxy-4-(5-methyl-1,2,4-oxadiazol-3-yl)phenyl)pyridin-3-yl)benzamide 4-bromo-N-(6-(2-cyano-4-(5-methyl-1,2,4-oxadiazol-3-yl)phenyl)pyridin-3-yl)-3-(2-(dimethylamino)ethoxy)benzamide 4-cyano-N-(6-(2-cyclopropyl-4-(5-methyl-1,2,4-oxadiazol-3-yl)phenyl)pyridin-3-yl)-3-(2-(dimethylamino)ethoxy)benzamide 4-cyano-3-(2-(dimethylamino)ethoxy)-N-(6-(2-fluoro-4-(5-methyl-1,2,4-oxadiazol-3-yl)phenyl)pyridin-3-yl)benzamide N-(6-(2-chloro-4-(5-methyl-1,2,4-oxadiazol-3-yl)phenyl)pyridin-3-yl)-4-cyano-3-(2-(dimethylamino)ethoxy)benzamide 4-cyano-3-(2-(dimethylamino)ethoxy)-N-(6-(4-(5-methyl-1,2,4-oxadiazol-3-yl)-2-(trifluoromethyl)phenyi)pyridin-3-yl)benzamide 4-cyano-3-(2-(dimethylamino)ethoxy)-N-(6-(2-methoxy-4-(5-methyl-1,2,4-oxadiazol-3-yl)phenyl)pyridin-3-yl)benzamide 4-cyano-N-(6-(2-cyano-4-(5-methyl-1,2,4-oxadiazol-3-yl)pheny)pyridin-3-yl)-3-(2-(dimethylamino)ethoxy)benzamide.

According to one embodiment of the present invention, preferred compounds are selected from:

N-(4-cyano-3-(2-(dimethylamino)ethoxy)phenyl)-6-(2-cyclopropyl-4-(5-methyl-1,2,4-oxadiazol-3-yl)phenyl)nicotinamide 6-(2-chloro-4-(5-methyl-1,2,4-oxadiazol-3-yl)phenyl)-N-(4-cyano-3-(2-(dimethylamino)ethoxy)phenyl)nicotinamide N-(4-cyano-3-(2-(dimethylamino)ethoxy)phenyl)-2-(2-cyclopropyl-4-(5-methyl-1,2,4-oxadiazol-3-yl)phenyl)pyrimidine-5-carboxamide N-(5-cyano-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide 2'-chloro-N-(5-cyano-4-(2-(dimethylamino)ethoxy)pyridin-2-yl)-4'-(5-methyl-1,2,4-oxadiazol-3-yl)-[1,1'-biphenyl]-4-carboxamide N-(5-cyano-6-(2-(dimethylamino)ethoxy)pyridin-2-yl)-2'-cyclopropyl-4'-(5-methyl-1,2,4-oxadiazol-3-yl)-[1,1'-biphenyl]-4-carboxamide N-(5-cyano-6-(2-(dimethylamino)ethoxy)pyridin-2-yl)-2'-fluoro-4'-(5-methyl-1,2,4-oxadiazol-3-yl)-[1,1'-biphenyl]-4-carboxamide 2'-chloro-N-(5-cyano-6-(2-(dimethylamino)ethoxy)pyridin-2-yl)-4'-(5-methyl-1,2,4-oxadiazol-3-yl)[1,1'-biphenyl]-4-carboxamide N-(5-cyano-4-(2-(dimethylamino)ethoxy)pyrimidin-2-yl)-2'-cyclopropyl-4'-(5-methyl-1,2,4-oxadiazol-3-yl)-[1,1'-biphenyl]-4-carboxamide N-(5-cyano-4-(2-(dimethylamino)ethoxy)pyridin-2-yl)-6-(2-cyclopropyl-4-(5-methyl-1,2,4-oxadiazol-3-yl)phenyl)nicotinamide 6-(2-chloro-4-(5-methyl-1,2,4-oxadiazol-3-yl)phenyl)-N-(5-cyano-4-(2 (dimethylamino)ethoxy)pyridin-2-yl)nicotinamide N-(5-cyano-4-(2-(dimethylamino)ethoxy)pyridin-2-yl)-6-(2-methoxy-4-(5-methyl-1,2,4-oxadiazol-3-yl)phenyl)nicotinamide N-(5-cyano-6-(2-(dimethylamino)ethoxy)pyridin-2-yl)-6-(2-cyclopropyl-4-(5-methyl-1,2,4-oxadiazol-3-yl)phenyl)nicotinamide N-(5-cyano-6-(2-(dimethylamino)ethoxy)pyridin-2-yl)-6-(2-fluoro-4-(5-methyl-1,2,4-oxadiazol-3-yl)phenyl)nicotinamide 6-(2-chloro-4-(5-methyl-1,2,4-oxadiazol-3-yl)phenyl)-N-(5-cyano-6-(2-(dimethyamino)ethoxy)pyridin-2-yl)nicotinamide 6-(2-chloro-4-(5-methyl-1,2,4-oxadiazol-3-yl)phenyl)-N-(5-cyano-4-(2-(dimethylamino)ethoxy)pyrimidin-2-yl)nicotinamide 4-cyano-N-(6-(2-cyclopropyl-4-(5-methyl-1,2,4-oxadiazol-3-yl)phenyl)pyridin-3-yl)-3-(2-(dimethylamino)ethoxy)benzamide 4-cyano-3-(2-(dimethylamino)ethoxy)-N-(6-(2-fluoro-4-(5-methyl-1,2,4-oxadiazol-3-yl)phenyl)pyridin-3-yl)benzamide 4-cyano-3-(2-(dimethylamino)ethoxy)-N-(6-(2-methoxy-4-(5-methyl-1,2,4-oxadiazol-3-yl)phenyl)pyridin-3-yl)benzamide.

In a more preferred embodiment of the present invention, compounds are selected from:

N-(4-cyano-3-(2-(dimethylamino)ethoxy)phenyl)-6-(2-cyclopropyl-4-(5-methyl-1,2,4-oxadiazol-3-yl)phenyl)nicotinamide N-(5-cyano-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide 2'-chloro-N-(5-cyano-4-(2-(dimethylamino)ethoxy)pyridin-2-yl)-4'-(5-methyl-1,2,4-oxadiazol-3-yl)-[1,1'-biphenyl]-4-carboxamide N-(5-cyano-4-(2-(dimethylamino)ethoxy)pyrimidin-2-yl)-2'-cyclopropyl-4'-(5-methyl-1,2,4-oxadiazol-3-yl)-[1,1'-biphenyl]-4-carboxamide N-(5-cyano-4-(2-(dimethylamino)ethoxy)pyridin-2-yl)-6-(2-cyclopropyl-4-(5-methyl-1,2,4-oxadiazol-3-yl)phenyl)nicotinamide 6-(2-chloro-4-(5-methyl-1,2,4-oxadiazol-3-yl)phenyl)-N-(5-cyano-4-(2 (dimethylamino)ethoxy)pyridin-2-yl)nicotinamide.

When the compounds of the present invention are combined with other therapeutic agents, said other therapeutic agents are selected from the group consisting of chemotherapeutics drugs selected from Vincristine, Daunorubicin, Cytarabine, 6-mercaptopurine, Methotrexate, Cyclophosphamide, Prednisone, Dexamethasone, Nelarabine and immunotherapeutic agent selected from the group consisting of antibodies anti-PD1, antibodies anti-PDL1 and antibodies anti-CTLA4. Specifically, the immunotherapeutic agent is selected from the group consisting of ipilimumab, tremelimumab, nivolurnab, pembrolizumab, CT-011, AMP-224, MPDL3280A, MEDl4736 and MDX-1105.

The compounds of this invention can be prepared by using the procedures described below in the schemes and examples, or by methods known in the art. The starting materials and intermediates may be obtained from commercial sources, prepared from commercially available compounds, or prepared using well known synthetic methods. To facilitate the description of the procedures, concrete examples have been used, but they do not restrict in any means the scope of the present invention.

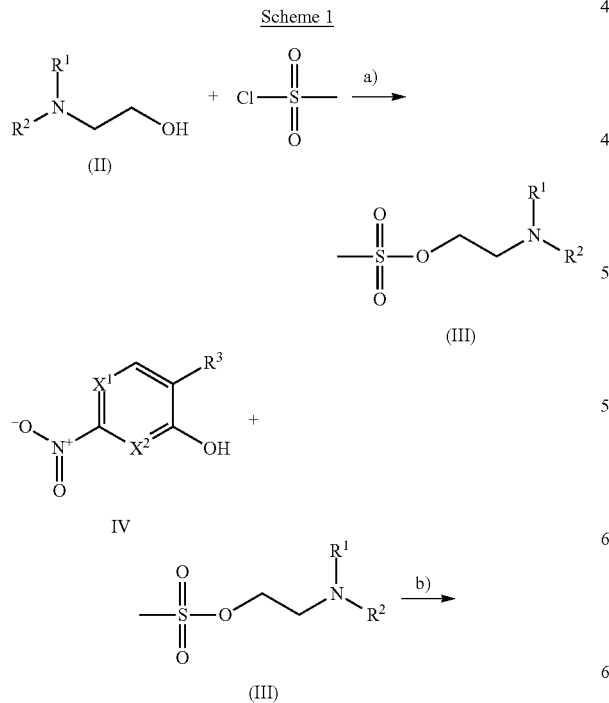

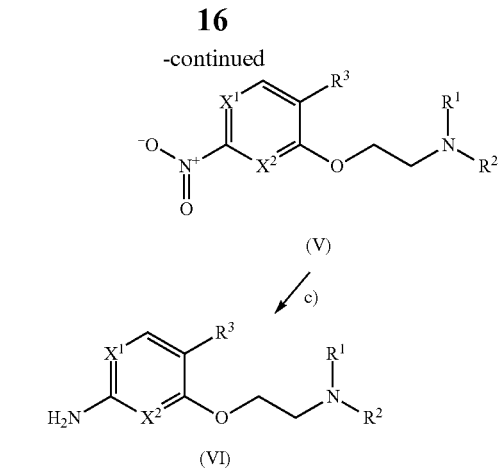

Reagents and conditions: a) DCM, 0° C., 3 h; b) CsCO₃, Dioxane, reflux, 16 h; c) Zn; NH₄Cl, EtOH, 80° C., 16 h.

Scheme 1 illustrates one of the synthetic route leading to compounds of formula (VI), which are intermediates in the synthesis of compounds of formula (I). Starting with the derivative of 2-aminoethan-1-ol (II), reaction with methanesulfonyl chloride results in formation of the 2-aminoethyl methanesulfonate (III), which is reacted with the heteroarylalcohol or phenol (IV) to form the ether of compounds (V). Following hydrogenation for example with zinc powder and ammonium chloride affords the intermediates of formula (VI).

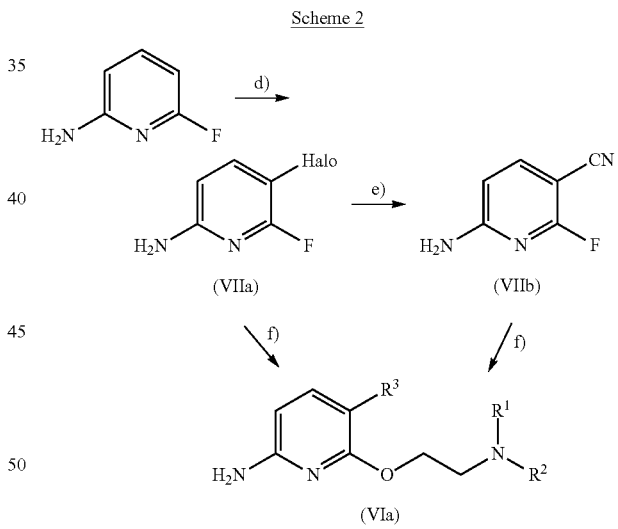

Reagents and conditions: d) N-halosuccinimide, AcOH, RT; e) ZN(CN)₂, Tris(dibenzylideneacetone)dipalladium(0) (Pd₂(dba)₃), 1,1'-Ferrocenediyl-bis(diphenylphosphine) (dppf), DMF, 120° C., 12 h; f) Potassium bis(trimethylsilyl) amide 1M in THF, room temperature, 12 h.

In the particular case of the intermediates (VI) in which $X^2$ represents a nitrogen atom, the synthesis begins with the halogenation of 6-fluoropyridin-2-amine with N-halosuccinimide in acetic acid at room temperature to provide intermediates of formula (VIIa).

For the synthesis of the compounds of the present invention in which $R^3$ is a cyano group, the compound 6-fluoro-5-iodopyridin-2-amine reacts with Zn(CN)₂ by a palladium complex to give intermediate of formula (VIIb). Finally, intermediates (VIIa) or (VIIb) are reacted with disubstituted amino ethanol in the presence of a base for example potassium bis(trimethylsilyl) amide in THF at room temperature to form the amino ether (VIa), according to Scheme 2.

Scheme 3

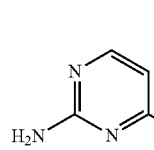

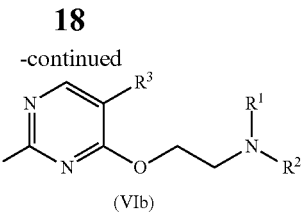

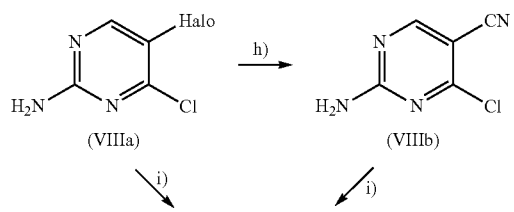

Reagents and conditions: g) N-halosuccinimide, DMF, RT; h) Zn(CN)₂, (Pd₂(dba)₃), (dppf), DMF, 120° C., 12h; i) Potassium bis(trimethylsilyl) amide 1M in THF, RT, 12 h.

On the ther hand, intermediate of formula (VIb) are obtained applying similar reactions as those described in Scheme 2. In this case, 4-chloropyrimidin-2-amine is halogenated with N-halosuccinimide in DMF at room temperature to obtain intermediates of formula (VIIa). For the synthesis of the compounds of the present invention in which R³ is a cyano group, the introduction of said group is catalysed by a palladium complex, to provide the intermediate (VIIIb), which is converted in the intermediate (VIb) by the reaction with disubstituted amino ethanol in the presence of a base for example potassium bis(trimethylsilyl) amide in THF at room temperature, as described in Scheme 3.

Scheme 4

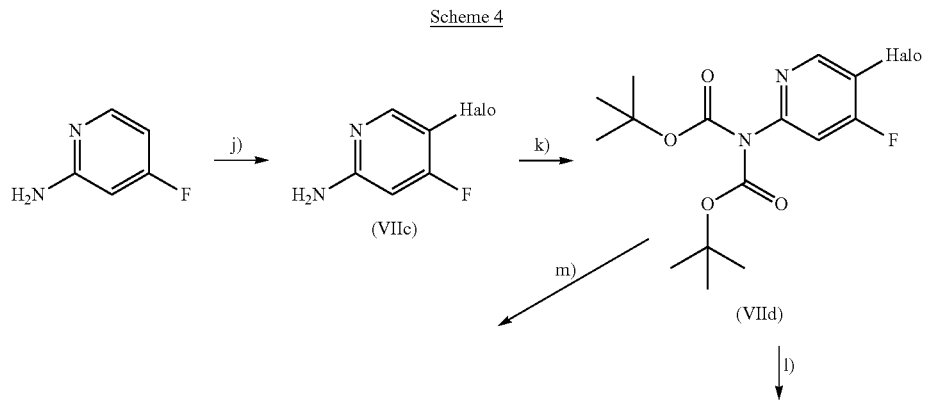

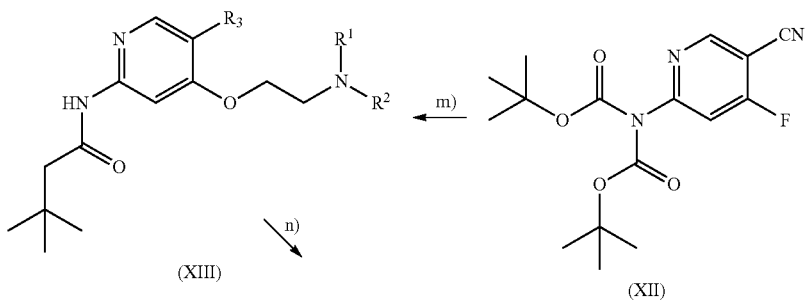

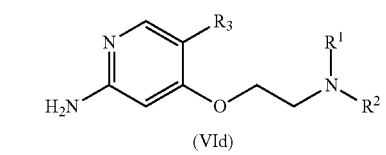

Reagants and conditions: j) N-halosuccinimide, acetonitrile, RT; k) di-tert-butyl decarbonate, TEA, DMAP, THF, 40° C., 3 h; l) Zn(CN)₂, (Pd₂(dba)₃), (dppf), DMF, 120° C., 12 h; m) HO-CH₂-CH₂-NR¹R², NaH, DMF, 80° C., 6 h; n) Trifluoroacetic acid, DMC, RT.

Halogenation of 4-fluoropyridin-2-amine with N-halosuccinimide in acetic acid at room temperature give intermediates of formula (VIIc). The amino group is protected by the formation of intermediates of formula (VIId). Cyano introduction to the $R^3$ group as described before give precursor (XII). Reaction with HO—$CH_2$—$CH_2$—$NR^1R^2$ in the presence of a base for example sodium hydride in DMF results in formation of the intermediate (XIII), which after deprotection with trifluoroacetic acid in DCM gives intermediate (VId), according to scheme 4.

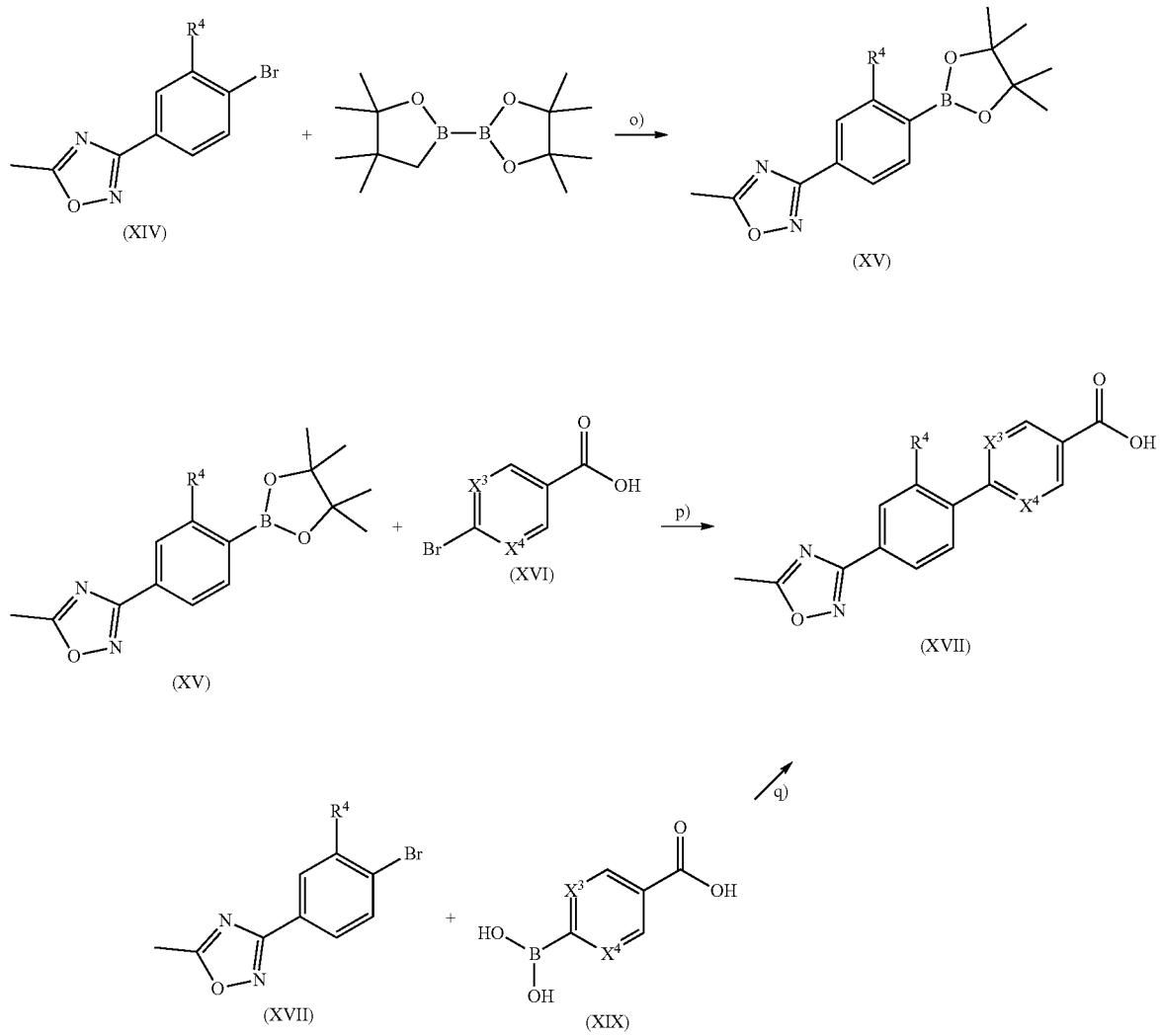

Scheme 5

Reagents amd conditions: o) [1,1′-bis(diphenylphosphino)ferrocene] dichloropalladium(II) (Pd(dppf)Cl$_2$•DCM), KOAc, dioxane/H$_2$O, 100° C., 8 h; p) or q) Pd(dppf)Cl$_2$•DCM, Cs$_2$CO$_3$, dioxane/H$_2$O, 100° C., 12 h.

In Scheme 5 two routes to synthetize carboxylic acids of formula (XVII) are despicted when the group G of compounds of general formula (I) represents an amide (—C(O)NH). Phenyl or heteroaryl bromide precursor (XIV) can react with bis(pinacolato)diboron in the presence of palladium catalyst to yield the intermediate (XV). Applying Suzuki reactions these intermediates may be converted to acids of formula (XVIII) by the reaction with the bromide precursor (XVI). An alternative route is possible by the coupling reaction of the precursor (XVIII) with the boronic acids (XIX), under palladium catalysed conditions.

Scheme 6

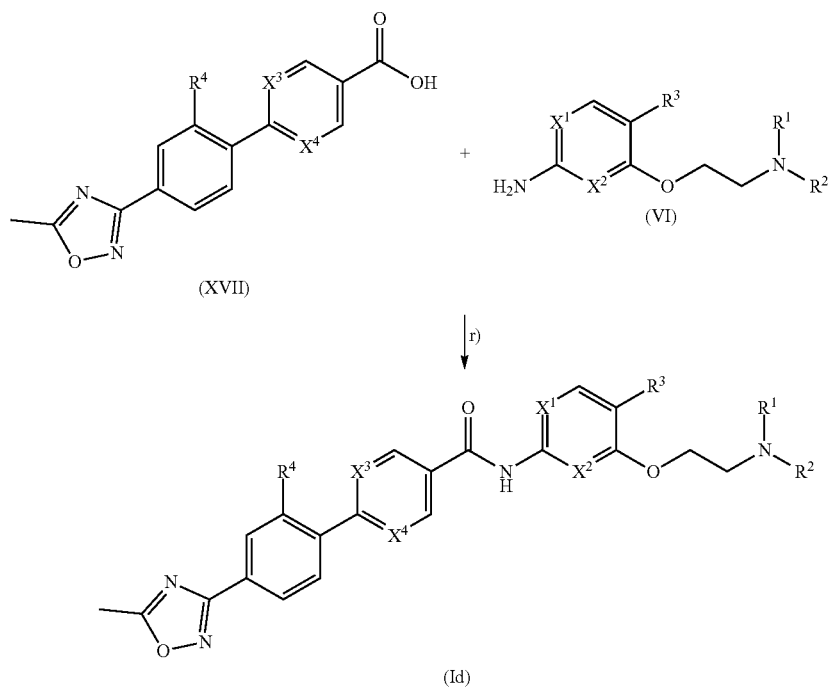

Reagents and conditions:
r) General procedure A: HATU, DIPEA, DCM, RT, overnight;r) General procedure B: Carboxylic acid (XVII) converted to acid chloride and thenreacted with amine (VI) using TEA, DCM, RT, overnight.

The synthesis of the amides of formula (Id) is carried out by the reaction of the amines of formula (VI) with the correspondent carboxylic acids (XVII) in the presence a coupling agent, such as HATU, and a base at room temperature, as described in scheme 6.

Alternative, carboxylic acids of formula (XVII) can be converted to the corresponding acid chlorides using standard procedures. Reacting the corresponding acid chlorides of precursor (XVII) with the amines precursor of formula (VI) in the presence of a base such as triethylarnine, derivatives of formula (Id) are also obtained.

Scheme 7a

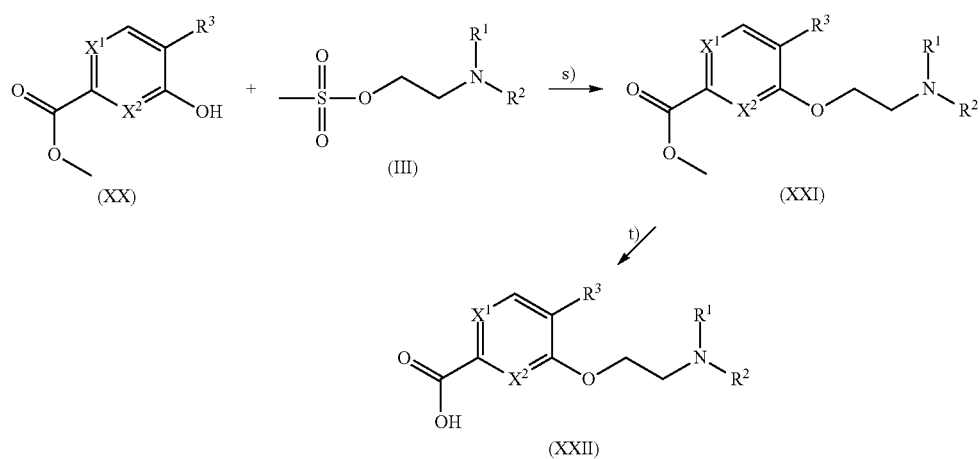

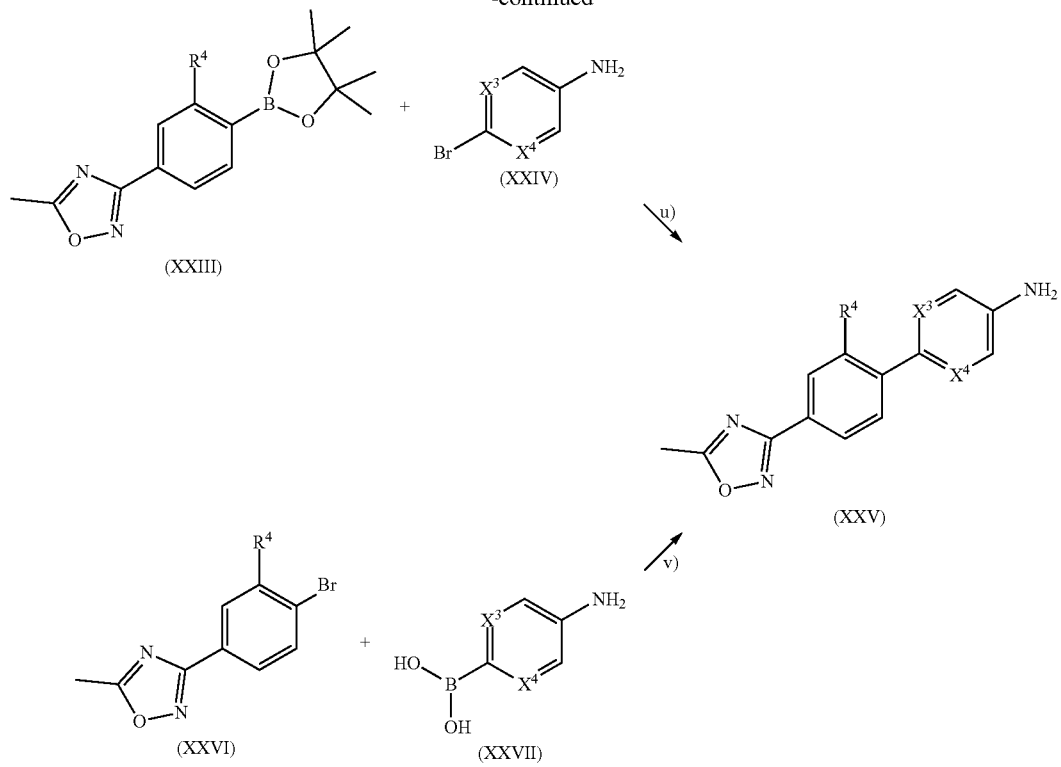

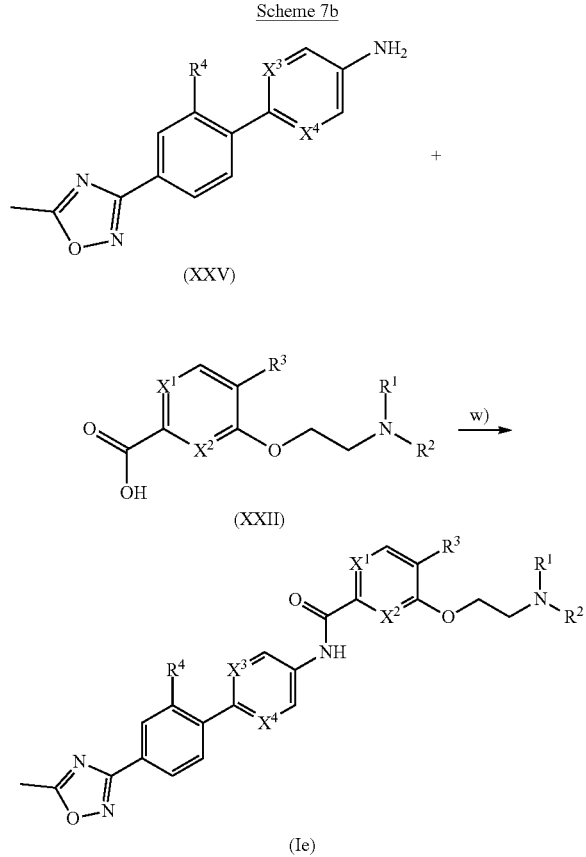

Reagents and conditions: s) Cs₂CO₃, Dioxane, reflux, 12 h; t) NaOH, MeOH, RT, 3 h; u) or; v) Pd(dppf)Cl₂.DCM, Cs₂CO₃, dioxane/H₂O, 100° C., 12 h; w) HATU, DIPEA, DCM, RT, overnight.

In Scheme 7 is described the route to obtain the inverse amide (—NHC(O)) (Ie) in the moieties G of compounds of general formula (I), which are also the object of this patent.

The ether formation of precursor (XX) with 2-aminoethyl methane sulfonate (III) gives the precursor (XXI), which after hydrolysis produce acids of formula (XXII). On another hand, the amine precursor (XXV) can be synthesized by the Suzuki-type coupling reaction of the boronic acids or boronate derivatives (XXIII) with the precursor (XXIV), using a palladium catalyst. It is also possible by changing the functionality of the intermediates in a similar reaction depending on whether the product is commercial or not in this way, as shown in the reaction of the precursor (XXVI) with the boronic acids or boronate derivatives (XXVII), under palladium catalysed conditions. The synthesis of the inverse amides of formula (Ie) is carried out by the reaction of the amine precursor of formula (XXV) with the correspondent carboxylic acids (XXII) in the presence of a coupling agent, such as HATU, and a base, at room temperature.

The synthesis of the compounds of the invention is illustrated by the following examples including the preparation of the intermediates, which do not limit the scope of the invention in any way.

Abbreviations In the present application are used the following abbreviations, with the corresponding definitions:

ACN: Acetonitrile
CN: Cyano group

RT: Room temperature
Halo: Halogen atom
HATU: N-[(Dimethylamino)-1H-1,2,3-triazolo-[4,5-b]pyridin-1-ylmethylene]-N-methylmethanaminium hexafluorophosphate N-oxide
EDTA: etilendiamintetracetic acid
DIPEA: N,N-Diisopropylethylamine
DME: Dimethoxyethanol
DMF: Dimethylformamide
DCM: Dichloromethane
NBS: N-Bromosuccinimide
TEA: Triethylarnine
TFA: Trifluoroacetic acid
THF: Tetrahydrofuran
DMSO: Dimethyl sulfoxide Pharmacological Activity Determination of Binding at Human Serotonin Receptors Competition Binding in Human 5-HT$_{1B}$ Receptor Serotonin 5-HT$_{1B}$ receptor competition binding experiments were carried out in a polypropylene 96-well plate. In each well was incubated 5 µg of membranes from Hela-5-HT$_{1B}$ cell line prepared in the laboratory (Lot: A001/14-11-2011, protein concentration=3179 µg/ml), 1.5 nM [$^3$H]-GR125743 (77.3 Ci/nmol, 0.1 mCi/ml, Perkin Elmer NET1172100UC) and compounds studied and standard. Non-specific binding was determined in the presence of GR55562 10 µM (TOCRIS 1054). The reaction mixture (V$_t$: 250 µl/well) was incubated at 25° C. for 90 min, 200 µL was transfered to GF/C 96-well plate (Millipore, Madrid, Spain) pretreated with 0.5% of PEI and treated with binding buffer (Tris-HCl 50 mM, EDTA 1 mM, MgCl$_2$ 10 mM, pH=7.4), after was filtered and washed four times with 250 µl wash buffer (Tris-HCl 50 mM, pH=7.4), before measuring in a microplate beta scintillation counter (Microbeta Trilux, PerkinElmer, Madrid, Spain). The raw radioactivity data is adjusted to a logistic regression of 4 parameters using GraphPad Prism software, from the specific junction the value of IC$_{50}$ is obtained. From the IC$_{50}$ the Ki is calculated according to the following formula:

$$Ki = \frac{IC_{50}}{1 + D/Kd}$$

Being:
IC$_{50}$: inhibitory concentration,
D: real concentration of radioligand and
Kd: dissociation constant (affinity of radioligand to the receptor).

Competition Binding in Human 5-HT$_{2A}$ Receptor

Serotonin 5-HT$_{2A}$ receptor competition binding experiments were carried out in a polypropilene 96-well plate. In each well was incubated 80 µg of membranes from CHO-5-HT$_{2A}$ cell line prepared in the laboratory (protein concentration=4337 µg/ml), 1 nM [$^3$H]-Ketanserin (47.3 Ci/mmol, 1 mCi/ml, Perkin Elmer NET791250UC) and compounds studied and standard. Non-specific binding was determined in the presence of Methysergide 1 µM (Sigma M137). The reaction mixture (Vt: 250 µl/well) was incubated at 37° C. for 30 min, 200 µL was transfered to GF/B 96-well plate (Millipore, Madrid, Spain) pretreated with 0.5% of PEI and treated with binding buffer (Tris-HCl 50 mM, pH=7.4), after was filtered and washed six times with 250 µl wash buffer (Tris-HCl 50 mM, pH=6.6), before measuring in a microplate beta scintillation counter (Microbeta Trilux, PerkinElmer, Madrid, Spain).

The raw radioactivity data is adjusted to a logistic regression of 4 parameters using GraphPad Prism software, from the specific junction the value of IC$_{50}$ is obtained. From the IC$_{50}$ the Ki is calculated according to the following formula:

$$Ki = \frac{IC_{50}}{1 + D/Kd}$$

Being:
IC$_{50}$: inhibitory concentration,
D: real concentration of radioligand and
Kd: dissociation constant (affinity of radioligand to the receptor).

Cell Viability Assay $0.15 \times 10^6$ AML cell lines (HL-60 or MonoMac-1) per mL were cultured in completed RPMI medium, supplemented with 10% Fetal bovine serum (FBS). Compounds were added to the medium at the concentration indicated (0.1, 1 and 10 µM), while controls were treated with equivalent concentration of vehicle (DMSO). Primary validation screenings were analyzed after 72 h of treatment, EC$_{50}$ was determined upon 48 h treatments. Cells were stained with the live-dead discrimination dye 7-aminoactinomycin D (7-AAD) and Hoechst 33342 and acquired in a flow cytometer, with a volumetric counting. Live cells were discriminated based on a discrete FSC-SSC profile, 7-AAD negativity and dim positivity to Hoechst 33342. EC$_{50}$ was calculated with the Prism GraphPad software.

Selectivity Study Againts Leukemia Cells

A primary AML patient sample from peripheral blood at diagnosis was ficolled-purified for mononuclear cells (MNCs). Isolated MNCs were culture in IMDM medium supplemented with 3% heat-inactivated fetal bovine serum, 1× BIT (StemCell Technologies), 5 ng/mL human IL3, 2 mM NaPyr and 5×10−5 M β-mercaptoethanol. Cells were treated with vehicle control (DMSO), and 10 µM of a selected compound (example compound or reference compound), for 72 h at 37° C. and 5% CO$_2$. After treatment, cells were stained for the pan-hematopoietic marker CD45 and the live-death discriminator 7-AAD and acquired in a flow cytometry. Analysis were done inside the live gate (discrete FSC-SSC profile, 7-AAD dim population). Histograms show the intensity of CD45 staining (X axis) and SSC (Y axis) within the live cell gate. Blast gate (upper right) and lymphocyte gate (lower left) are indicated in each histogram. Selectivity against AML blasts is represented by the reduction of the relative frequency of AML blasts versus lymphocytes.

Healthy Blood Cells—Viability Assay $0.5 \times 10^6$ peripheral blood-mononuclear blood cells per mL were cultured in completed RPM medium, supplemented with 10% FBS. Compounds were added to the medium at 0.5/1/5/10/50 µM, while controls were treated with equivalent concentration of vehicle (DMSO). Upon 48 h treatment, cells were stained with the live-dead discrimination dye 7-AAD and Hoechst 33342, the pan-hematopoietic surface marker CD45, and acquired in a flow cytometer, with a volumetric counting. Live cells were discriminated based on a discrete FSC-SSC profile, 7-AAD negativity, dim positivity to Hoechst 33342 and CD45 positivity. $EC_{50}$ was calculated with the Prism GraphPad software.

Estimation of Brain Penetration tPSA values of several compounds were determined theoretically using ChemDraw Professional Program Version 17.0.0.206 (121) by Perkin Elmer Informatics, Inc. PSA has been used as a predictor for blood-brain barrier (BBB) penetration (see for example Lenz GR. Technical problems in getting results. In: From data to drugs: strategies for benefiting from the new drug discovery technologies (Feng M R, Assessment of blood-brain barrier penetration: in silico, in vitro and in vivo; Curr Drug Metab. 2002 Dec; 3(6):647-57).

Results

Determination of Binding at Human Serotonin Receptors $h5\text{-}HT_{1B}$ and $h5\text{-}HT_{2A}$ Table 1 shows the binding of some compounds of the present invention in serotonin receptors.

TABLE 1

| Example | $h5\text{-}HT_{1B}$ Ki (nM) | $h5\text{-}HT_{2A}$ Ki (nM) |
| --- | --- | --- |
| 7 | 9.7 | 2500 |
| 21 | 6.3 | 3500 |
| 23 | 7.9 | 3000 |
| 38 | 16.5 | >10000 |
| 39 | 0.4 | 2500 |
| 40 | 3.5 | 1500 |
| 41 | 0.3 | 1000 |
| 42 | 2 | 3500 |
| 43 | 1.5 | 2000 |
| 45 | 25.9 | >10000 |
| 47 | 9.7 | >10000 |
| 49 | 126.4 | >10000 |
| 54 | 48.3 | >10000 |
| 65 | 0.5 | 1000 |
| SB41 | 0.6 | 143 |
| SB9 | 8.2 | 5.92 |
| Apomorphine | 1757.1 | 6.92 |

SB41 = SB-216641 (CAS No. 193611-67-5) N-[3-[3-(Dimethylamino)ethoxy]-4-methoxyphenyl]-2'-methyl-4'-(5-methyl-1,2,4-oxadiazol-3-yl)-[1,1'-biphenyl]-4-carboxamide hydrochloride.
SB9 = SB-224289-HCl (CAS No. 180084-26-8) 1'-Methyl-5-[[2'-methyl-4'-(5-methyl-1,2,4-oxadiazol-3-yl)biphenyl-4-yl]carbonyl]-2,3,6,7-tetrahydrospiro[furo[2,3-f]indole-3,4'-piperidine hydrochloride.

Cell Viability Assay Results

Table 2 shows the cytotoxic capacity of some compounds of the present invention on AML cell lines.

TABLE 2

| Example | HL-60 $EC_{50}$ (µM) | MonoMac-1 $EC_{50}$ (µM) |
| --- | --- | --- |
| 1 | 1 | 0.79 |
| 2 | 0.58 | 1.11 |
| 3 | 1.62 | 0.87 |

TABLE 2-continued

| Example | HL-60 $EC_{50}$ (µM) | MonoMac-1 $EC_{50}$ (µM) |
| --- | --- | --- |
| 5 | 1.18 | 1.14 |
| 7 | 0.65 | 0.79 |
| 8 | 2.81 | 2 |
| 9 | 0.99 | 0.88 |
| 16 | 1.08 | 0.46 |
| 17 | 2.65 | 1.32 |
| 18 | 1.17 | 0.42 |
| 21 | 3.66 | 3.32 |
| 23 | 0.97 | 0.54 |
| 25 | 2.8 | 2.69 |
| 30 | 1.03 | 2.8 |
| 36 | 5.87 | 7.37 |
| 39 | 3.45 | 2.6 |
| 40 | 1.01 | 0.57 |
| 43 | 2.52 | 1.9 |
| 45 | 1.76 | 1.15 |
| 47 | 6.63 | 4.12 |
| 49 | 1.16 | 4.17 |
| 51 | 1.99 | 1.2 |
| 52 | 1.03 | 4.32 |
| 53 | 0.6 | 1.32 |
| 54 | 1.07 | 1.04 |
| 56 | 0.62 | 2.02 |
| 58 | 3.79 | 2.61 |
| 65 | 0.93 | 1.33 |
| 73 | 1.53 | 3.08 |
| SB41 | 7.32 | 2.48 |
| SB9 | 4.78 | 1.18 |
| Apomorphine | 4.88 | 11.64 |

SB41 = SB-216641 (CAS No. 193611-67-5) N-[3-[3-(Dimethylamino)ethoxy]-4-methoxyphenyl]-2'-methyl-4'-(5-methyl-1,2,4-oxadiazol-3-yl)-[1,1'-biphenyl]-4-carboxamide hydrochloride.
SB9 = SB-224289-HCl (CAS No. 180084-26-8)) 1'-Methyl-5-[[2'-methyl-4'-(5-methyl-1,2,4-oxadiazol-3-yl)biphenyl-4-yl]carbonyl]-2,3,6,7-tetrahydrospiro[furo[2,3-f]indole-3,4'-piperidine hydrochloride.

Selectivity Study Against Leukemia Cells

As shown in the FIG. 1, several compounds were highly selective against AML blasts based on the elimination of the blast population and the survival of the non-oncologic lymphocyte population. However, after treatment with conventional $HTR_{1B}$ antagonist SB-224289, frequency of each population resemble the vehicle control DMSO.

Healthy Blood Cells—Viability Assay

Table 3 shows the cytotoxic capacity of some compounds of the present invention on healthy cell lines.

TABLE 3

| Example | $EC_{50}$ (uM) |
| --- | --- |
| 7 | 50 |
| 21 | >50 |
| 23 | >50 |
| 36 | 25 |
| 38 | 50 |
| 39 | 50 |
| 45 | >50 |
| 47 | 25 |
| SB41 | 12.5 |

SB41 = SB-216641 (CAS No. 193611-67-5) N-[3-[3-(Dimethylamino)ethoxy]-4-methoxyphenyl]-2'-methyl-4'-(5-methyl-1,2,4-oxadiazol-3-yl)-[1,1'-biphenyl]-4-carboxamide hydrochloride.

tPSA Value

Table 4 below shows the stimated value of tPSA for some exemplified compounds.

TABLE 4

| Example | Å$^2$ |
|---|---|
| 17 | 87.88 |
| 18 | 87.88 |
| 21 | 111.67 |
| 23 | 111.67 |
| 36 | 124.03 |
| 39 | 100.24 |
| 45 | 124.03 |
| 47 | 124.03 |
| 54 | 124.03 |
| 73 | 87.88 |
| SB41 | 84.75 |
| SB9 | 66.73 |
| Apomorphine | 43.7 |

As can be seen from the results described above, the compounds of the present invention are potent 5-HT$_{1B}$ receptor modulators with a good selectivity against the other serotonin recptor, and more specifically against the 5-HT$_{2A}$ receptor.

Additionally, the compounds of the present invention show an enhanced cytotoxic activity against AML cells, significant less cytotoxic against healthy cell lines and a lower potential of brain penetration, compared to reported 5-HT$_{1B}$ receptor modulators.

The derivatives of the present invention are useful in the treatment or prevention of diseases known to be susceptible to improvement by treatment with a modulator of 5-HT$_{1B}$ serotonin receptor. Such diseases are, for example, cancer selected from blood cancer such as acute myeloid leukemia (AML), and solid tumors, and respiratory diseases such as pulmonary arterial hypertension.

Accordingly, the derivatives of the invention and pharmaceutically acceptable salts thereof, and pharmaceutical compositions comprising such compounds and/or salts thereof, may be used in a method of treatment of disorders of the human body which comprises administering to a subject requiring such treatment an effective amount of a compound of the invention or a pharmaceutically acceptable salt thereof.

The present invention also provides pharmaceutical compositions which comprise, as an active ingredient, at least a compound of formula (I) or a pharmaceutically acceptable salt thereof in association with other therapeutics agents, as have been mentioned above, and with a pharmaceutically acceptable excipient such as a carrier or diluent. The active ingredient may comprise 0.001% to 99% by weight, preferably 0.01% to 90% by weight of the composition depending upon the nature of the formulation and whether further dilution is to be made prior to application. Preferably, the compositions are made up in a form suitable for oral, topical, nasal, rectal, percutaneous or injectable administration.

The pharmaceutically acceptable excipients, which are admixed with the active compound or salts of such compound, to form the compositions of this invention, are well known per se and the actual excipients used depend inter glia on the intended method of administering the compositions.

Compositions of this invention are preferably adapted for injectable and oral (per os) administration. In this case, the compositions for oral administration may take the form of tablets, sustained release tablets, sublingual tablets, capsules, inhalation aerosols, inhalation solutions, dry powder inhalation, or liquid preparations, such as mixtures, elixirs, syrups or suspensions, all containing the compound of the invention; such preparations may be made by methods well-known in the art.

The diluents, which may be used in the preparation of the compositions, include those liquid and solid diluents, which are compatible with the active ingredient, together with colouring or flavouring agents, if desired. Tablets or capsules may conveniently contain between 2 and 500 mg of active ingredient or the equivalent amount of a salt thereof.

The liquid composition adapted for oral use may be in the form of solutions or suspensions. The solutions may be aqueous solutions of a soluble salt or other derivative of the active compound in association with, for example, sucrose to form syrup. The suspensions may comprise an insoluble active compound of the invention or a pharmaceutically acceptable salt thereof in association with water, together with a suspending agent or flavouring agent.

Compositions for parenteral injection may be prepared from soluble salts, which may or may not be freeze-dried and which may be dissolved in pyrogen free aqueous media or other appropriate parenteral injection fluid.

Effective doses are normally in the range of 2-2000 mg of active ingredient per day. Daily dosage may be administered in one or more treatments, preferably from 1 to 4 treatments, per day.

The present invention will be further illustrated by the following examples. The following are given by way of illustration and do not limit the scope of the invention in any way. The synthesis of the compounds of the invention is illustrated by the following examples including the preparation of the intermediates, which do not limit the scope of the invention in any way.

EXAMPLES

General

Reagents, solvents and starting products were acquired from commercial sources. The term "concentration" refers to the vacuum evaporation using a Büchi rotavapor. When indicated, the reaction products were purified by "flash" chromatography on silica gel (40-63 μm) with the indicated solvent system. The spectroscopic data were measured in a Varian Mercury 400 spectrometer. The melting points were measured in a Büchi 535 instrument. The HPLC-MS were performed on a Gilson instrument equipped with a Gilson 321 piston pump, a Gilson 864 vacuum degasser, a Gilson 189 injection module, a 1/1000 Gilson splitter, a Gilson 307 pump, a Gilson 170 detector, and a Thermoquest Fennigan aQa detector.

Preparation of Intermediates

General Procedure

Intermediate 1: 2-(dimethylamino)ethyl methanesulfonate

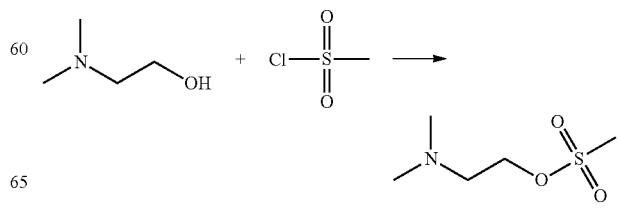

To a solution of 2-(dimethylamino)ethan-1-ol (2000 mg, 22.44 mmol) in 40 mL of dry DCM at 0° C., was added methane sulfonyl chloride dropwise (2,083 mL, 26.92 mmol). The reaction mixture was stirred at 0° C. for 4 h and the solvent was removed under vacuum to dryness obtaining a white solid (3600 mg, 96%), that was used in the next step without further purification.

$^1$H-NMR (400 MHz, DMSO-d$^6$): δ=4.59 (t, 2H), 3.48 (t, 2H), 3.32 (s, 3H), 2.80 (s, 3H), 2.78 (s, 3H).

Intermediate 2: 2-(2-bromo-5-nitrophenoxy)-N,N-dimethylethan-1-amine

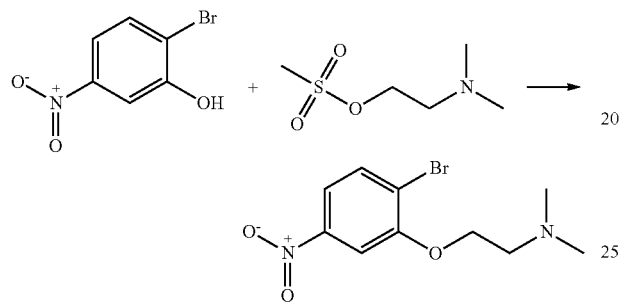

To a solution of 2-bromo-5-nitrophenol (500 mg, 2.29 mmol) and caesium carbonate (1120.9 mg, 3.44 mmol) in 10.0 mL of dry 1,4-dioxane was added 2-(dimethylamino) ethyl methanesulfonate (767.1 mg, 4.59 mmol). The reaction mixture was stirred for 16 hours at room temperature. The dioxane was remove under vacuum and saturated NaHCO$_3$ was added. The mixture was extracted with dichloromethane and the organic layer was dried, concentrated and purified by CombiFlash chromatography column (DCM:MeOH) yielding 306.1 mg (46.2%) of 2-(2-bromo-5-nitrophenoxy)-N,N-dimethylethan-1-amine.

$^1$H-NMR (400 MHz, DMSO-d$^6$): δ=7.90 (d, 1H), 7.87 (d, 1H), 7.75 (dd, 1H), 4.29 (t, 2H), 2.70 (t, 2H), 2.25 (s, 6H).

HPLC-MS: Rt 2.580 m/z 289.0 (MH$^+$).

The following intermediate was synthesized using the procedure described for intermediate 2.

Intermediate 3: 2-(2-chloro-5-nitrophenoxy)-N,N-dimethylethan-1-amine

Obtained as using the procedure described in intermediate 2 but using 2-chloro-5-nitrophenol.

$^1$H-NMR (400 MHz, DMSO-d$^6$): δ=7.93 (d, 1H), 7.83 (dd, 1H), 7.74 (d, 1H), 4.30 (t, 2H), 2.70 (t, 2H), 2.24 (s, 6H).

HPLC-MS: Rt 2.54 nm/z: 245.1 (MH$^+$).

Intermediate 4: 2-(2-(dimethylamino)ethoxy)-4-nitrobenzonitrile

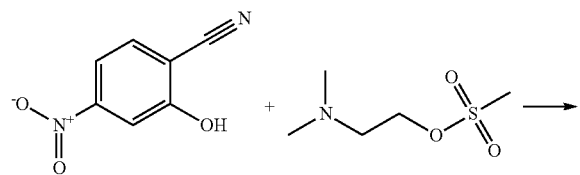

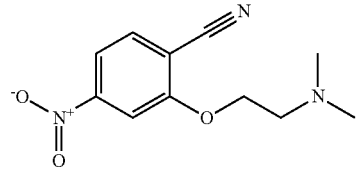

To a solution of 2-hydroxy-4-nitrobenzonitrile (500 mg, 3.05 mmol) and caesium carbonate (1489 mg, 4.57 mmol) in 15 mL of dry 1,4-dioxane was added 2-(dimethylamino) ethyl methanesulfonate (1019 mg, 6.09 mmol). The suspension was stirred for 16 hours at 60° C. in a sealed tube. The reaction mixture was evaporated, and the residue was partitioned between dichloromethane and saturated NaHCO$_3$. The organic phase was dried with Na$_2$SO$_4$ and evaporated to dryness. The residue was purified by normal phase chromatography obtaining 2-(2-(dimethylamino)ethoxy)-4-nitrobenzonitrile as a yellow solid (452 mg, 63%).

$^1$H-NMR (400 MHz, DMSO-d$^6$): δ=8.07 (d, 1H), 8.02 (d, 1H), 7.90 (dd, 1H), 4.39 (t, 2H), 2.73 (s, 2H), 2.27 (s, 6H).

HPLC-MS: Rt 1.64 m/z 206.1 (MH$^+$).

Intermediate 5: 4-bromo-3(2-(dimethylamino)ethoxy)aniline

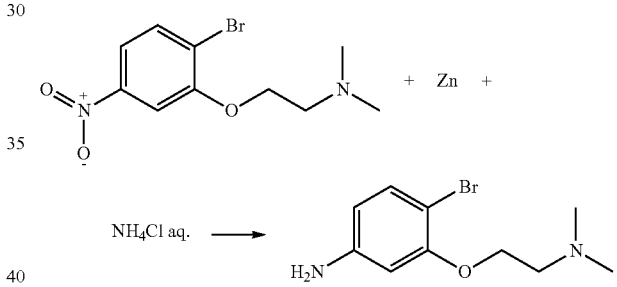

A solution of 2-(2-bromo-5-nitrophenoxy)-N,N-dimethylethan-1-amine (405 mg, 1.40 mmol) and zinc powder (412.1 mg, 6.30 mmol) in 16.2 mL of methanol and 4 mL of saturated aqueous ammonium chloride was stirred for 30 minutes at room temperature. The reaction mixture was filtered and concentrated under vacuum. The residue was partitioned between dichloromethane and saturated NaHCO$_3$ and the organic layer was dried with Na$_2$SO$_4$ and concentrated under vacuum to afford the amine intermediate (317.7 mg, 87.6%).

$^1$H-NMR (400 MHz, DMSO-d$^6$): δ=7.09 (d, 1H), 6.31 (d, 1H), 6.09 (dd, 1H), 5.26 (s, 2H), 3.98 (t, 2H), 2.63 (t, 2H), 2.24 (s, 6H).

HPLC-MS: Rt 2.06 m/z 259.0 (MH$^+$).

Intermediate 6: 4-chloro-3(2-(dimethylamino)ethoxy)aniline

Obtained as using the procedure described in intermediate 5 but using intermediate 3 as starting compound.

$^1$H-NMR (400 MHz, DMSO-d$^6$): δ=6.96 (d, 1H), 6.32 (d, 1H), 6.12 (dd, 1H), 5.22 (s, 2H), 3.98 (t, 2H), 2.63 (t, 2H), 2.23 (s, 3H).

HPLC-MS: Rt 1.96 m/z 215.1 (MH$^+$).

Intermediate 7:
4-amino-2-(2-(dimethylamino)ethoxy)benzonitrile

Obtained as using the procedure described in intermediate 6 but using intermediate 4 as starting compound.

$^1$H-NMR (400 MHz, DMSO-d$^6$): δ=7.23 (d, 1H), 6.24 (d, 1H), 6.17 (dd, 1H), 6.15 (s, 2H), 4.04 (t, 2H), 2.65 (t, 2H), 2.23 (s, 6H).

HPLC-MS: Rt 1.64 m/z 206.1 (MH$^+$).

Intermediate 8: 6-fluoro-5-iodopyridin-2-amine

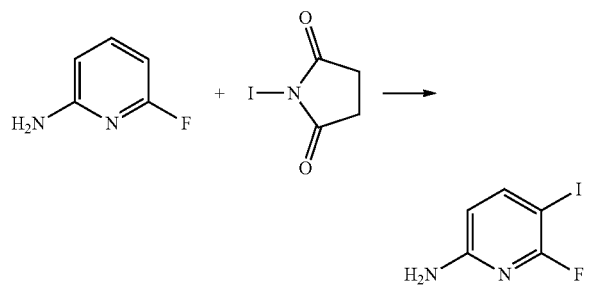

To a solution of 6-fluoropyridin-2-amine (500 mg, 4.46 mmol) in 6 mL of acetic acid, was added gradually N-iodosuccinimide (1003.4 mg, 4.46 mmol) at 0° C. The reaction mixture was stirred overnight at room temperature. The reaction was dried under vacuum and was neutralized with saturated NaHCO$_3$ solution. The aqueous phase was extracted with ethyl acetate for two times. The organic layer was dried with Na$_2$SO$_4$ and concentrated to dryness. The crude was purified by CombiFlash chromatography column (Hexane/Ethyl acetate) in order to obtain the desired intermediate (698.9 mg, 65.8%).

$^1$H-NMR (400 MHz, DMSO-d$^6$): δ=7.74 (t, 1H), 6.54 (s, 2H), 6:19 (dd, 1H).

HPLC-MS: Rt 2.09 m/z 438.9 (MH$^+$).

Intermediate 9: 4-fluoro-5-iodopyridin-2-amine

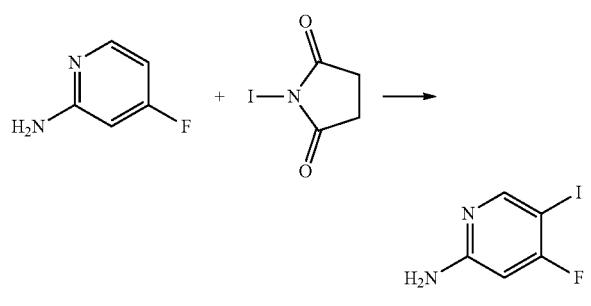

4-fluoropyridin-2-amine (1000 mg, 8.92 mmol) was solved in 10 mL of anhydrous acetonitrile. N-iodosuccinimide (2207.5 mg, 9.81 mmol) and 0.34 mL of trifluoroacetic acid were added slowly at 0° C. The reaction mixture was stirred for 3 hours at room temperature. The mixture was partitioned between ethyl acetate and water. The organic layer was dried with Na$_2$SO$_4$ and concentrated to dryness. The residue was purified by CombiFlash chromatography column (Hexane/Ethyl acetate). The solid was washed with diethyl ether obtaining the desired intermediate (1550 mg, 73%).

$^1$H-NMR (400 MHz, DMSO-d$^6$): δ=8.18 (d, 1H), 6.71 (bs, 2H), 6.40 (d, 1H).

HPLC-MS: Rt 1.94 m/z 238.9 (MH$^+$).

Intermediate 10: 4-chloro-5-iodopyrimidin-2-amine

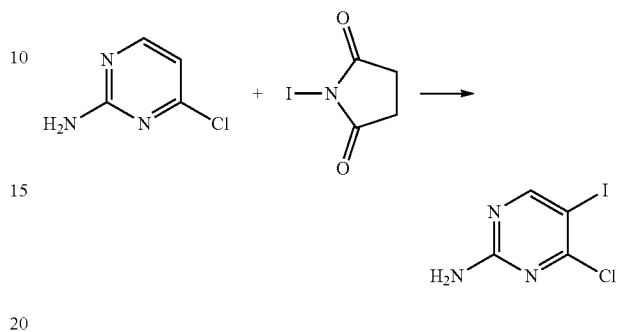

To a solution of 4-chloropyrimidin-2-amine (1000 mg, 7.72 mmol) in 10 mL of anhydrous DMF, was added gradually N-iodosuccinimide (3473 mg, 15.44 mmol) at room temperature. The reaction mixture was stirred overnight at room temperature. The reaction was poured onto cold water (50 mL) and the obtained precipitate was filtered, washed with water, pentane and dried under vacuum. The solid was purified by normal phase chromatography in order to obtain the desired intermediate (1235 mg, 62%).

$^1$H-NMR (400 MHz, DMSO-d$^6$): δ=8.46 (s, 1H), 7.26 (s, 2H).

HPLC-MS: Rt 1.93 m/z 256.0 (MH$^+$).

The Intermediate 11 was synthetized using the procedure above, but using N-bromosuccinimide.

Intermediate 11:
5-bromo-4-chloropyrimidin-2-amine $^1$H-NMR (400 MHz, DMSO-d$^6$): δ=8.41 (s, 1H), 7.34 (s, 2H).

HPLC-MS: Rt 1.87 m/z 209.8 (MH$^+$).

Intermediate 12:
2-amino-4-chloropyrimidine-5-carbonitrile

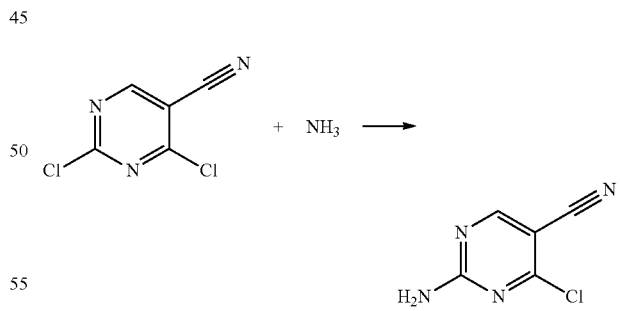

To a solution of 2,4-dichloropyrimidine-5-carbonitrile (500 mg, 2.87 mmol) in 5 mL of ethanol, were added ammonia solution 2M in ethanol (5 mL, 10.06 mmol). The reaction was stirred at room temperature for 30 min. The precipitate formed was filtered and washed with ethanol to obtain 320 mg 360 mg (72%) of 2-amino-4-chloropyrimidine-5-carbonitrile as a white solid.

$^1$H-NMR (400 MHz, DMSO-d$^6$): δ=8.68 (s, 1H), 8.24 (s, 2H).

HPLC-MS: Rt 1.41 m/z: 154.9 (MH$^+$).

Intermediate 13: 2-amino-4-(2-(dimethylamino)ethoxy)pyrimidine-5-carbonitrile

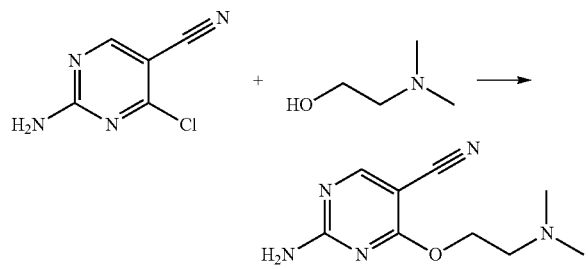

To a solution of 2-(dimethylamino)ethan-1-ol (0.486 ml, 4.85 mmol) in 8 mL of anhydrous THF, were added potassium bis(trimethylsilyl) amide, solution 1M in THF (6.47 mL, 6.47 mmol) and 2-amino-4-chloropyrimidine-5-carbonitrile (500 mg, 3.23 mmol) dissolved in anhydrous THF (5 mL). The reaction was stirred at room temperature overnight. The mixture was partitioned between ethyl acetate and water and was washed with brine.

The organic layer was dried with sodium sulphate and was concentrated to dryness obtaining 360 mg (53%) of 2-amino-4-(2-(dimethylamino)ethoxy)pyrimidine-5-carbonitrile as a yellow solid.

$^1$H-NMR (400 MHz, DMSO-d$^6$): δ=8.44 (s, 1H), 7.68 (d, 2H), 4.43 (t, 2H), 2.61 (t, 2H), 2.20 (s, 6H).

HPLC-MS: Rt 1.43 m/z: 208.1 (MH$^+$).

Intermediate 14: tert-butyl N-(tert-butoxycarbonyl)-N-(4-fluoro-5-iodopyridin-2-yl)carbamate

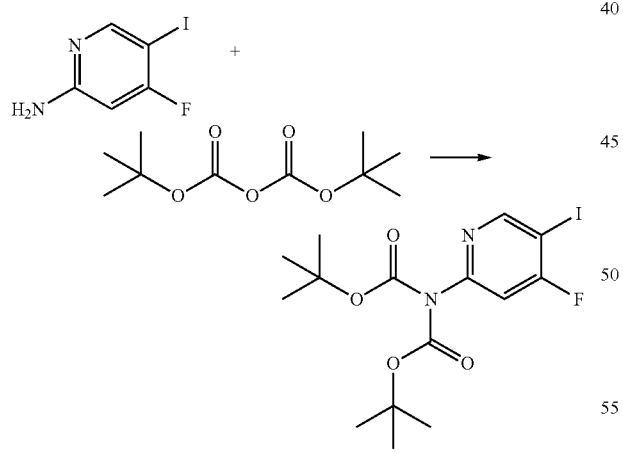

In a round bottom flask with 4-fluoro-5-iodopyridin-2-amine (1500 mg, 6.30 mmol) in 15 mL of THF, were added triethylamine (2.6 mL, 18.91 mmol), DMAP (84.7 mg, 0.69 mmol) and di-tert-butyl decarbonate (3438.8 mg, 15.76 mmol). The mixture was stirred at 40° for three hours. The mixture was partitioned between ethyl acetate and saturated NaHCO$_3$ solution. The organic phase was dried with Na$_2$SO$_4$ and concentrated to dryness. The residue was purified by CombiFlash chromatography column (Hexane/Ethyl acetate). The solid was washed with diethyl ether obtaining the desired intermediate (1400 mg, 50%).

$^1$H-NMR (400 MHz, DMSO-d$^6$): δ=8.79 (d, 1H), 7.57 (d, 1H), 1.40 (s, 18H).

HPLC-MS: Rt 3.39 m/z 439.1 (MH$^+$).

Intermediate 15: 6-amino-4-fluoronicotirionitrile

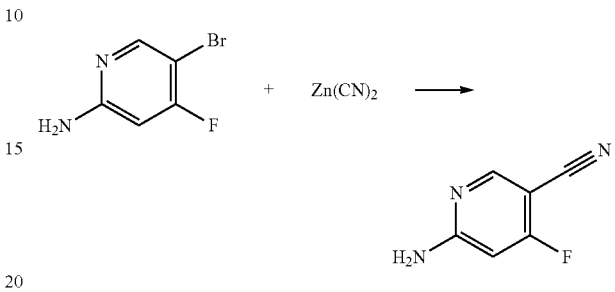

5-bromo-4-fluoropyridin-2-amine (400 mg, 2.10 mrnol), zinc cyanide (257 mg, 2.19 mmol), Tris(dibenzylideneacetone)dipalladium(0) (Pd$_2$(dba)$_3$) (96 mg, 0.105 mmol) and 1,1'-Ferrocenediyl-bis(diphenylphosphine) (dppf) (116 mg, 0.21 mmol) in dry DMF (8 ml) were degassed. The mixture was stirred at 120° C. over night. The reaction mixture was diluted with saturated aqueous NaHCO$_3$, extracted with EtOAc (4 times), the combined EtOAc layers were dried over Na$_2$SO$_4$, filtered and concentrated. The residue was purified by flash chromatography using Hexane/EtOAc (3/1) as eluent, to give 6-amino-4-fluoronicotinonitrile (192 mg, 67% Yield).

$^1$H-NMR (400 MHz, DMSO-d$^6$): δ=8.39 (d, 1H), 7.40 (s, 2H), 6.31 (d, 1H).

HPLC-MS: Rt 1.39 m/z 138.0 (MH$^+$).

The Intermediate 16 was synthetized using the procedure above, but using 5-bromo-6-fluoropyridin-2-amine.

Intermediate 16: 6-amino-2-fluoronicotinonitrile $^1$H-NMR (400 MHz, DMSO-d$^6$): δ=7.82 (t, 1H), 7.54 (s, 2H), 6.38 (dd, 1H).

HPLC-MS: Rt 1.51 m/z 138.0 (MH$^+$).

Intermediate 17: 6-amino-4-(2-(dimethylamino)ethoxy)nicotinonitrile

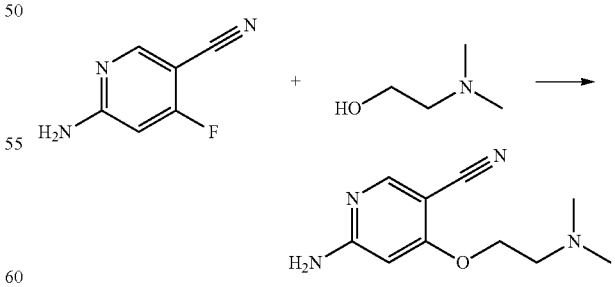

A solution of potassium bis(trimethylsilyl) amide solution 1M in THF (4.00 ml, 4.00 mmol) was added to a solution of 2-(dimethylamino)ethan-1-ol (0.20 ml, 2.00 mmol) in dry THF (5 ml) at rt. After 2 minutes 6-amino-4-fluoronicotinonitrile (250 mg, 1.82 mmol) was added and the reaction mixture stirred for 16 h at rt. The mixture was partitioned between saturated aqueous NH₄Cl and EtOAc, extracted with EtOAc(3×), the combined EtOAc layers were washed with brine, dried over Na₂SO₄, filtered and concentrated. The residue was purified by flash chromatography using DCM/MeOH (93/7) as eluent, to give 6-amino-4-(2-(dimethylamino)ethoxy)nicotinonitrile (211.3 mg, 56.3% Yield).

¹H-NMR (400 MHz, DMSO-d⁶): δ=8.13 (s, 1H), 6.90 (s, 2H), 6.04 (s, 1H), 4.11 (t, 2H), 2.65 (t, 2H), 2.22 (s, 6H).

HPLC-MS: Rt 1.48 m/z 207.1 (MH⁺).

The Intermediate 18 was synthetized using the procedure above, but using 6-amino-2-fluoronicotinonitrile.

Intermediate 18:
6-amino-2-(2-(dimethylamino)ethoxy)nicotinonitrile

¹H-NMR (400 MHz, DMSO-d⁶): δ=7.59 (d, 1H), 7.04 (s, 2H), 6.05 (d, 1H), 4.35 (t, 2H), 2.59 (t, 2H), 2.20 (s, 6H).

HPLC-MS: Rt 1.58 m/z 207.1 (MH⁺).

Intermediate 19: 5-bromo-4-(2-(dimethylamino)ethoxy)pyrimidin-2-amine

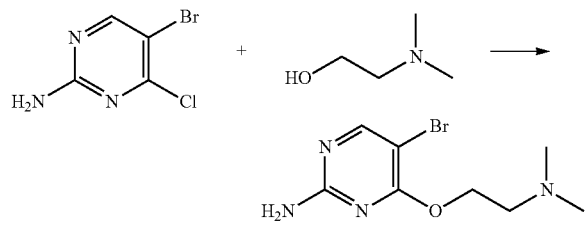

A solution of potassium bis(trimethylsilyl) amide solution 1M in THF (6.33 ml, 6.33 mmol) was added to a solution of 2-(dimethylamino)ethan-1-ol (0.32 ml, 3.15 mmol) in dry THF (12 ml) at rt. After 2 minutes 5-bromo-4-chloropyrimidin-2-amine (600 mg, 2.87 mmol) was added and the reaction mixture stirred for 16 h at rt. The mixture was partitioned between saturated aqueous NH₄Cl and EtOAc, extracted with EtOAc(3×), the combined EtOAc layers were washed with brine, dried over Na₂SO₄, filtered and concentrated. The residue was purified by flash chromatography using DCM/MeOH (93/7) as eluent, to give 5-bromo-4-(2-(dimethylamino)ethoxy)pyrimidin-2-amine (533 mg, 71% yield).

¹H-NMR (400 MHz, DMSO-d⁶): δ=8.09 (s, 1H), 6.79 (s, 2H), 436 (t, 2H), 2.60 (t, 2H), 2.21 (s, 6H).

HPLC-MS: Rt 1.78 m/z 262.9 (MH⁺).

Intermediate 20: methyl 4-bromo-3-(2-(dimethylamino)ethoxy)benzoate

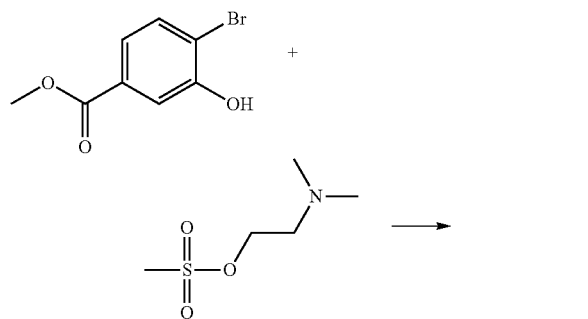

Methyl 2-bromophenol-5-carboxylate (1000 mg, 4.33 mmol), caesium carbonate (2115.2 mg, 6.49 mmol) and 2-(dimethylamino)ethyl methanesulfonate (1457.4 mg, 4.33 mmol) in 30 mL of dry 1,4-dioxane were stirred at 90° C. overnight. The dioxane was remove under vacuum and saturated NaHCO₃ was added. The mixture was extracted with dichloromethane and the organic phase was dried, concentrated and purified by CombiFlash chromatography column (DCM/MeOH) yielding 958.5 mg (73.3%) of methyl 4-bromo-3-(2-(dimethylamino)ethoxy)benzoate.

¹H-NMR (400 MHz, DMSO-d⁶): δ=7.74 (d, 1H), 7.55 (d, 1H), 7.46 (dd, 1H), 4.20 (t, 2H), 3.86 (s, 3H), 2.69 (t, 2H), 2.25 (s, 6H).

HPLC-MS: Rt 2.63 m/z 304.1 (MH⁺).

Intermediate 21:
4-bromo-3-(2-(dimethylamino)ethexy)benzoic acid

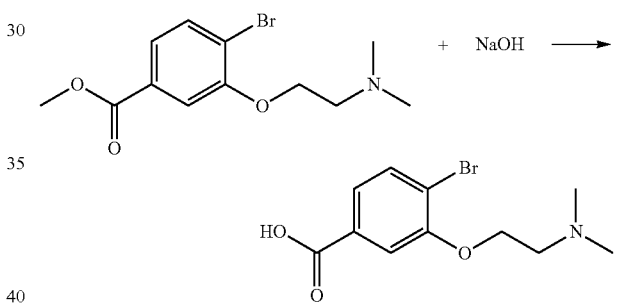

Methyl 4-bromo-3-(2-(dimethylamino)ethoxy)benzoate (405 mg, 1.34 mmol) was solved in 10 mL of THF and 8 mL of methanol and 6.7 mL (6.7 mmol) of NaOH 1M were added. The reaction was stirred at room temperature for three hours. The solvents were removed under reduced pressure, and the aqueous phase was acidified with HCl 1M to pH=4. The aqueous layer was concentrated to dryness. The residue was suspended in DCM/MeOH 20% and was filtrated. The filtrate was concentrated under vacuum to obtain the acid derivative (366.9 mg, 95.02%).

¹H-NMR (400 MHz, DMSO-d⁶): δ=7.71 (d, 1H), 7.57 (d, 1H), 7.47 (dd, 1H), 4.38 (t, 2H), 3.15 (t, 2H), 2.59 (s, 6H).

HPLC-MS: Rt 1.39 m/z 288.1 (MH⁺).

Intermediate 22: methyl 4-cyano-3-hydroxybenzoate

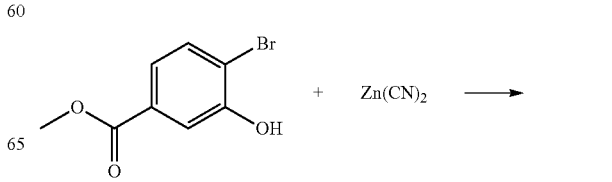

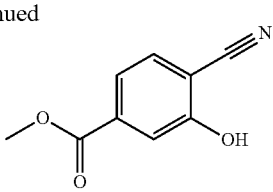

Methyl 4-bromo-3-hydroxybenzoate (200 mg, 0.87 mmol), Zinc cyanide (112 mg, 0.95 mmol), [1,1'-bis(diphenylphosphino)ferrocene]dichloropalladium(II) (42 mg, 0.05 mmol) were suspended in anhydrous dimethylformamide (2mL) in a sealed tube. The reaction mixture was degassed with nitrogen and stirred at 120° C. for 16 hours. The reaction was filtered through Celite eluting ethyl acetate and the filtrate was washed with H$_2$O and brine. The organic phase was dried with Na$_2$SO$_4$ and evaporated to dryness. The obtained solid was purified by normal phase chromatography to afford methyl 4-cyano-3-hydroxybenzoate as a pale brown solid (120 mg, 78%).

$^1$H-NMR (400 MHz, DMSO-d$^6$): δ=11.58 (s, 1H), 7.77 (d, 1H), 7.56 (s, 1H), 7.45 (d, 1H), 3.86 (s, 3H).

HPLC-MS: Rt 1.26 m/z 178.0 (MH$^+$).

Intermediate 23: methyl 4-cyano-3-(2-(dimethylamino)ethoxy)benzoate

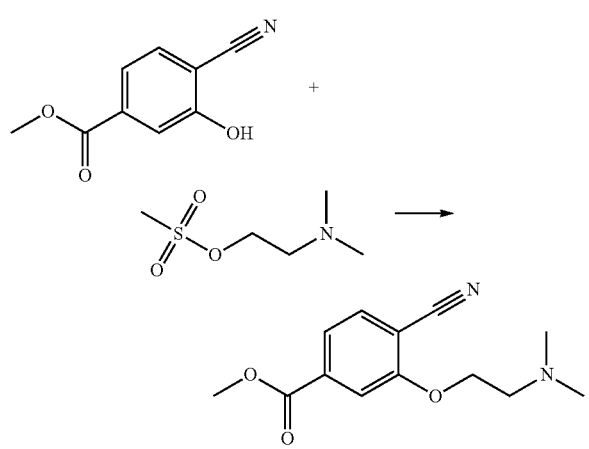

To a solution of methyl 4-cyano-3-hydroxybenzoate (200 mg, 1.13 mmol) and caesium carbonate (551 mg, 1.69 mmol) in 7 mL of dry 1,4-dioxane was added 2-(dimethylamino)ethyl methanesulfonate (377 mg, 2.26 mmol). The suspension was stirred for 5 hours at 100° C. in a sealed tube. The reaction mixture was evaporated, and the residue was partitioned between dichloromethane and saturated NaHCO$_3$. The organic phase was dried with Na$_2$SO$_4$ and evaporated to dryness. The residue was purified by normal phase chromatography obtaining methyl 4-cyano-3-(2-(dimethylamino)ethoxy)benzoate as a pale yellow solid (260 mg, 93%).

$^1$H-NMR (400 MHz, DMSO-d$^6$): δ=7.89 (d, 1H), 7.68 (d, 1H), 7.62 (dd, 1H), 4.30 (t, 2H), 3.89 (s, 3H), 2.69 (t, 2H), 2.24 (s, 6H).

HPLC-MS: Rt 2.19 m/z 249.2 (MH$^+$).

Intermediate 24: 4-cyano-3-(2-(dimethylamino)ethoxy)benzoic acid

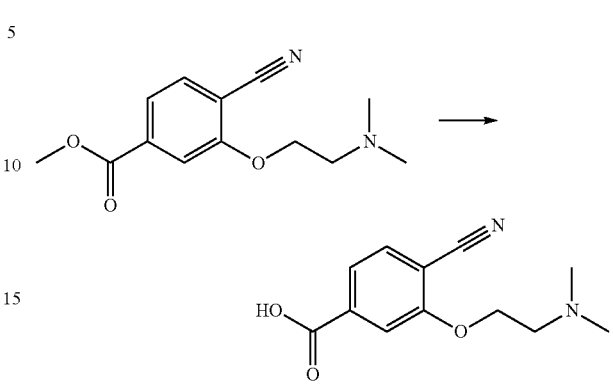

To a solution of methyl 4-cyano-3-(2-(dimethylamino)ethoxy)benzoate (1020 mg, 4.11 mmol) in tetrahydrofuran (20 mL), was added aqueous NaOH 1M (12.32 mL, 12.32 mmol). The solution was stirred at room temperature for 16 h. The reaction mixture was diluted with aqueous NaOH 0.1M (5 mL) and the tetrahydrofuran was evaporated. The pH of the aqueous phase was adjusted to 3 and evaporated to dryness. The residue was suspended in dichloromethane-MeOH (8:2) and was filtered. The filtrate was evaporated to dryness and the solid obtained was washed with diethyl ether-methanol (4:1) to afford 4-cyano-3-(2-(dimethylamino)ethoxy)benzoic acid as a white solid (860 mg, 88%).

$^1$H-NMR (400 MHz, DMSO-d$^6$): δ=7.86 (d, 1H), 7.68 (s, 1H), 7.63 (d, 1H), 4.52 (t, 2H), 3.28 (t, 2H), 2.67 (s, 6H).

HPLC-MS: Rt 1.16 m/z 235.1 (MH$^+$).

Intermediate 25: 4-amino-3-bromoberizonitrile

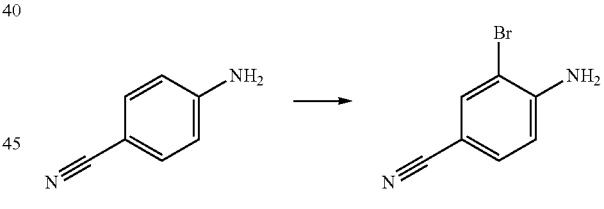

To a solution of 4-aminobenzonitrile (1500 mg, 12.70 mmol) in DMF (15 mL) was added NBS (2757 mg, 15.49 mmol). The reaction mixture was stirred at room temperature for 30 min and extracted with EtOAc. The organic layer was washed with water and brine, dried over sodium sulphate, and concentrated in vacua. Purification of the residue by normal phase chromatography afforded 4-amino-3-bromobenzonitrile (1726 mg, 69%).

$^1$H-NMR (400 MHz, DMSO-d$^6$): δ=7.82 (d, 1H), 7.45 (dd, 1H), 6.81 (d, 1H), 6.36 (s, 2H).

HPLC-MS: Rt 2.08 m/z: 198.94 (MH$^+$).

Intermediate 26: 4-amino-3-chlorobenzonitrile

Obtained as using the procedure described in intermediate 25 but using N-chlorosuccinimide in ACN at 90° C. for 3 h.

$^1$H-NMR (400 MHz, DMSO-d$^6$): δ=7.69 (d, 1H), 7.41 (dd, 1H), 6.82 (d, 1H), 6.42 (s, 2H).

HPLC-MS: 2.01 m/z 152.9 Rt (MH$^+$).

Intermediate 27: 4-amino-3-cyclopropylbenzonitrile

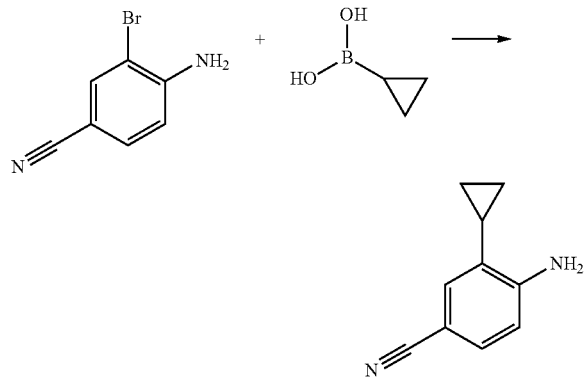

A solution of 600 mg (3.05 mmol) of 4-amino-3-bromobenzonitrile, cyclopropylboronic acid (523 mg, 6.09 mmol), paliadium(II)acetate (68.4 mg, 0.3 mmol), tricyclohexylphosphine (170.8 mg, 0.61 mmol) and potassium phosphate (1939 mg, 9.14 mmol) in 17 mL of toluene and 1.7 mL of H2O was degassed with N2 and stirred at 90° C. for 16 hours. The reaction mixture was filtered through celite, eluted with EtOAc and the filtrate was washed with NaOH 1M, NaHCO$_3$ saturated and brine. The organic layer was collected, dried with sodium sulphate and the solvent was removed under reduced pressure. The crude was purified by normal phase chromatography column (Hexane/Ethyl Acetate) to obtain 4-amino-3-cyclopropylbenzonitrile (350 mg, 72%).

$^1$H-NMR (400 MHz, DMSO-d$^6$): δ=7.27 (dd, 1H), 7.14 (d, 1H), 6.65 (d, 1H), 6.04 (s, 2H), 1.62 (m, 1H), 0.86 (m, 2H), 0.52 (m, 2H).

HPLC-MS: Rt 2.19 m/z: 159.06 (MH$^+$).

Intermediate 28: 4-bromo-3-cyclopropylbenzonitrile

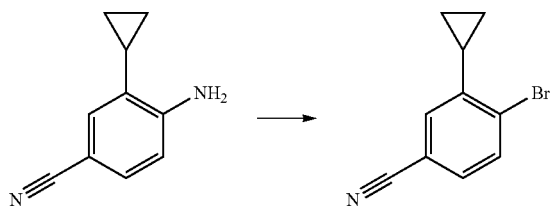 [SMILES: N#Cc1ccc(N)c(C2CC2)c1 ; N#Cc1ccc(Br)c(C2CC2)c1]

To a solution of 4-amino-3-cyclopropylbenzonitrile (350 mg, 2.21 mmol) in anhydrous acetonitrile (10 mL) at 0° C. was added dropwise isopentyl nitrite (0.414 mL, 3.10 mmol). The reaction mixture was stirred for 10 min and copper (II) bromide (622 mg, 2.79 mmol) was added. The reaction mixture was stirred at room temperature for 16 h. The mixture was distributed between EtOAc and HCl (1M). The organic layer was collected, dried with sodium sulphate and the solvent was removed under reduced pressure. The crude was purified by normal phase chromatography (Hexane/EtOAc) to obtain 4-bromo-3-cyclopropylbenzonitrile (410 mg, 82%).

$^1$H-NMR (400 MHz, DMSO-d$^6$): δ=7.81 (d, 1H), 7.55 (m, 1H), 7.49 (d, 1H), 2.13 (m, 1H), 1.04 (m, 2H), 0.82 (m, 2H).
HPLC-MS: Rt 3.01 m/z: 222.10 (MH$^+$).

Intermediate 29: 4-bromo-3-chlorobenzonitrile

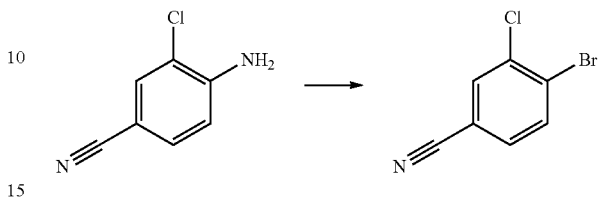

To a solution of 4-amino-3-chlorobenzonitrile (750 mg, 4.92 mmol) in anhydrous acetonitrile (25 mL) at 0° C. was added dropwise isopentyl nitrite (0.92 mL, 6.88 mmol). The reaction mixture was stirred for 10 min and copper (II) bromide (1383 mg, 6.19 mmol) was added. The reaction mixture was stirred at room temperature for 16 h. The mixture was distributed between EtOAc and HCl (1M). The organic layer was collected, dried with sodium sulphate and the solvent was removed under reduced pressure. The crude was purified by normal phase chromatography (Hexane/EtOAc) to obtain 4-bromo-3-chlorobenzonitrile (800 mg, 75%).

$^1$H-NMR (400 MHz, DMSO-d$^6$): δ=8.26 (d, 1H), 8.01 (d, 1H), 7.77 (dd, 1H).

Intermediate 30: 4-bromo-3-cyclopropyl-N-hydroxybenzimidamide

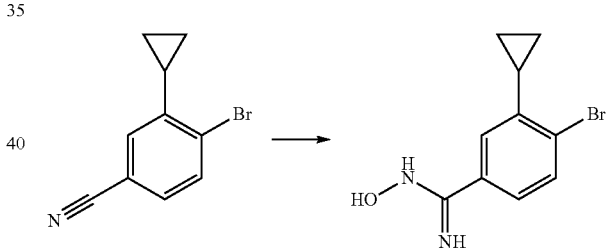

To a sealed tube with 4-bromo-3-cyclopropylbenzonitrile (850.6 mg, 3.83 mmol), hydroxylamine hydrochloride (478 mg, 6.89 mmol) in 15 mL of ethanol, was added triethylamine (0.959 mL, 6.89 mmol). The reaction mixture was stirred at 80° C. for 16 hours. The reaction mixture was concentrated under reduce pressure and the residue was triturated in water for 30 min. The solid obtained was filtered and dried to obtain a white solid (764.6 mg, 92%).

$^1$H-NMR (400 MHz, DMSO-d$^6$): δ=9.69 (s, 1H), 7.56 (d, 1H), 7.40 (dd, 1H), 7.24 (d, 1H), 5.88 (s, 1H), 2.11 (m, 1H), 1.01 (m, 2H), 0.74 (m, 2H).
HPLC-MS: Rt 2.26 m/z: 255.02 (MH$^+$).

Intermediate 31: (Z)-4-bromo-3-fluoro-N'-hydroxybenzimidamide

Obtained as using the procedure described in intermediate 30 but using 4-bromo-3-fluorobenzonitrile as starting compound.

$^1$H-NMR (400 MHz, DMSO-d$^6$): δ=9.89 (s, 1H), 7.71 (t, 1H), 7.61 (dd, 1H), 7.49 (dd, 1H), 5.97 (s, 2H).
HPLC-MS: Rt 1.88 m/z 232.9 (MH$^+$).

Intermediate 32: 4-bromo-3-chloro-N-hydroxybenzimidamide

Obtained as using the procedure described in intermediate 30 but using 4-bromo-3-chlorobenzonitrile as starting compound.

$^1$H-NMR (400 MHz, DMSO-d$^6$): δ=9.90 (s, 1H), 7.87 (d, 1H), 7.77 (d, 1H), 7.57 (dd, 1H), 5.98 (s, 3H).

HPLC-MS: Rt 2.08 m/z 250.9 (MH$^+$).

Intermediate 33: 4-bromo-N-hydroxy-3-(trifluoromethyl)benzimidamide

Obtained as using the procedure described in intermediate 30 but using 4-bromo-3-(trifluoromethyl)benzonitrile as starting compound.

$^1$H-NMR (400 MHz, DMSO-d$^6$): δ=9.97 (s, 1H), 8.09 (d, 1H), 7.91 (d, 1H), 7.86 (dd, 1H), 6.08 (s, 2H).

HPLC-MS: Rt 2.24 m/z 282.9 (MH$^+$).

Intermediate 34: (Z)-4-bravo-N'-hydroxy-3-methoxybenzimidamide

Obtained as using the procedure described in intermediate 30 but using 4-bromo-3-methoxybenzonitrile as starting compound.

$^1$H-NMR (400 MHz, DMSO-d$^6$): δ=9.75 (s, 1H), 7.56 (d, 1H), 7.36 (d, 1H), 7.21 (dd, 1H), 5.95 (s, 2H), 3.87 (s, 3H).

HPLC-MS: Rt 1.83 m/z 246.9 (MH$^+$).

Intermediate 35: 4-amino-3-bromo-N-hydroxybenzinnidamide

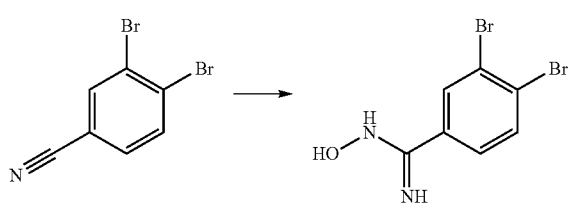 [SMILES: N#Cc1ccc(Br)c(Br)c1 ; N=C(NO)c1ccc(Br)c(Br)c1]

4-amino-3-bromobenzonitrile (1000 mg, 5.08 mmol) and sodium carbonate (349 mg, 3.3 mmol) in Etanol/water (4.5 mL/1.6 mL) were heated to 60° C. Then, Hydroxylamine hydrochloride (423 mg, 6.09 mmol) dissolved in 1.6 mL of water was slowly added dropwise at 60° C. The reaction mixture was stirred at 60° C. for 16 h. The mixture was cooled and concentrated to dryness. The reaction crude was distributed between EtOAc/H$_2$O and the organic layer was collected, dried with sodium sulphate and the solvent was removed under reduced pressure. The crude was triturated in cold Et$_2$O to obtain 4-amino-3-bromo-N-hydroxybenzimidarnide (500 mg, 43%).

$^1$H-NMR (400 MHz, DMSO-d$^6$): δ=9.36 (s, 1H), 7.64 (d, 1H), 7.38 (dd, 1H), 6.74 (d, 1H), 5.66 (s, 2H), 5.51 (s, 2H).

HPLC-MS: Rt 1.23 m/z: 229.9 (MH$^+$).

Intermediate 36: 3-(4-bromo-3-cyclopropylphenyl)-5-methyl-1,2,4-oxadiazole

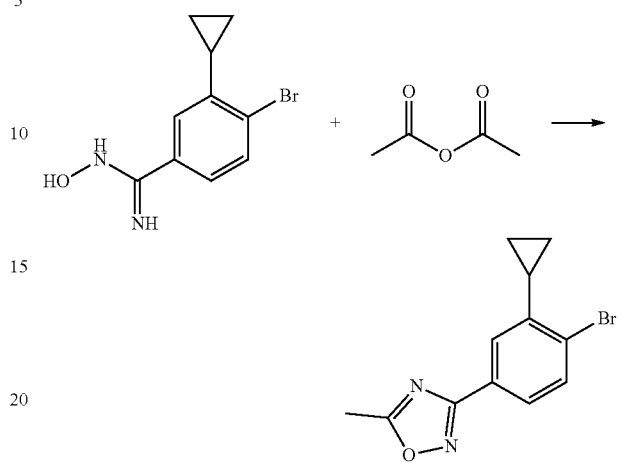

A solution of 500 mg (2 mmol) of 4-bromo-3-cyclopropyl-N-hydroxybenzimidamide in 1.4 of acetic anhydride were stirred for 16 hours at 80° C. The reaction mixture was poured over cold water and was filtered. The crude was purified by CombiFlash chromatography column (Hexane/Ethyl Acetate) to afford the desired intermediate (336.5 mg, 61.5%).

$^1$H-NMR (400 MHz, DMSO-d$^6$): δ=7.78 (d, 1H), 7.70 (dd, 1H), 7.53 (m, 1H), 2.66 (s, 3H), 2.16 (m, 1H), 1.08 (m, 2H), 0.74 (m, 2H).

HPLC-MS: Rt 3.24 m/z: 279.03 (MH$^+$).

Intermediate 37: 3-(4-bromo-3-fluorophenyl)-5-methyl-1,2,4-oxadiazole

Obtained as using the procedure described in intermediate 36 but using 4-bromo-3-fluoro-N-hydroxybenzimidamide as starting compound.

$^1$H-NMR (400 MHz, DMSO-d$^6$): δ=7.92 (m, 1H), 7.86 (dd, 1H), 7.76 (dd, 1H), 2.68 (s, 3H).

HPLC-MS: Rt 2.89 m/z 256.9 (MH$^+$).

Intermediate 38: 3-(4-bromo-3-chlorophenyl)-5-methyl-1,2,4-oxadiazole

Obtained as using the procedure described in intermediate 36 but using 4-bromo-3-chloro-N-hydroxybenzimidamide as starting compound.

$^1$H-NMR (400 MHz, DMSO-d$^6$): δ=8.11 (d, 1H), 7.98 (d, 1H), 7.85 (dd, 1H), 2.68 (s, 3H).

HPLC-MS: Rt 3.13 m/z 274.9 (MH$^+$).

Intermediate 39: 3-(4-bromo-3-(trifitioromethyl)phenyl)-5-methyl-1,2,4-oxadiazole Obtained as using the procedure described in intermediate 36 but using 4-bromo-N-hydroxy-3-(trifluoromethyl)benzimidamide as starting compound.

$^1$H-NMR (400 MHz, DMSO-d$^6$): δ=8.27 (d, 1H), 8.16 (dd, 1H), 8.11 (d, 1H), 2.70 (s, 3H).

HPLC-MS: Rt 3.14 m/z 306.9 (MH$^+$).

Intermediate 40: 3-(4-bromo-3-methoxyphenyl)-5-methyl-1,2,4oxadiazole

Obtained as using the procedure described in intermediate 36 but using 4-bromo-N-hydroxy-3-methoxybenzimidamide as starting compound.

¹H-NMR (400 MHz, DMSO-d⁶): δ=7.78 (d, 1H), 7.59 (d, 1H), 7.51 (dd, 1H), 3.94 (s, 3H), 2.68 (s, 3H).

HPLC-MS: Rt 2.76 m/z 269.0 (MH⁺).

Intermediate 41: 2-bromo-4-(5-methyl-1,2,4-oxadiazol-3-yl)aniline

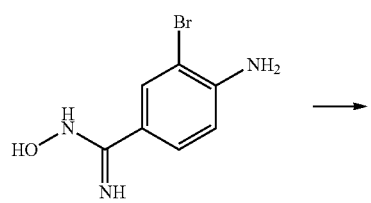

To a solution of 4-amino-3-bromo-N-hydroxybenzimidamide (490 mg, 2.13 mmol) in anhydrous dimethylsulfoxide (3 mL) was added Ethyl Acetate (0.312 mL, 3.19 mmol) and powdered NaOH (127 mg, 3.19 mmol). The reaction mixture was stirred at room temperature for 16 h. The mixture was added to cold water (30 mL) and the resulting precipitate was filtered off, washed with water and dried. The crude was purified by normal phase chromatography (Hexane/EtOAc) to obtain 2-bromo-4-(5-methyl-1,2,4-oxadiazol-3-yl)aniline (362 mg, 67%).

¹H-NMR (400 MHz, DMSO-d⁶): δ=7.90 (d, 1H), 7.67 (dd, 1H), 6.88 (d, 1H), 5.99 (s, 2H), 2.60 (5, 3H).

HPLC-MS: Rt 2.31 m/z 255.9 (MH⁺).

Intermediate 42: 2-amino-5-(5-methyl-1,2,4-oxadiazol-3-yl)benzonitrile

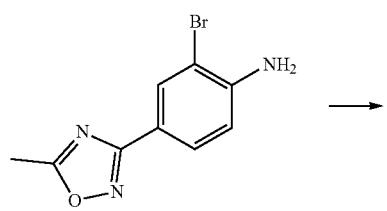

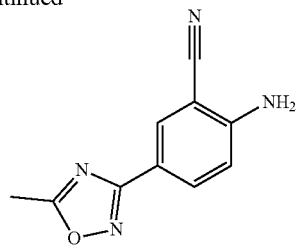

2-bromo-4-(5-methyl-1,2,4-oxadiazol-3-yl)aniline (950 mg, 3.74 mmol), Zinc cyanide (307 mg, 2.62 mmol), Pd2(dba)3 (171 mg, 0.19 mmol), Zinc dust (171 mg, 3.74 mmol), dppf (207 mg, 0.37 mmol) were suspended in anhydrous acetonitrile (15 mL) in a sealed tube. The reaction mixture was degassed with nitrogen and stirred at 85° C. for 24 hours. The reaction was filtered through Celite, eluted with EtOAc and the filtrate was washed with NH4OH (ag)/NH4Cl (sat) (1:1) and brine. The organic phase was dried with anhydrous Na₂SO₄ and evaporated to dryness. The obtained solid was purified by normal phase chromatography to afford 2-amino-5-(5-methyl-1,2,4-oxadiazol-3-yl)benzonitrile as a pale brown solid (320 mg, 42%).

¹H-NMR (400 MHz, DMSO-d⁶): δ=7.92 (d, 1H), 7.86 (dd, 1H), 6.90 (d, 1H), 6.73 (s, 2H), 2.61 (s, 3H).

HPLC-MS: Rt 1.93 m/z 201.0 (MH⁺).

Intermediate 43: 2-bromo-5-(5-methyl-1,2,4-oxadiazol-3-yl)benzonitrile

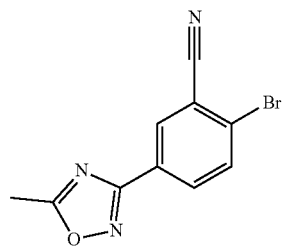

To a solution of 2-amino-5-(5-methyl-1,2,4-oxadiazol-3-yl)benzonitrile (936 mg, 4.68 mmol) in anhydrous acetonitrile (30 mL) at 0° C. was added dropwise isopentyl nitrite (0.875 mL, 6.55 mmol). The reaction mixture was stirred for 10 min and copper (II) bromide (1315 mg, 5.89 mmol) was added. The reaction mixture was stirred at room temperature for 16 h. The mixture was distributed between EtOAc and HCl (1M). The organic layer was collected, dried with sodium sulphate and the solvent was removed under reduced pressure. The crude was purified by normal phase chromatography (Hexane/EtOAc) to obtain 2-bromo-5-(5-methyl-1,2,4-oxadiazol-3-yl)benzonitrile (710 mg, 57%).

Obtained as using the procedure described in intermediate 36 but using 4-bromo-3-cyano-N-hydroxybenzimidamide as starting compound.

$^1$H-NMR (400 MHz, DMSO-d$^6$): δ=8.42 (d, 1H), 8.17 (dd, 1H), 8.08 (d, 1H), 2.69 (s, 3H).
HPLC-MS: Rt 2.59 m/z 265.9 (MH$^+$).

Intermediate 44: 3-(3-cyclopropyl-4-(4,4,5,5-tetramethyl-1,3,2-dioxaborolan-2-yl)phenyl)-5-methyl-1,2,4-oxadiazole

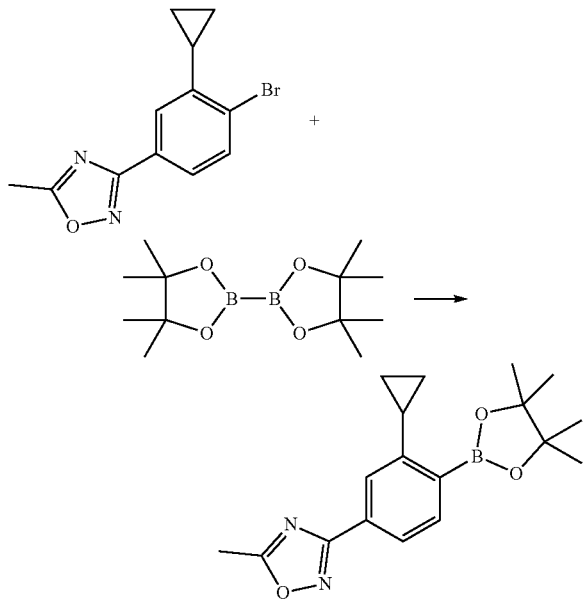

A solution of 3-(4-bromo-3-cyclopropylphenyl)-5-methyl-1,2,4-oxadiazole (553 mg, 1.98 mmol), 4,4,4',4',5,5,5',5'-octamethyl-2,2'-bi(1,3,2-dioxaborolane) (602.0 mg, 2.37 mmol), [1,1'-Bis(diphenylphosphino)-ferrocene]dichloro palladium(II) (80.7 mg, 0.10 mmol), and potassium acetate (581.6 mg, 5.93 mmol) in dioxane (7 mL) was degassed with N$_2$. After the reaction mixture was stirred during 8 hours at 90° C., it was filtered through celite and extracted with ethyl acetate. The organic phase was washed with H$_2$O two times. It was dried over anhydrous sodium sulphate, filtered and concentrated to give a residue that was purified by flash chromatography (hexane:ethyl acetate) and evaporated to afford the product as a yellow solid (540.2 mg, 83.6%).
$^1$H-NMR (400 MHz, DMSO-d$^6$): δ=7.75 (s, 2H), 7.39 (s, 1H), 2.65 (s,3H), 1,33 (s, 12H), 1.16 (d, 1H), 1.02 (q, 2H), 0.69 (q, 2H).
HPLC-MS: Rt 3.46 m/z 327.1 (MH$^+$).

Intermediate 45: 3-(3-fluoro-4-(4,4,5,5-tetramethyl-1,3,2-dioxaborolan-2-yl)phenyl)-5-methyl-1,2,4-oxadiazole Obtained as using the procedure described in intermediate 44 but using precursor 37 as starting compound.
$^1$H-NMR (400 MHz, DMSO-d$^6$): δ=7.84 (m, 2H), 7.67 (d, 1H), 2.68 (s, 3H), 1.32 (s, 12H).
HPLC-MS: Rt 1.13 m/z 223.1 (MH$^+$).

Intermediate 46: 3-(3-chloro-4-(4,4,5,5-tetramethyl-1,3,2-dioxaborolan-2-yl)phenyl)-5-methyl-1,2,4-oxadiazole Obtained as using the procedure described in intermediate 44 but using precursor 38 as starting compound.
$^1$H-NMR (400 MHz, DMSO-d$^6$): δ=7.96 (d, 1H 7.94 (s, 1H), 7.82 (d, 1H), 2.68 (s, 3H), 1.33 (s, 12H).
HPLC-MS: Rt 3.19 m/z 321.1 (MH$^+$).

Intermediate 47: 5-methyl-3-(4-(4,4,5,5-tetramethyl-1,3,2-dioxaborolan-2-yl)-3-(trifluoromethyl)phenyl)-1,2,4-oxadiazole Obtained as using the procedure described in intermediate 44 but using precursor as starting compound.
$^1$H-NMR (400 MHz, DMSO-d$^6$): δ=8.27 (d, 1H), 8.24 (s, 1H), 7.93 (d, 1H), 2.70 (s, 3H), 1.33 (s, 12H).
HPLC-MS: Rt 3.41 m/z 355.0 (MH$^+$).

Intermediate 48: 3-(3-methoxy-4-(4,4,5,5-tetramethyl-1,3,2-dioxaborolan-2-yl)phenyl)-5-methyl-1,2,4-oxadiazole Obtained as using the procedure described in intermediate 44 but using precursor 40 as starting compound.
$^1$H-NMR (400 MHz, DMSO-d$^6$): δ=7.69 (s, 1H), 7.57 (d, 1H), 7.49 (s, 1H), 3.83 (s, 3H), 2.67 (s, 3H), 1.29 (s, 12H).
HPLC-MS: Rt 1.83 m/z 235.0 (MH$^+$).

Intermediate 49: 5-(5-methyl-1,2,4-oxadiazol-3-yl)-2-(4,4,5,5-tetramethyl-1,3,2-dioxaborolan-2-yl)benzonitrile Obtained as using the procedure described in intermediate 44 but using precursor 43 as starting compound.
$^1$H-NMR (400 MHz, DMSO-d$^6$): δ=8.32 (s, 1H), 8.28 (dd, 1H), 8.01 (d, 1H), 2.70 (s, 3H), 1.34 (s, 12H).

Intermediate 50: 2'-cyclopropyl-4'-(5-methyl-1,2,4-oxadiazol-3-yl)-[1,1'-biphenyl]-4-carboxylic acid

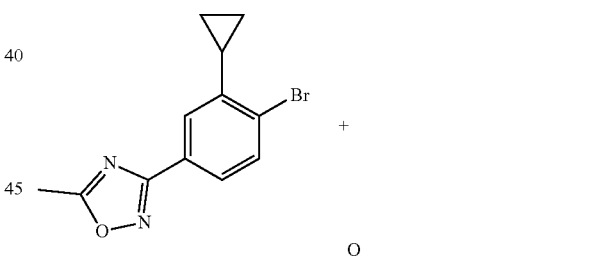

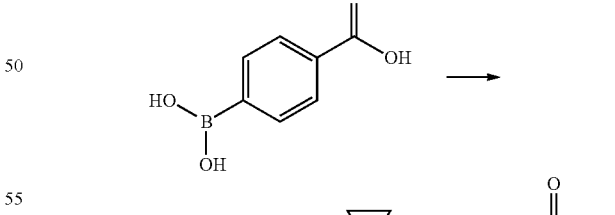

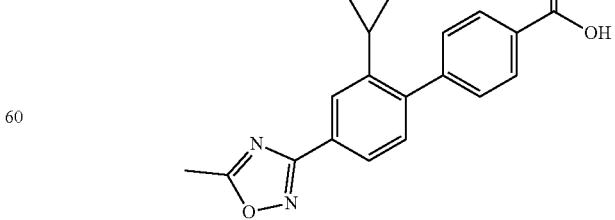

In a sealed tube were mixed 3-(4-brome-3-cyclopropylphenyl)-5-methyl-1,2,4-oxadiazole (441 mg, 1.58 mmol), 4-boronobenzoic acid (262.2 mg, 1.58 mmol), sodium carbonate (703.4 mg, 6.63 mmol) and 1,1'-bis(diphenylphosphino)ferrocene]dichloropalladium(II) (27.4 mg, 0.02 mmol) in 6 mL of DME and 1 mL of H$_2$O. The reaction mixture was degassed with nitrogen and was stirred at 100° C. for 8 hours. The mixture was quenched with HCl 1M to pH=2-3. The solution was extracted with ethyl acetate for two times. The organic layers were collected, dried with Na$_2$SO$_4$ and the ethyl acetate was removed under vacuum. The obtained solid was purified by CombiFlash chromatography column (DCM/MeOH) to afford the desired compound (315.8 mg, 62.4%).

$^1$H-NMR (400 MHz, DMSO-d$^6$): δ=13.05 (s, 1H), 8.04 (d, 2H), 7.87 (dd, 1H), 7.61 (d, 2H), 7.58 (d, 1H), 7.42 (d, 1H), 2.68 (s, 3H), 1.88 (m, 1H), 0.91 (m, 2H), 0.71 (m, 2H).
HPLC-MS: Rt 1.83 m/z 321.17 (MH$^+$).

Intermediate 51: 2'-fluoro-4'-(5-methyl-1,2,4-oxadiazol-3-yl)-[1,1'-biphenyl]-4-carboxylic acid Obtained as using the procedure described in intermediate 50 but using precursor 37 as starting compound.
$^1$H-NMR (400 MHz, DMSO-d$^6$): δ=13.12 (s, 1H), 8.06 (d, 2H), 7.94 (dd, 1H), 7.86 (dd, 1H), 7.79 (t, 1H), 7.74 (d, 2H), 2.69 (s, 3H).
HPLC-MS: Rt 1.68 m/z 299.0 (MH$^+$).

Intermediate 52: 2'-chloro-4'-(5-methyl-1,2,4-oxadiazol-3-yl)-[1,1'-biphenyl]-4-carboxylic acid Obtained as using the procedure described in intermediate 50 but using precursor 38 as starting compound.
$^1$H-NMR (400 MHz, DMSO-d$^6$): δ=13.13 (s, 1H), 8.12 (d, 1H), 8.05 (m, 3H), 7.64 (m, 3H), 2.70 (s, 3H).
HPLC-MS: Rt 1.76 m/z 315.0 (MH$^+$).

Intermediate 53: 4'-(5-methyl-1,2,4-oxadiazol-3-yl)-2'-(trifluoromethyl)-[1,1'-biphenyl]-4-carboxylic acid Obtained as using the procedure described in intermediate 50 but using precursor 39 as starting compound.
$^1$H-NMR (400 MHz, DMSO-d$^6$): δ=13.15 (s, 1H), 8.35 (s, 1H), 8.33 (d, 1H), 8.04 (d, 2H), 7.66 (d, 1H), 7.51 (d, 2H), 2.72 (s, 3H).
HPLC-MS: Rt 1.86 m/z 349.0 (MH$^+$).

Intermediate 54: 2'-methoxy-4'-(5-methyl-1,2,4-oxadiazol-3-yl)-[1,1'-biphenyl]-4-carboxylic acid Obtained as using the procedure described in intermediate 50 but using precursor 40 as starting compound.
$^1$H-NMR (400 MHz, DMSO-d$^6$): δ=12.91 (s, 1H), 8.00 (d, 2H), 7.70 (dd, 1H), 7.66 (m, 3H), 7.53 (d, 1H), 3.88 (s, 3H), 2.89 (s, 3H).
HPLC-MS: Rt 1.63 m/z 311.0 (MH$^+$).

Intermediate 55: 2'-cyano-4'-(5-methyl-1,2,4-oxadiazo -yl)-[1,1'-biphenyl]-4-carboxylic acid Obtained as using the procedure described in intermediate 50 but using precursor 43 as starting compound.
$^1$H-NMR (400 MHz, DMSO-d$^6$): δ=13.22 (s, 1H), 8.48 (s, 1H), 8.37 (dd, 1H), 8.11 (d, 2H), 7.88 (d, 1H), 7.79 (d, 2H), 2.72 (s, 3H).
HPLC-MS: Rt 1.61 m/z 306.0 (MH$^+$).

Intermediate 56: methyl 6-(2-cyclopropyl-4-(5-methyl-1,2,4-oxadiazol-3-yl)phenyl)nicotinate

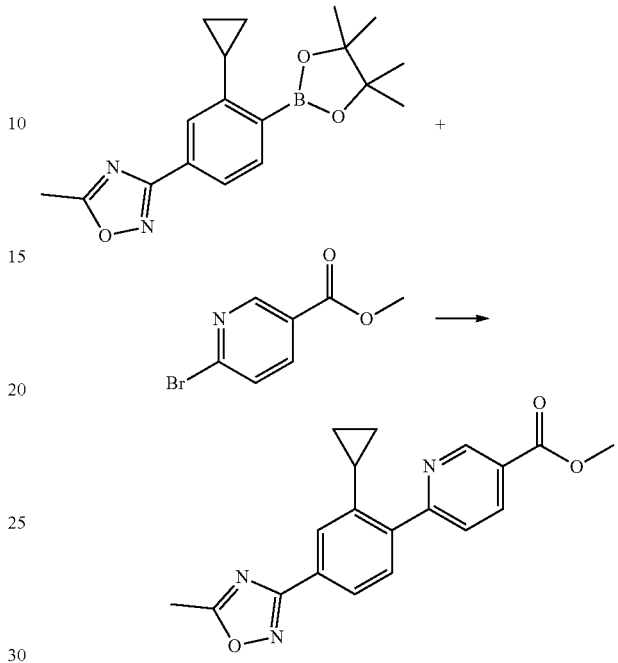

To solution of 3-(3-cyclopropyl-4-(4,4,5,5-tetramethyl-1,3,2-dioxaborolan-2-yl)phenyl)-5-methyl-1,2,4-oxadiazole (544.7 mg, 1.67 mmol), methyl 6-bromonicotinate (431.8 mg, 2.00 mmol) and [1,1,'-Bis(diphenylphosphino)-ferrocene]dichloro palladium(II) (81.6 mg, 0.10 mmol) in 12.5 mL of dioxane was added Cs$_2$CO$_3$ 2M (2.5 mL, 5.00 mmol). The mixture was degassed with N$_2$ and was stirred overnight at 90° C. After the reaction was completed, it was extracted with ethyl acetate and washed with NaHCO$_3$ sat. and brine. The organic phase was dried over anhydrous sodium sulphate, filtered and concentrated to give a residue that was purified by flash chromatography (hexane:ethyl acetate) and evaporated to afford the desire product as a white solid (407.2 mg, 72.7%).

$^1$H-NMR (400 MHz, DMSO-d$^6$): δ=9.21 (d, 1H), 8.40 (dd, 1H), 7.91 (dd, 1H), 7.86 (d, 1H), 7.67-7.59 (m, 2H), 3.93 (s, 3H), 2.68 (s, 3H), 2.19-2.09 (m, 1H), 0.94-0.87 (m, 2H), 0.66 (g, 2H).
HPLC-MS: Rt 2.84 m/z 336.1 (MH$^+$).

Intermediate 57: methyl 6-(2-fluoro-4-(5-methyl-1,2,4-oxadiazol-3-yl)phenyl)nicotinate Obtained as using the procedure described in intermediate 56 but using precursor 45 as starting compound.
$^1$H-NMR (400 MHz, DMSO-d$^6$): δ=9.24 (d, 1H), 8.45 (dd, 1H), 8.24 (t, 1H), 8.06 (d, 1H), 8.01 (dd, 1H), 7.92 (d, 1H), 3.93 (s, 3H), 2.70 (s, 3H).
HPLC-MS: Rt 2.81 m/z 314.0 (MH$^+$).

Intermediate 58: methyl 6-(2-chloro-4-(5-methyl-1,2,4-oxediazol-3-yl)phenyl)nicotinate Obtained as using the procedure described in intermediate 56 but using precursor 46 as starting compound.

$^1$H-NMR (400 MHz, DMSO-d$^6$): δ=9.22 (s, 1H), 8.44 (d, 1H), 8.14 (s, 1H), 8.10 (d, 1H), 7.94 (d, 1H), 7.85 (d, 1H), 3.94 (s, 3H), 2.71 (s, 3H).
HPLC-MS: Rt 2.81 m/z 330.0 (MH$^+$).

Intermediate 59: methyl 6-(4-(5-methyl-1,2,4-oxadiazol-3-yl)-2-(trifluoromethyl)phenyl)nicotinate Obtained as using the procedure described in intermediate 56 but using precursor 47 as starting compound.
$^1$H-NMR (400 MHz, DMSO-d$^6$): δ=9.17 (d, 1H), 8.44 (dd, 1H), 8.39 (m, 2H), 7.82 (d, 1H), 7.78 (d, 1H), 3.93 (s, 3H), 2.72 (s, 3H).
HPLC-MS: Rt 2.88 m/z 364.0 (MH$^+$).

Intermediate 60: methyl 6-(2-methoxy-4-(5-methyl-1,2,4-exadiazol-3-yl)phenyl)nicotinate Obtained as using the procedure described in intermediate 56 but using precursor 48 as starting compound.
$^1$H-NMR (400 MHz, DMSO-d$^6$): δ=9.18 (d, 1H), 8.34 (dd, 1H), 8.12 (d, 1H), 8.02 (d, 1H), 7.74 (m, 1H), 7.71 (s, 1H), 3.96 (s, 3H), 3.91 (s, 3H). 2.70 (s, 3H).
HPLC-MS: Rt 2.66 m/z 326.0 (MH$^+$).

Intermediate 61: methyl 6-(2-cyano-4-(5-methyl-1,2,4-oxadiazol-3-yl)phenyl)nicotinate Obtained as using the procedure described in intermediate 56 but using precursor 49 as starting compound.
$^1$H-NMR (400 MHz, DMSO-d$^6$): δ=9.25 (dd, 1H), 8.53 (d, 1H), 8.50 (dd, 1H), 8.42 (dd, 1H), 8.18 (d, 1H), 8.14 (dd, 1H), 3.94 (s, 3H), 2.72 (s, 3H).
HPLC-MS: Rt 2.53 m/z 321.0 (MH$^+$).

Intermediate 62: ethyl 2-(2-cyclopropyl-4-(5-methyl-1,2,4-oxadiazol-3-yl)phenyl)pyrimidine-5-carboxylate

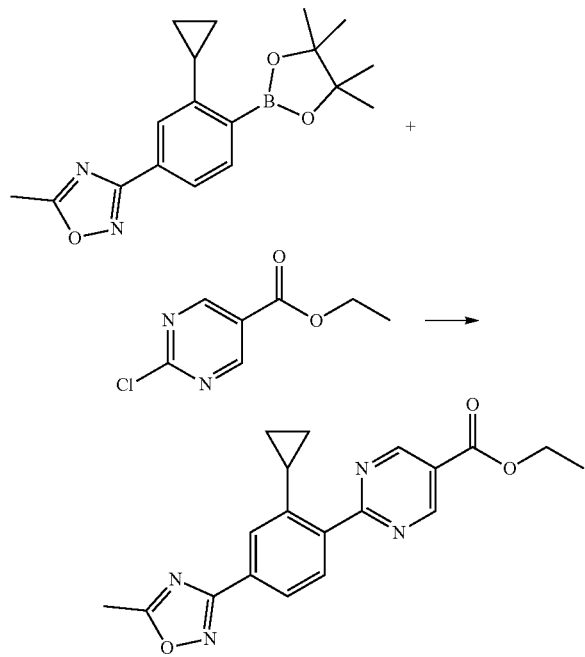

In a sealed tube were mixed 541.5 mg (1.66 mmol) of 3-(3-cyclopropyl-4-(4,4,5,5-tetramethyl-1,3,2-dioxaborolan-2-yl)phenyl)-5-methyl-1,2,4-oxadiazole, ethyl 2-chloropyrimidine-5-carboxylate (404.1 mg, 2.16 rnmol) and 1,1'-bis(diphenylphosphino)ferrocene]dichloropalladium(II) (81.6 mg, 0.09 mmol), potassium phosphate (1060.7mg, 4.99 mmol) in 15 mL of anhydrous DME and 3 mL of H$_2$O. The mixture was stirred at 90° C. overnight. The reaction mixture was filtered through celite, eluted with EtOAc and the filtrate was washed with saturated NaHCO$_3$. The organic layer was dried with sodium sulphate and the solvent was removed under reduced pressure. The crude was purified by flash chromatography column (Hexane/ethyl acetate) to obtain ethyl 2-(2-cyclopropyl-4-(5-methyl-1,2,4-oxadiazol-3-yl)phenyl)pyrimidine-5-carboxylate (278.6 mg, 47.9%).
$^1$H-NMR (400 MHz, DMSO-d$^6$): δ=9.38 (s, 1H), 7.94 (dd, 1H), 7.89 (d, 1H), 7.66 (s, 1H), 4.41 (q, 2H), 2.69 (s, 3H), 2.60 (ddd, 1H), 1.37 (t, 3H), 0.96-0.87 (m, 2H), 0.64 (q, 2H).
HPLC-MS: Rt 3.01 m/z 351.1 (MH$^+$).

Intermediate 63: 6-(2-cyclopropyl-4-(5-methyl-1,2,4-oxadiazol-3-yl)phenyl)nicotinic acid

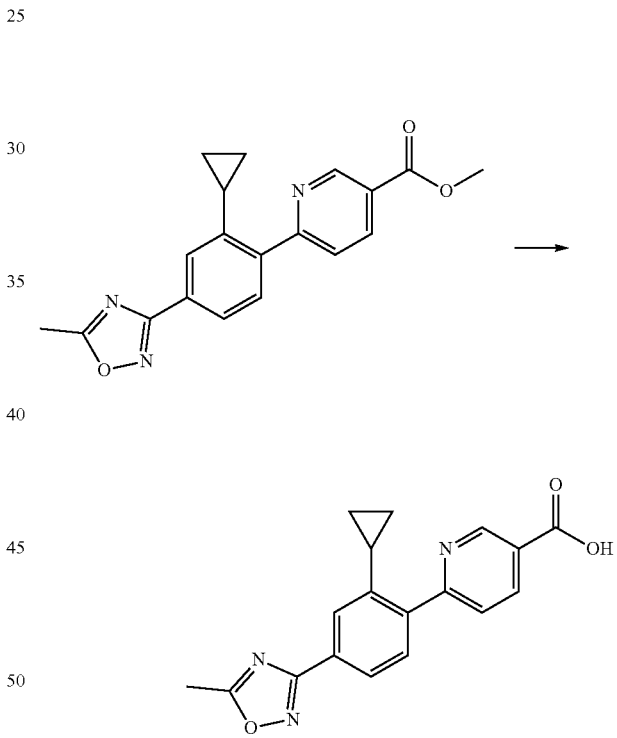

To a solution of Intermediate 56, methyl 6-(2-cyclopropyl--4-(5-methyl-1,2,4-oxadiazol-3-yl)phenyl)nicotinate, (325.3 mg, 0.97 mmol) in THF (4 mL) it was added NaOH 1M (4.8 mL, 4.80 mmol) and the mixture was stirred for 3 hours at room temperature. The solvent was evaporated, and the pH value was adjusted to 2.0 by the addition of HCl 1M. The solid was filtered and washed with water and pentane (284.6 mg, 91.3%).
$^1$H-NMR (400 MHz, DMSO-d$^6$): δ=13.49 (s, 1H), 9.19 (s, 1H), 8.37 (dd, 1H), 7.90 (d, 1H), 7.83 (d, 1H), 7.66-7.58 (m, 2H), 2.68 (s, 3H), 2.14 (ddd, 1H), 0.95-0.87 (m, 2H), 0.67 (q, 2H).
HPLC-MS: Rt 1.63 m/z 322.1 (MH$^+$).

Intermediate 64: 2-(2-cyclopropyl-4-(5-methyl-1,2,4-oxadiazol-3-yl)phenyl)pyrimidine-5-carboxylic acid

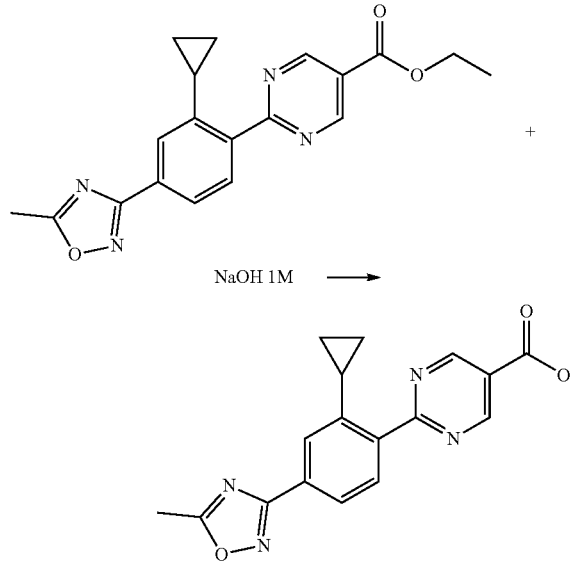

To a solution of ethyl 2-(2-cyclopropyl-4-(5-methyl-1,2,4-oxadiazol-3-yl)phenyl)pyrimidine-5-carboxylate (276.8 mg, 0.79 mmol) in 6 mL of THF and 2 mL of MeOH were added 4 mL (3.99 mmol) of NaOH 1M. The mixture was stirred at room temperature overnight. The solvent was removed under vacuum. The aqueous phase was neutralized with HCl 4M and was acidified to pH=2 with HCl 1M. The obtained solid was filtered and washed with water and pentane (218 mg, 85.6%).

$^1$H-NMR (400 MHz, DMSO-d$^6$): δ=13.88 (s, 1H), 9.36 (s, 2H), 7.93 (d, 1H), 7.89 (d, 1H), 7.66 (s, 1H), 2.69 (s, 3H), 2.60 (ddd, 1H), 0.95-0.87 (m, 2H), 0.64 (q, 2H).

HPLC-MS: Rt 1.54 m/z: 323.0 (MH$^+$).

Intermediate 65: 6-(2-fluoro-4-(5-methyl-1,2,4-oxadiazol-3-yl)phenyl)nicotinic acid Obtained as using the procedure described in intermediate 63 but using precursor 57 as starting compound.

$^1$H-NMR (400 MHz, DMSO-$^6$): δ=13.56 (s, 1H), 9.20 (d, 1H), 8.40 (dd, 1H), 8.21 (t, 1H), 7.99 (m, 2H), 7.88 (d, 1H), 2.70 (s, 3H).

HPLC-MS: Rt 1.53 m/z 300.0 (MH$^+$).

Intermediate 66: 6-(2-chloro-4-(5-methyl-1,2,4-oxadiazoi-3-yl)phenyl)nicotinic acid Obtained as using the procedure described in intermediate 63 but using precursor 58 as starting compound.

$^1$H-NMR (400 MHz, DMSO-d$^6$): δ=13.59 (s, 1H), 9.19 (d, 1H), 8.40 (dd, 1H), 8.13 (d, 1H), 8.09 (dd, 1H), 7.91 (d, 1H), 7.84 (d, 1H), 2.70 (s, 3H).

HPLC-MS: Rt 1.56 m/z 316.0 (MH$^+$).

Intermediate 67: 6-(4-(5-methyl-1,2,4-oxadiazol-3-yl)-2-(trifluoromethyl)phenyl)nicotinic acid Obtained as using the procedure described in intermediate 63 but using precursor 59 as starting compound.

$^1$H-NMR (400 MHz, DMSO-d$^6$): δ=13.60 (s, 1H), 9.15 (d, 1H), 8.40 (m, 3H), 7.81 (d, 1H), 7.74 (d, 1H), 2.72 (s, 3H).

HPLC-MS: Rt 1.68 m/z 350.0 (MH$^+$).

Intermediate 68: 6-(2-methoxy-4-(5-methyl-1,2,4-oxadiazol-3-yl)phenyl)nicotinic acid Obtained as using the procedure described in intermediate 63 but using precursor 60 as starting compound.

$^1$H-NMR (400 MHz, DMSO-d$^6$): δ=13.43 (s, 1H), 9.16 (d, 1H), 8.31 (dd, 1H), 8.09 (d, 1H), 8.01 (d, 1H), 7.73 (d, 1H), 7.71 (s, 1H), 3.96 (s, 3H), 2.70 (s, 3H).

HPLC-MS: Rt 1.48 m/z 312.0 (MH$^+$).

Intermediate 69: 6-(2-cyano-4(5-methyl-1,2,4-oxadiazol-3-yl)phenyl)nicotinic acid Obtained as using the procedure described in intermediate 63 but using precursor 61 as starting compound.

$^1$H-NMR (400 MHz, DMSO-d$^6$): δ=9.21 (dd, 1H), 8.48 (m, 2H), 8.41 (dd, 1H), 8.17 (d, 1H), 8.10 (d, 1H), 2.72 (s, 3H).

HPLC-MS: Rt 1.46 m/z 307.0 (MH$^+$).

Intermediate 70: 6-(2-cyclopropyl-4-(5-methyl-1,2,4-oxadiazol-3-yl)phenyl)nicotinoyl chloride

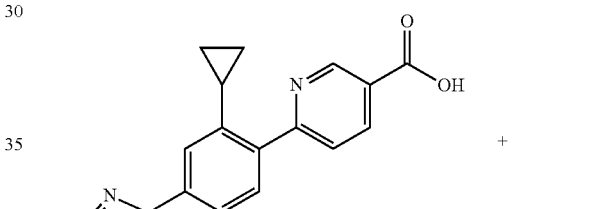

Intermediate 63, 6-(2-cyclopropyl-4-(5-methyl-1,2,4-oxadiazol-3-yl)phenyl)nicotinic acid (385.6 mg, 1.12 mmol) was suspended in 2.6 mL (35.64 mmol) of thionyl chloride and the reaction mixture was stirred at reflux for three hours. The reaction was cooled to room temperature and the solvent was remove under vacuum. The solid was used in the next reaction step without further purification.

Intermediate 71: 2-(2-cyclopropyl-4-(5-methyl-1,2,4-oxadiazol-3-yl)phenyl)pyrimidine-5-carbonyl chloride Obtained as using the procedure described in intermediate 70 but precursor 64 as starting compound. The solid was used in the next reaction step without further purification.

Intermediate 72: 2'-fluoro-4'-(5-methyl-1,2,4-oxadiazol-3-yl)-[1,1'-biphenyl]-4-carbonyl chloride Obtained as using the procedure described in intermediate 70 but precursor 51 as starting compound. The solid was used in the next reaction step without further purification.

Intermediate 73: 2'-chloro-4'-(5-methyl-1,2,4-oxadiazol-3-yl)-[1,1'-biphenyl]-4-carbonyl chloride Obtained as using the procedure described in intermediate 70 but precursor 52 as starting compound. The solid was used in the next reaction step without further purification.

Intermediate 74: 4'-(5-methyl-1,2,4-oxadiazol-3-yl)-2'-(trifluoromethyl)-[1,1'-biphenyl]-4-carbonyl chloride Obtained as using the procedure described in intermediate 70 but precursor 53 as starting compound. The solid was used in the next reaction step without further purification.

Intermediate 75: 2'-methoxy-4'-(5-methyl-1,2,4-oxadiazol-3-yl)-[1,1'-biphenyl]-4-carbonyl chloride Obtained as using the procedure described in intermediate 70 but precursor 54 as starting compound. The solid was used in the next reaction step without further purification.

Intermediate 76: 2'-cyano-4'-(5-methyl-1,2,4-oxadiazol-3-yl)-[1,1'-biphenyl]-4-carbonyl chloride Obtained as using the procedure described in intermediate 70 but precursor 55 as starting compound. The solid was used in the next reaction step without further purification.

Intermediate 77: 6-(2-fluoro-4-(5-methyl-1,2,4-oxadiazol-3-yl)phenyl)nicotinoyl chloride Obtained as using the procedure described in intermediate 70 but precursor 65 as starting compound. The solid was used in the next reaction step without further purification.

Intermediate 78: 6-(2-chloro-4-(5-methyl-1,2,4-oxadiazol-3-yl)phenyl)nicotinoyl chloride Obtained as using the procedure described in intermediate 70 but precursor 66 as starting compound. The solid was used in the next reaction step without further purification.

Intermediate 79: 6-(4-(5-methyl-1,2,4-oxadiazol-3-yl)-2-(trifluoromethyl)phenyl)nicotinoyl chloride Obtained as using the procedure described in intermediate 70 but precursor 67 as starting compound. The solid was used in the next reaction step without further purification.

intermediate 80: 6-(2-methoxy-4-(5-methyl-1,2,4-oxadiazol-3-yl)phenyl)nicotinoyl chloride Obtained as using the procedure described in intermediate 70 but precursor 68 as starting compound. The solid was used in the next reaction step without further purification.

Intermediate 81: 6-(2-cyano-4-(5-methyl-1,2,4-oxadiazol-3-yl)phenyl)nicotinoyl chloride Obtained as using the procedure described in intermediate 70 but precursor 69 as starting compound. The solid was used in the next reaction step without further purification.

Intermediate 82: 6-(2-cyclopropyl-4-(5-methyl-1,2,4-oxadiazol-3-yl)phenyl)pyridin-3-amine

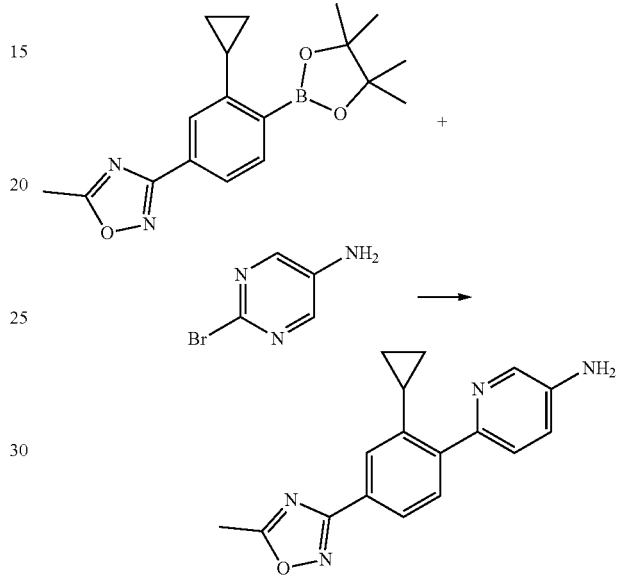

A solution of 541.49 mg (1.66 mmol) of 3-(3-cyclopropyl-4-(4,4,5,5-tetramethyl-1,3,2-dioxaborolan-2-yl)phenyl)-5-methyl-1,2,4-oxadiazole, 6-bromopyridin-3-amine (288.2 mg, 1.66 mmol), 1,1'-bis(diphenylphosphino)ferrocene]dichloropalladium(II) (81.6 mg, 0.09 mmol) and potassium phosphate (707.2, 3.33 mmol) in 15 mL of DME and 2.5 mL of H$_2$O was stirred at 90° C. for 16 hours, The reaction mixture was filtered through celite and the filtrate was washed with NaHCO$_3$ saturated for two times. The organic layers were collected, dried with sodium sulphate and the solvent was removed under reduced pressure. The crude was purified by flash chromatography column (Hexane/ethyl acetate) to obtain the amine intermediate (279.5 mg, 57.6%).

$^1$H-NMR (400 MHz, DMSO-d$^6$): δ=8.05 (d, 1H), 7.80 (dd, 1H), 7.53 (d, 1H), 7.50 (d, 1H), 7.36 (d, 1H), 7.01 (dd, 1H), 5.48 (s, 2H), 2.66 (s, 3H), 2.22 (tt, 1H), 0.95-0.87 (m, 2H), 0.68-0.61 (m, 2H).

HPLC-MS: Rt 2.24 m/z 293.1 (MH$^+$).

Intermediate 83: 6-(2-fluoro-4-(5-methyl-1,2,4-oxadiazol-3-yl)phenyl)pyridin-3-amine Obtained as using the procedure described in intermediate 82 but precursor 45 as starting compound.

$^1$H-NMR (400 MHz, DMSO-d$^6$): δ=8.11 (dd, 2H), 7.87 (dd, 1H), 7.76 (dd, 1H), 7.60 (m, 1H), 7.01 (dd, 1H), 5.73 (s, 2H), 2.68 (s, 3H).

HPLC-MS: Rt 2.81 m/z 499.1 (MH$^+$).

Intermediate 84: 6-(2-chloro-4-(5-methyl-1,2,4-oxadiazol-3-yl)phenyl)pyridin-3-amine Obtained as using the procedure described in intermediate 82 but precursor 46 as starting compound.
$^1$H-NMR (400 MHz, DMSO-d$^6$): δ=8.06 (d, 1H), 8.03 (d, 1H), 7.98 (dd, 1H), 7.76 (d, 1H), 7.48 (d, 1H), 7.01 (dd, 1H), 5.65 (s, 2H), 2.68 (s, 3H).
HPLC-MS: Rt 2.23 m/z 287.0 (MH$^+$).

Intermediate 85: 6-(4-(5-methyl-1,2,4-oxadiazol-3-yl)-2-(trifluoromethyl)phenyl)pyridin-3-amine Obtained as using the procedure described in intermediate 82 but precursor 47 as starting compound.
$^1$H-NMR (400 MHz, DMSO-d$^6$): δ=8.30 (s, 1H), 8.27 (d, 1H), 8.01 (d, 1H), 7.72 (d, 1H), 7.25 (d, 1H), 7.01 (dd, 1H), 5.62 (s, 2H), 2.70 (s, 3H).
HPLC-MS: Rt 2.38 m/z 321.1 (MH$^+$).

Intermediate 86: 6-(2-methoxy-4-(5-methyl-1,2,4-oxadiazol-3-yl)phenyl)pyridin-3-amine Obtained as using the procedure described in intermediate 82 but precursor 48 as starting compound.
$^1$H-NMR (400 MHz, DMSO-d$^6$): δ=8.05 (d, 1H), 7.93 (d, 1H), 7.70 (d, 1H), 7.64 (d, 1H), 7.61 (s, 1H), 6.96 (dd, 1H), 5.56 (s, 2H), 3.91 (s, 3H), 2.68 (s, 3H).
HPLC-MS: Rt 2.04 m/z 283.0 (MH$^+$).

Intermediate 87: 2-(5-aminopyridin-2-yl)-5-(5-methyl-1,2,4-oxadiazol-3-yl)benzonitrile Obtained as using the procedure described in intermediate 82 but precursor 49 as starting compound.
$^1$H-NMR (400 MHz, DMSO-d$^6$): δ=8.32 (d, 1H), 8.26 (dd, 1H), 8.10 (d, 1H), 8.01 (d, 1H), 7.68 (d, 1H), 7.06 (dd, 1H), 5.87 (s, 2H), 2.70 (s, 3H).
HPLC-MS: Rt 2.06 m/z 278.0 (MH$^+$).

EXAMPLES

Example 1: N-(4-bromo-3-(2-(dimethylamino)ethoxy)phenyl)-6-(2-cyclopropyl-4-(5-methyl-1,2,4-oxadiazol-3-yl)phenyl)nicotinamide Example of a General Procedure A According to Scheme 6

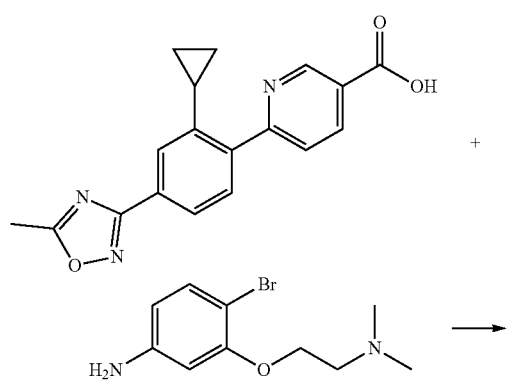

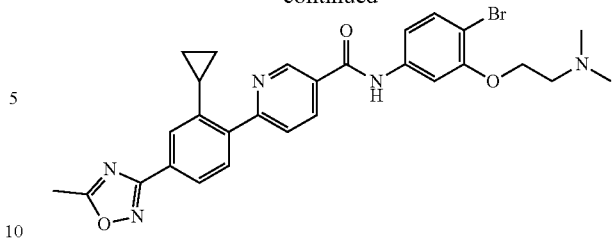

To a solution of intermediate 63 6-(2-cyclopropyl-4-(5-methyl-1,2,4-oxadiazol-3-yl)phenyl)nicotinic acid (109.3 mg, 0.34 mmol) in DMF anh. (1.7 mL), HATU (141.6 mg, 0.37 mmol) and DIPEA (0.13 mL, 0.75 mmol) were added. After the reaction was stirred at RT under N$_2$ for 15 minutes, 4-bromo-3-(2-(dimethylamino)ethoxy)aniline (105.3 mg, 0.41 mmol) was added and the reaction was allowed to stir overnight at room temperature. The mixture was extracted with NaHCO$_3$ sat. and ethyl acetate two times. The organic phase was washed with brine, dried over anhydrous sodium sulphate, filtered, and concentrated to give a residue that was purified by flash chromatography (dichloromethane:methanol 10%) to afford the product as a white solid (95.4 mg, 49.9%).

General Procedure B According to Scheme 6

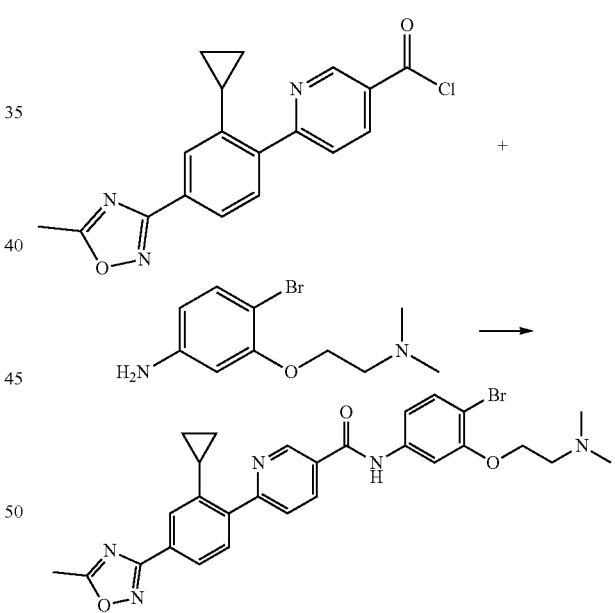

To a solution of 4-bromo-3-(2-(dimethylamino)ethoxy)aniline (64.8 mg, 0.25 mmol) and N,N-dimethylpyridin-4-amine (1.5 mg, 0.01 mmol) in CH$_3$CN anh, triethylamine (104.1 μL, 0.75 mmol) was added. After the reaction was stirred at RT under N$_2$ for 15 minutes, 6-(2-cyclopropyl-4-(5-methyl-1,2,4-oxadiazol-3-yl)phenyl)nicotinoyl chloride (84.6 mg, 0.25 mmol) was added dropwise at 0° C., and the reaction was allowed to stir overnight at room temperature. The mixture was extracted with NaHCO$_3$ sat. and ethyl acetate two times. The organic phase was washed with brine, dried over anhydrous sodium sulphate, filtered, and concentrated to give a residue that was purified by flash chromatography (dichloromethane:methanol 10%) to afford the product as a white solid (84.5 mg, 60.3%).

$^1$H-NMR (400 MHz, DMSO-d$^6$): δ=10.61 (s, 1H), 9.23 (d, 1H), 8.42 (dd, 1H), 7.94-7.90 (m, 1H), 7,87 (d, 1H), 7.68 (d, 1H), 7.67-7.61 (m, 2H), 7.56 (d, 1H), 7.40 (dd, 1H), 4.14 (t, 2H), 2.77 (t, 2H), 2.69 (s, 3H), 2.31 (s, 6H), 2.18 (ddd, 1H), 0.97-0.87 (m, 2H), 0.69 (q, 2H).

HPLC-MS: Rt 2.99 m/z 563.1 (MH$^+$).

The following examples 2-6 were synthesized according to the general procedure A described for the example 1 using the correspondend carboxylic acid and aromatic amide.

Example 2: N-(4-bromo-3-(2-(dimethylamino) ethoxy)phenyl)-6-(2-fluoro-4-(5-methyl-1,2,4-oxadiazol-3-yl)phenyl)nicotinamide $^1$H-NMR (400 MHz, DMSO-d$^6$): δ=10.62 (s, 1H), 9.26 (d, 1H), 8.44 (dd, 1H), 8.23 (t, 1H), 8.03 (dd, 2H), 7.91 (d, 1H), 7.67 (d, 1H), 7.56 (d, 1H), 7.38 (dd, 1H), 4,12 (t, 2H), 2.72 (d, 2H), 2.70 (s, 3H), 2.27 (s, 6H).

HPLC-MS: Rt 2.96 m/z 541.9 (MH$^+$).

Example 3: N-(4-bromo-3-(2-(dimethylamino) ethoxy)phenyl)-6-(2-chloro-4-(5-methyl-1,2,4-oxadiazol-3-yl)phenyl)nicotinamide $^1$H-NMR (400 MHz, DMSO-d$^6$): δ=10.65 (s, 1H), 9.23 (s, 1H), 8.43 (d, 1H), 8.15 (s, 1H), 8.11 (d, 1H), 7.95 (d, 1H), 7.86 (d, 1H), 7.68 (s, 1H), 7.57 (d, 1H), 7.39 (d, 1H), 4.14 (t, 2H), 2.75 (t, 2H), 2.71 (s, 3H), 2.30 (s, 6H).

HPLC-MS: Rt 2.98 m/z 557.9 (MH$^+$).

Example 4: N-(4-bromo-3-(2-(dimethylamino) ethoxy)phenyl)-6-(4-(5-methyl-1,2,4-oxadiazol-3-yl)-2-(trifluoromethyl)phenyl)nicotinamide $^1$H-NMR (400 MHz, DMSO-d$^6$): δ=10.65 (s, 1H), 9.20 (d, 1H), 8.44 (dd, 1H), 8.39 (m, 2H), 7.84 (d, 1H), 7.80 (d, 1H), 7.67 (d, 1H), 7.56 (d, 1H), 7.40 (dd, 1H), 4.13 (t, 2H), 2.72 (m, 5H), 2.27 (s, 6H).

HPLC-MS: Rt 3.04 m/z 591.9 (MH$^+$).

Example 5: N-(4-bromo-3-(2-(dimethylamino) ethoxy)phenyl)-6-(2-methoxy-4-(5-methyl-1,2,4-oxadiazol-3-yl)phenyl)nicatinamide $^1$H-NMR (400 MHz, DMSO-d$^6$): δ=10.58 (s, 1H), 9.20 (d, 1H), 8.35 (dd, 1H), 8.10 (d, 1H), 8.02 (d, 1H), 7.76 (m, 1H), 7.72 (s, 1H), 7.69 (d, 1H), 7.56 (d, 1H), 7.38 (dd, 1H), 4.14 (t, 2H), 3.97 (s, 3H), 2.76 (t, 2H), 2.70 (s, 3H), 2.30 (s, 6H).

HPLC-MS: Rt 2.86 m/z 554.0 (MH$^+$).

Example 6: N-(4-brome-3-(2-(dimethylamino) ethoxy)phenyl)-6-(2-cyano-4-(5-methyl-1,2,4-oxadiazol-3-yl)phenyl)nicotinamide $^1$H-NMR (400 MHz, DMSO-d$^6$): δ=10.67 (s, 1H), 9.29 (dd, 1H), 8.52 (dd, 1H), 8.49 (d, 1H), 8.42 (dd, 1H), 8.20 (d, 1H), 8.15 (d, 1H), 7.68 (s, 1H), 7.57 (d, 1H), 7.40 (dd, 1H), 4.14 (t, 2H), 2.75 (t, 2H), 2.72 (s, 3H), 2.29 (s, 6H).

HPLC-MS: Rt 2.81 m/z 549.0 (MH$^+$).

The following examples 7-64 were synthesized according to the general procedure B described for the example 1 using the correspondend carboxylic acid chloride and aromatic amide.

Example 7: N-(4-cyano-3-(2-(dimethylamino) ethoxy)phenyl)-6-(2-cyclopropyl-4-(5-methyl-1,2,4-oxadiazol-3-yl)phenyl)nicotinamide $^1$H-NMR (400 MHz, DMSO-d$^6$): δ=10.86 (s, 1H), 9.24 (s, 1H), 8.43 (d, 1H), 7.96-7.85 (m, 2H), 7.80 (s, 1H), 7.73 (d, 1H), 7.68-7.60 (m, 2H), 7.55 (d, 1H), 4.21 (t, 2H), 2.74 (t, 2H), 2.69 (s, 3H), 2.28 (s, 6H), 2.17 (dd, 1H), 0.92 (d, 2H), 0.69 (d, 2H).

HPLC-MS: Rt 2.76 m/z 509.1 (MH$^+$).

Example 8: N-(4-cyano-3-(2-(dimethylamino) ethoxy)phenyl)-6-(2-fluoro-4-(5-methyl-1,2,4-oxadiazol-3-yl)phenyl)nicotinamide $^1$H-NMR (400 MHz, DMSO-d$^6$): δ=10.85 (s, 1H), 9.25 (d, 1H), 8.44 (dd, 1H), 8.22 (t, 1H), 8.06 (d, 1H), 8.00 (dd, 1H), 7.91 (d, 1H), 7.79 (d, 1H), 7.72 (d, 1H), 7.52 (dd, 1H), 4.20 (t, 2H), 2.73 (d, 2H), 2.70 (s, 3H), 2.27 (s, 6H).

HPLC-MS: Rt m/z 2.73 m/z 487.0 (MH$^+$).

Example 9: 6-(2-chloro-4-(5-methyl-1,2,4-oxadiazol-3-yl)phenyl)-N-(4-cyano-3-(2-(dimethylamino) ethoxy)phenyl)nicotinamide $^1$H-NMR (400 MHz, DMSO-d$^6$): δ=10.93 (s, 1H), 9.24 (d, 1H), 8.45 (dd, 1H), 8.15 (s, 1H), 8.11 (d, 1H), 7.96 (d, 1H), 7.86 (d, 1H), 7.83 (s, 1H), 7.74 (d, 1H), 7.54 (d, 1H), 4.27 (t, 2H), 2.91 (t, 2H), 2.71 (s, 3H), 2.40 (s, 6H).

HPLC-MS: Rt 2.74 m/z 503.0 (MH$^+$).

Example 10: N-(4-cyano-3-(2-(dimethylamino) ethoxy)phenyl)-6-(4-(5-methyl-1,2,4-oxadiazol-3-yl)-2-(trifluoromethyl)phenyl)nicotinamide $^1$H-NMR (400 MHz, DMSO-d$^6$): δ=10.93 (s, 1H), 9.20 (d, 1H), 8.44 (dd, 1H), 8.35 (m, 2H), 7.85 (d, 1H), 7.82 (d, 1H), 7.80 (s, 1H), 7.68 (d, 1H), 7.58 (d, 1H), 4.20 (t, 2H), 2.75 (t, 2H), 2.71 (s, 3H), 2.30 (s, 6H).

HPLC-MS: Rt 2.83 m/z 537.0 (MH$^+$).

Example 11: N-(4-cyano-3-(2-(dimethylamino) ethoxy)phenyl)-6-(2-methoxy-4-(5-methyl-1,2,4-oxadiazol-3-yl)phenyl)nicotinamide $^1$H-NMR (400 MHz, DMSO-d$^6$): δ=10.81 (s, 1H), 9.21 (s, 1H), 8.36 (dd, 1H), 8.06 (m, 2H), 7.80 (d, 1H), 7.72 (d, 3H), 7.53 (dd, 1H), 4.21 (t, 2H), 3.91 (s, 3H), 2.72 (m, 5H), 2.27 (s, 6H).

HPLC-MS: Rt 2.61 m/z 499.0 (MH$^+$).

Example 12: N-(4-cyano-3-(2-(dimethylamino) ethoxy)phenyl)-6-(2-cyano-4-(5-methyl-1,2,4-oxadiazol-3-yl)phenyl)nicotinamide $^1$H-NMR (400 MHz, DMSO-d$^6$): δ=10.90 (s, 1H), 9.29 (d, 1H), 8.52 (dd, 1H), 8.49 (d, 1H), 8.42 (dd, 1H), 8.20 (d, 1H), 8.17 (d, 1H), 7.80 (s, 1H), 7.73 (d, 1H), 7.54 (dd, 1H), 4.22 (t, 2H), 2.75 (t, 2H), 2.73 (s, 3H), 2.28 (s, 6H).

HPLC-MS: Rt 2.51 m/z 494.1 (MH$^+$).

Example 13: N-(4-bromo-3-(2-(dimethylamino) ethoxy)phenyl)-2-(2-cyclopropyl-4-(5-methyl-1,2,4-oxadiazol-3-yl)phenyl)pyrimidine-5-carboxamide $^1$H-NMR (400 MHz, DMSO-d$^6$): δ=2.84 (d, 2H), 2.69 (s, 3H), 2.65-2.59 (m, 1H), 2.35 (s, 6H), 0.98-0.89 (m, 2H), 0.67 (q, 2H), 10.74 (s, 1H), 9.42 (s, 2H), 7.95 (dd, 1H), 7.91 (d, 1H), 7.70-7.65 (m, 2H), 7.59 (d, 1H), 7.37 (dd, 1H), 4.16 (t, 2H), 2.82 (t, 2H), 2.69 (s, 3H), 2.65-2.60 (m, 1H), 2.35 (s, 6H), 0.95-0.91 (m, 2H), 0.67 (q, 2H).
HPLC-MS: Rt 2.89 m/z 564.0 (MH$^+$).

Example 14: N-(4-cyano-3-(2-(dimethylamino)ethoxy)phenyl)-2-(2-cyclopropyl-4-(5-methyl-1,2,4-oxadiazol-3-yl)phenyl)pyrimidine-5-carboxamide $^1$H-NMR (400 MHz, DMSO-d$^6$): δ=11.00 (s, 1H), 9.43 (s, 2H), 7.93 (dd, 2H), 7.79 (s, 1H), 7.75 (d, 1H), 7.68 (s, 1H), 7.52 (d, 1H), 4.25 (t, 2H), 2.84 (t, 2H), 2.69 (s, 3H), 2.65-2.59 (m, 1H), 2.35 (s, 6H), 0.98-0.89 (m, 2H), 0.67 (q, 2H).
HPLC-MS: Rt 2.74 m/z 510.0 (MH$^+$).

Example 15: N-(5-bromo-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide $^1$H-NMR (400 MHz, DMSO-d$^6$): δ=11.02 (s, 1H), 8.39 (s, 1H), 8.14 (m, 2H), 8.08 (s, 1H), 7.87 (dd, 1H), 7.61 (m, 3H), 7.43 (d, 1H), 4.27 (t, 2H), 2.74 (t, 2H), 2.68 (s, 3H), 2.27 (s, 6H), 1.91 (td, 1H), 0.87 (m, 2H), 0.73 (m, 2H).
HPLC-MS: Rt 3.29 m/z 564.0 (MH$^+$).

Example 16: N-(5-bromo-4-(2-(dimethylamino)ethoxy)pyridin-2-yl)-2'-fluoro-4'-(5-methyl-1,2,4-oxadiazol-3-yl)-[1,1'-biphenyl]-4-carboxamide $^1$H-NMR (400 MHz, DMSO-d$^6$): δ=11.06 (s, 1H), 8.39 (s, 1H), 8.15 (d, 2H), 8.07 (d, 1H), 7.95 (d, 1H), 7.88 (d, 1H), 7.83 (d, 1H), 7.77 (d, 2H), 4.28 (t, 2H), 2.76 (t, 2H), 2.70 (s, 3H), 2.29 (s, 6H).
HPLC-MS: Rt 3.11 m/z 540.0 (MH$^+$).

Example 17: N-(5-bromo-4-(2-(dimethylamino)ethoxy)pyridin-2-yl)-2'-chloro-4'-(5-methyl-1,2,4-oxadiazol-3-yl)-[1,1'-biphenyl]-4-carboxamide $^1$H-NMR (400 MHz, DMSO-d$^6$): δ=11.06 (s, 1H), 8.39 (s, 1H), 8.14 (d, 2H), 8.06 (m, 2H), 7.66 (m, 3H), 4.28 (t, 2H), 2.76 (t, 2H), 2.70 (s, 3H), 2.29 (s, 6H).
HPLC-MS: Rt 3.24 m/z 557.9 (MH$^+$).

Example 18: N-(5-bromo-4-(2-(dimethylamino)ethoxy)pyridin-2-yl)-4'-(5-methyl-1,2,4-oxadiazol-3-yl)-2'-(trifluoromethyl)-[1,1'-biphenyl]-4-carboxamide $^1$H-NMR (400 MHz, DMSO-d$^6$): δ=11.07 (s, 1H), 8.37 (d, 2H), 8.34 (d, 1H), 8.13 (d, 2H), 8.07 (s, 1H), 7.67 (d, 1H), 7.53 (d, 2H), 4.27 (t, 2H), 2.73 (m, 5H), 2.27 (s, 6H).
HPLC-MS: Rt 3.28 m/z 592.0 (MH$^+$).

Example 19: N-(5-bromo-4-(2-(dimethylamino)ethoxy)pyridin-2-yl)-2'-methoxy-4'-(5-methyl-1,2,4-oxadiazol-3-yl)-[1,1'-biphenyl]-4-carboxamide $^1$H-NMR (400 MHz, DMSO-d$^6$): δ=10.99 (s, 1H), 8.39 (s, 1H), 8.09 (m, 3H), 7.70 (dd, 4H), 7.55 (d, 1H), 4.28 (t, 2H), 3.89 (s, 3H), 2.77 (t, 2H), 2.70 (s, 3H), 2.29 (s, 6H).
HPLC-MS: Rt 3.04 m/z 554.0 (MH$^+$).

Example 20: N-(5-bromo-4-(2-(dimethylamino)ethoxy)pyridin-2-yl)-2'-cyano-4'-(5-methyl-1,2,4-oxadiazol-3-yl)-[1,1'-biphenyl]-4-carboxamide $^1$H-NMR (400 MHz, DMSO-d$^6$): δ=11.12 (s, 1H), 8.48 (s, 1H), 8.40 (s, 1H), 8.38 (d, 1H), 8.19 (d, 2H), 8.08 (s, 1H), 7.90 (d, 1H), 7.81 (d, 2H), 4.27 (t, 2H), 2.75 (t, 2H), 2.72 (s, 3H), 2.27 (s, 6H).
HPLC-MS: Rt 2.93 m/z 549.0 (MH$^+$).

Example 21: N-(5-cyano-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide $^1$H-NMR (400 MHz, DMSO-d$^6$): δ=11.34 (s, 1H), 8.67 (s, 1H), 8.14 (m, 3H), 7.87 (d, 1H), 7.64 (d, 2H), 7.59 (s, 1H), 7.43 (d, 1H), 4.35 (s, 2H), 2.79 (s, 2H), 2.68 (s, 3H), 2.30 (s, 6H), 1.91 (m, 1H), 0.92 (m, 2H), 0.73 (m, 2H).
HPLC-MS: Rt 3.04 m/z 509.3 (MH$^+$).

Example 22: N-(5-cyano-4-(2-(dimethylamino)ethoxy)pyridin-2-yl)-2'-fluoro-4'-(5-methyl-1,2,4-oxadiazol-3-yl)-[1,1'-biphenyl]-4-carboxamide $^1$H-NMR (400 MHz, DMSO-d$^6$): δ=11.37 (s, 1H), 8.67 (s, 1H), 8.15 (d, 3H), 7.91 (dd, 2H), 7.81 (t, 1H), 7.77 (d, 2H), 4.33 (t, 2H), 2.74 (t, 2H), 2.70 (s, 3H), 2.27 (s, 6H).
HPLC-MS: Rt 2.88 m/z 487.1 (MH$^+$).

Example 23: 2'-chloro-N-(5-cyano-4-(2-(dimethylamino)ethoxy)pyridin-2-yl)-4'-(5-methyl-1,2,4-oxadiazol-3-yl)-[1,1'-biphenyl]-4-carboxamide $^1$H-NMR (400 MHz, DMSO-d$^6$): δ=11.38 (s, 1H), 8.67 (s, 1H), 8.14 (d, 4H), 8.05 (d, 1H), 7.66 (m, 3H), 4.34 (t, 2H), 2.75 (t, 2H), 2.70 (s, 3H), 2.27 (s, 6H).
HPLC-MS: Rt 2.99 m/z 503.0 (MH$^+$).

Example 24: N-(5-cyano-4-(2-(dimethylamino)ethoxy)pyridin-2-yl)-4'-(5-methyl-1,2,4-oxadiazol-3-yl)-2'-(trifluoromethyl)-[1,1'-biphenyl]-4-carboxamide $^1$H-NMR (400 MHz, DMSO-d$^6$): δ=11.41 (s, 1H), 8.68 (s, 1H), 8.36 (s, 1H), 8.34 (d, 1H), 8.14 (s, 1H), 8.13 (d, 2H), 7.67 (d, 1H), 7.54 (d, 2H), 4.39 (t, 2H), 2.88 (t, 2H), 2.72 (s, 3H), 2.36 (s, 6H).
HPLC-MS: Rt 3.04 m/z 537.1 (MH$^+$).

Example 25: N-(5-cyano-4-(2-(dimethylamino)ethoxy)pyridin-2-yl)-2'-methoxy-4'-(5-methyl-1,2,4-oxadiazol-3-yl)-[1,1'-biphenyl]-4-carboxamide $^1$H-NMR (400 MHz, DMSO-d$^6$): δ=11.31 (s, 1H), 8.66 (s, 1H), 8.15 (s, 1H), 8.09 (d, 2H), 7.69 (dd, 4H), 7.55 (d, 1H), 4.33 (t, 2H), 3.89 (s, 3H), 2.74 (t, 2H), 2.70 (s, 3H), 2.26 (s, 6H).
HPLC-MS: Rt 2.81 m/z 499.1 (MH$^+$).

Example 26: 2'-cyano-N-(5-cyano-4-(2-(dimethylamino)ethoxy)pyridin-2-yl)-4'-(5-methyl-1,2,4-oxadiazol-3-yl)-[1,1'-biphenyl]-4-carboxamide $^1$H-NMR (400 MHz, DMSO-d$^6$): δ=11.45 (s, 1H), 8.68 (s, 1H), 8.48 (s, 1H), 8.38 (d, 1H), 8.18 (m, 3H), 7.90 (d, 1H), 7.83 (d, 2H), 4.35 (t, 2H), 2.76 (t, 2H), 2.72 (s, 3H), 2.28 (s, 6H).

HPLC-MS: Rt 2.71 m/z 494.0 (MH+).

Example 27: N-(5-bromo-6-(2-(dimethylamino)ethoxy)pyridin-2-yl)-2'-cyclopropyl-4'-(5-methyl-1,2,4-oxadiazol-3-yl)-[1,1'-biphenyl]-4-carboxamide ¹H-NMR (400 MHz, DMSO-d⁶): δ=10.72 (s, 1H), 8.09 (d, 2H), 8.02 (d, 1H), 7.88 (dd, 1H), 7.75 (d, 1H), 7.64 (d, 2H), 7.60 (s, 1H), 7.44 (d, 1H), 4.47 (t, 2H), 2.68 (s, 3H), 2.67 (m, 2H), 2.24 (s, 6H), 1.92 (ddd, 1H), 0.93 (m, 2H), 0.73 (q, 2H).

HPLC-MS: Rt 3.51 m/z 563.9 (MH+).

Example 28: N-(5-bromo-6-(2-(dimethylamino)ethoxy)pyridin-2-yl)-2'-fluoro-4'-(5-methyl-1,2,4-oxadiazol-3-yl)-[1,1'-biphenyl]-4-carboxamide ¹H-NMR (400 MHz, DMSO-d⁶): δ=10.75 (s, 1H), 8.11 (d, 2H), 8.02 (d, 1H), 7.96 (d, 1H), 7.89 (d, 1H), 7.82 (t, 1H), 7.78 (d, 2H), 7.75 (d, 1H), 4.47 (t, 2H), 2.70 (s, 3H), 2.66 (t, 2H), 2.24 (s, 6H).

HPLC-MS: Rt 3.31 m/z 541.9 (MH+).

Example 29: N-(5-bromo-6-(2-(dimethylamino)eithoxy)pyridin-2-yl)-2'-chloro-4'-(5-methyl-1,2,4-oxadiazol-3-yl)-[1,1'-biphenyl]-4-carboxamide ¹H-NMR (400 MHz, DMSO-d⁶): δ=10.77 (s, 1H), 8.10 (m, 3H), 8.03 (m, 2H), 7.75 (d, 1H), 7.67 (m, 3H), 4.47 (t, 2H), 2.71 (s, 3H), 2.68 (t, 2H), 2.25 (s, 6H).

HPLC-MS: Rt 3.44 m/z 557.8 (MH+).

Example 30: N-(5-cyano-6-(2-(dimethylamino)ethoxy)pyridin-2-yl)-2'-cyclopropyl-4'-(5-methyl-1,2,4-oxadiazol-3-yl)-[1,1'-biphenyl]-4-carboxamide ¹H-NMR (400 MHz, DMSO-d⁶): δ=11.10 (s, 1H), 8.25 (d, 1H), 8.10 (d, 2H), 7.93 (d, 1H), 7.88 (dd, 1H), 7.66 (d, 2H), 7.60 (s, 1H), 7.44 (d, 1H), 4.61 (t, 2H), 2.92 (s, 2H), 2.68 (s, 3H), 2.41 (s, 6H), 1.91 (ddd, 1H), 0.92 (m, 2H), 0.74 (q, 2H).

HPLC-MS: Rt 3.21 m/z 509.0 (MH+).

Example 31: N-(5-cyano-6-(2-(dimethylamino)ethoxy)pyridin-2-yl)-2'-fluoro-4'-(5-methyl-1,2,4-oxadiazol-3-yl)-[1,1'-biphenyl]-4-carboxamide ¹H-NMR (400 MHz, DMSO-d⁶): δ=11.09 (s, 1H), 8.23 (d, 1H), 8.11 (d, 2H), 7.96 (d, 1H), 7.91 (d, 1H), 7.85 (d, 1H), 7.80 (t, 3H), 4.54 (t, 2H), 2.70 (s, 3H), 2.67 (d, 2H), 2.24 (s, 6H).

HPLC-MS: Rt 3.03 m/z 487.0 (MH+).

Example 32: 2'-chloro-N-(5-cyano-6-(2-(dimethylamino)ethoxy)pyridin-2-yl)-4'-(5-methyl-1,2,4-oxadiazol-3-yl)-[1,1'-biphenyl]-4-carboxamide ¹H-NMR (400 MHz, DMSO-d⁶): δ=11.12 (s, 1H), 8.23 (d, 1H), 8.09 (m, 4H), 7.92 (d, 1H), 7.67 (d, 3H), 4.54 (t, 2H), 2.70 (s, 3H), 2.69 (t, 2H), 2.24 (s, 6H).

HPLC-MS: Rt 3.14 m/z 503.0 (MH+).

Example 33: N-(5-bromo-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide ¹H-NMR (400 MHz, DMSO-d⁶): δ=11.12 (s, 1H), 8.64 (s, 1H), 8.04 (d, 2H), 7.88 (dd, 1H), 7.61 (m, 3H), 7.44 (d, 1H), 4.51 (t, 2H), 2.68 (s, 3H), 2.66 (t, 2H), 2.21 (s, 6H), 1.91 (td, 1H), 0.92 (m, 2H), 0.73 (m, 2H).

HPLC-MS: Rt 2.99 m/z 565.0 (MH+).

Example 34: N-(5-bromo-4-(2-(dimethylamino)ethoxy)pyrimidin-2-yl)-2'-fluoro-4'-(5-methyl-1,2,4-oxadiazol-3-yl)-[1,1'-biphenyl]-4-carboxamide ¹H-NMR (400 MHz, DMSO-d⁶): δ=11.15 (s, 1H), 8.64 (s, 1H), 8.05 (m, 2H), 7.96 (dd, 1H), 7.88 (dd, 1H), 7.82 (t, 1H), 7.76 (m, 2H), 4.48 (t, 2H), 2.70 (s, 3H), 2.66 (t, 2H), 2.21 (s, 6H).

HPLC-MS: Rt 2.81 m/z 542.9 (MH+).

Example 35: N-(5-bromo-4-(2-(dimethylamino)ethoxy)pyrimidin-2-yl)-2'-chloro-4'-(5-methyl-1,2,4-oxadiazol-3-yl)-[1,1'-biphenyl]-4-

¹H-NMR (400 MHz, DMSO-d⁶): δ=11.18 (s, 1H), 8.65 (s, 1H), 8.13 (s, 1H), 8.04 (m, 3H), 7.66 (m, 3H), 4.51 (t, 2H), 2.74 (t, 2H), 2.71 (s, 3H), 2.27 (s, 6H).

HPLC-MS: Rt 2.94 m/z 558.8 (MH+).

Example 36: N-(5-cyano-4-(2-(dimethylamino)ethoxy)pyrimidin-2-yl)-2'-cyclopropyl-4'-(5-methyl-1,2,4-oxadiazol-3-yl)-[1,1'-biphenyl]-4-carboxamide ¹H-NMR (400 MHz, DMSO-d⁶): δ=11.56 (s, 1H), 8.99 (s, 1H), 8.06 (d, 2H), 7.88 (d, 1H), 7.64 (d, 2H), 7.60 (s, 1H), 7.43 (d, 1H), 4.72 (s, 2H), 3.19 (s, 2H), 2.68 (s, 3H), 2.58 (s, 3H), 1.91 (m, 1H), 0.92 (m, 2H), 0.74 (m, 2H).

HPLC-MS: Rt 2.83 m/z 510.3 (MH+).

Example 37: N-(5-cyano-4-(2-(dimethylamino)ethoxy)pyrimidin-2-yl)-2'-fluoro-4'-(5-methyl-1,2,4-oxadiazol-3-yl)-[1,1'-biphenyl]-4-carboxamide ¹H-NMR (400 MHz, DMSO-d⁶): δ=11.56 (s, 1H), 8.91 (s, 1H), 8.05 (d, 2H), 7.96 (dd, 1H), 7.88 (dd, 1H), 7.82 (t, 1H), 7.75 (m, 2H), 4.52 (t, 2H), 2.70 (s, 3H), 2.65 (t, 2H), 2.20 (s, 6H).

HPLC-MS: Rt 2.68 m/z 488.0 (MH+).

Example 38: 2'-chloro-N-(5-cyano-4-(2-(dimethylamino)ethoxy)pyrimidin-2-yl)-4'-(5-methyl-1,2,4-oxadiazol-3-yl)-[1,1'-biphenyl]-4-carboxamide ¹H-NMR (400 MHz, DMSO-d⁶): δ=8.97 (s, 1H), 8.19 (d, 1H), 8.13 (s, 1H), 8.05 (m, 3H), 7.67 (m, 3H), 4.61 (t, 2H), 2.88 (t, 2H), 2.71 (s, 3H), 2.37 (s, 6H).

HPLC-MS: Rt 2.78 m/z 504.0 (MH+).

Example 39: N-(5-bromo-4-(2-(dimethylamino)ethoxy)pyridin-2-yl)-6-(2-cyclopropyl-4-(5-methyl-1,2,4-oxadiazol-3-yl)phenyl)nicotinamide ¹H-NMR (400 MHz, DMSO-d⁶): δ=11.29 (s, 1H), 9.27 (d, 1H), 8.47 (dd, 1H), 8.41 (s, 1H), 8.08 (s, 1H), 7.91 (dd, 1H), 7.85 (d, 1H), 7.67-7.61 (m, 2H), 4.28 (t, 2H), 2.75 (t, 2H), 2.69 (s, 3H), 2.27 (s, 6H), 2.18 (td, 1H), 0.96-0.89 (m, 2H), 0.68 (q, 2H).

HPLC-MS: Rt 2.91 m/z 564.1 (MH$^+$).

Example 40: N-(5-bromo-4-(2-(dimethylamino) ethoxy)pyridin-2-yl)-6-(2-fluoro-4-(5-methyl-1,2,4-oxadiazol-3-yl)phenyl)nicotinamide $^1$H-NMR (400 MHz, DMSO-d$^6$): δ=11.31 (s, 1H), 9.28 (s, 1H), 8.49 (d, 1H), 8.40 (s, 1H), 8.23 (t, 1H), 8.07 (s, 1H), 8.00 (t, 2H), 7.90 (d, 1H), 4.27 (t, 2H), 2.75 (t, 2H), 2.70 (s, 3H), 2.28 (s, 6H).

HPLC-MS: Rt 2.88 m/z 542.8 (MH$^+$).

Example 41: N-(5-bromo-4-(2-(dimethylamino) ethoxy)pyridin-2-yl)-6-(2-chloro-4-(5-methyl-1,2,4-oxadiazol-3-yl)phenyl)nicotinamide $^1$H-NMR (400 MHz, DMSO-d$^6$): δ=11.33 (s, 1H), 9.27 (s, 1H), 8.49 (dd, 1H), 8.41 (s, 1H), 8.14 (s, 1H), 8.09 (m, 2H), 7.93 (d, 1H), 7.86 (d, 1H), 4.28 (t, 2H), 2.76 (t, 2H), 2.71 (s, 3H), 2.29 (s, 6H).

HPLC-MS: Rt 2.89 m/z 558.9 (MH$^+$).

Example 42: N-(5-bromo-4-(2-(dimethylamino) ethoxy)pyridin-2-yl)-6-(4-(5-methyl-1,2,4-oxadiazol-3-yl)-2-(trifluoromethyl)phenyl)nicotinamide $^1$H-NMR (400 MHz, DMSO-d$^6$): δ=11.34 (s, 1H), 9.23 (d, 1H), 8.50 (dd, 1H), 8.39 (m, 3H), 8.07 (s, 1H), 7.83 (d, 1H), 7.76 (d, 1H), 4.28 (t, 2H), 2.76 (t, 2H), 2.73 (s, 3H), 2.28 (s, 6H).

HPLC-MS: Rt 2.98 m/z 593.0 (MH$^+$).

Example 43: N-(5-bromo-4-(2-(dimethylamino) ethoxy)pyridin-2-yl)-6-(2-methoxy-4-(5-methyl-1,2,4-oxadiazol-3-yl)phenyl)nicotinamide $^1$H-NMR (400 MHz, DMSO-d$^6$): δ=11.25 (s, 1H), 9.24 (d, 1H), 8.40 (m, 2H), 8.09 (d, 2H), 8.03 (d, 1H), 7.74 (d, 1H), 7.71 (s, 1H), 4.28 (t, 2H), 3.97 (s, 3H), 2.77 (t, 2H), 2.70 (s, 3H), 2.29 (s, 6H).

HPLC-MS: Rt 2.76 m/z 554.9 (MH$^+$).

Example 44: N-(5-bromo-4-(2-(dimethylamino) ethoxy)pyridin-2-yl)-6-(2-cyano-4-(5-methyl-1,2,4-oxadiazol-3-yl)phenyl)nicotinamide $^1$H-NMR (400 MHz, DMSO-d$^6$): δ=11.41 (s, 1H), 9.30 (d, 1H), 8.57 (dd, 1H), 8.49 (s, 1H), 8.45 (s, 1H), 8.42 (dd, 1H), 8.19 (d, 1H), 8.13 (d, 1H), 8.09 (s, 1H), 4.46 (t, 2H), 3.21 (t, 2H), 2.73 (s, 3H), 2.62 (s, 6H).

HPLC-MS: Rt 2.71 m/z 549.9 (MH$^+$).

Example 45: N-(5-cyano-4-(2-(dimethylamino) ethoxy)pyridin-2-yl)-6-(2-cyclopropyl-4-(5-methyl-1,2,4-oxadiazol-3-yl)phenyl)nicotinamide $^1$H-NMR (400 MHz, DMSO-d$^6$): δ=11.60 (s, 1H), 9.26 (d, 1H), 8.69 (s, 1H), 8.47 (dd, 1H), 8.14 (s, 1H), 7.91 (d, 1H), 7.86 (d, 1H), 7.67-7.61 (m, 2H), 4.35 (t, 2H), 2.76 (t, 2H), 2.69 (s, 3H), 2.28 (s, 6H), 2.18 (ddd, 1H), 0.97-0.88 (m, 2H), 0.69 (q, 2H).

HPLC-MS: Rt 2.70 m/z 510.1 (MH$^+$).

Example 46: N-(5-cyano-4-(2-(dimethylamino) ethoxy)pyridin-2-yl)-6-(2-fluoro-4-(5-methyl-1,2,4-oxadiazol-3-yl)phenyl)nicotinamide $^1$H-NMR (400 MHz, DMSO-d$^6$): δ=11.62 (s, 1H), 9.28 (d, 1H), 8.68 (s, 1H), 8.49 (dd, 1H), 8.22 (d, 1H), 8.13 (s, 2H), 8.00 (m, 2H), 7.90 (d, 1H), 4.34 (t, 2H), 2.75 (t, 2H), 2.70 (s, 3H), 2.27 (s, 6H).

HPLC-MS: Rt 2.64 m/z 488.0 (MH$^+$).

Example 47: 6-(2-chloro-4-(5-methyl-1,2,4-oxadiazol-3-yl)phenyl)-N-(5-cyano-4-(2 (dimethylamino) ethoxy)pyridin-2-yl)nicotinamide $^1$H-NMR (400 MHz, DMSO-d$^6$): δ=11.64 (s, 1H), 9.27 (d, 1H), 8.69 (s, 1H), 8.49 (dd, 1H), 8.14 (s, 2H), 8.10 (dd, 1H), 7.94 (d, 1H), 7.86 (d, 1H), 4.35 (t, 2H), 2.75 (t, 2H), 2.71 (s, 3H), 2.27 (s, 6H).

HPLC-MS: Rt 2.69 m/z 504.0 (MH$^+$).

Example 48: N-(5-cyano-4-(2-(dimethylamino) ethoxy)pyridin-2-yl)-6-(4-(5-methyl-1,2,4-oxadiazol-3-yl)-2-(trifitioromethyl)phenyl)nicotinamide $^1$H-NMR (400 MHz, DMSO-d$^6$): δ=11.65 (s, 1H), 9.22 (d, 1H), 8.69 (s, 1H), 8.50 (dd, 1H), 8.39 (m, 2H), 8.13 (s, 1H), 7.83 (d, 1H), 7.77 (d, 1H), 4.34 (t, 2H), 2.75 (t, 2H), 2.73 (s, 3H), 2.26 (s, 6H).

HPLC-MS: Rt 2.74 m/z 538.1 (MH$^+$).

Example 49: N-(5-cyano-4-(2-(dimethyiamino) ethoxy)pyridin-2-yl)-6-(2-methoxy-4-(5-methyl-1,2,4-oxadiazol-3-yl)phenyl)nicotinamide $^1$H-NMR (400 MHz, DMSO-d$^6$): δ=11.55 (s, 1H), 9.23 (d, 1H), 8,68 (s, 1H), 8.40 (dd, 1H), 8.14 (s, 1H), 8.09 (d, 1H), 8.03 (d, 1H), 7.74 (d, 1H), 7.71 (s, 1H), 4.34 (t, 2H), 3.97 (s, 3H), 2.75 (t, 2H), 2.70 (s, 3H), 2.27 (s, 6H).

HPLC-MS: Rt 2.56 m/z 500.0 (MH$^+$).

Example 50: N-(5-cyano-4-(2-(dimethylamino) ethoxy)pyridin-2-yl)-6-(2-cyano-4-(5-methyl-1,2,4-oxadiazol-3-yl)phenyl)nicotinamide $^1$H-NMR (400 MHz, DMSO-d$^6$): δ=11.70 (s, 1H), 9.30 (s, 1H), 8.71 (s, 1H), 8.57 (d, 1H), 8.49 (s, 1H), 8.42 (d, 1H), 8.19 (d, 1H), 8.14 (d, 2H), 4.46 (t, 2H), 3.05 (t, 2H), 2.73 (s, 3H), 2.45 (s, 6H).

HPLC-MS: Rt 2.49 m/z 495.0 (MH$^+$).

Example 51: N-(5-bromo-6-(2-(dimethylamino) ethoxy)pyridin-2-yl)-6-(2-cyclopropyl-4-(5-methyl-1,2,4-oxadiazol-3-yl)phenyl)nicotinamide $^1$H-NMR (400 MHz, DMSO-d$^6$): δ=10.99 (s, 1H), 9.22 (s, 1H), 8.42 (dd, 1H), 8.05 (d, 1H), 7.92 (d, 1H), 7.85 (d, 1H), 7.76 (d, 1H), 7.63 (m, 2H), 4.50 (t, 2H), 2.79 (s, 2H), 2.69 (s, 3H), 2.33 (s, 6H), 2.18 (m, 1H), 0.92 (d, 2H), 0.69 (d, 2H).

HPLC-MS: Rt 3.18 m/z 564.9 (MH$^+$).

Example 52: N-(5-bromo-6-(2-(dimethylamino) ethoxy)pyridin-2-yl)-6-(2-fluoro-4-(5-methyl-1,2,4-oxadiazol-3-yl)phenyl)nicotinamide $^1$H-NMR (400 MHz, DMSO-d$^6$): δ=11.00 (s, 1H), 9.24 (d, 1H), 8.46 (dd, 1H), 8.23 (t, 1H), 8.03 (dd, 3H), 7.92 (d, 1H), 7.75 (d, 1H), 4.47 (t, 2H), 2.71 (s, 3H), 2.68 (d, 2H), 2.25 (s, 6H).

HPLC-MS: Rt 3.13 m/z 542.9 (MH+).

Example 53: N-(5-bromo-6-(2-(dimethylamino)ethoxy)pyridin-2-yl)-6-(2-chloro-4-(5-methyl-1,2,4-oxadiazol-3-yl)phenyl)nicotinamide $^1$H-NMR (400 MHz, DMSO-d$^6$): δ=11.03 (s, 1H), 9.21 (d, 1H), 8.44 (dd, 1H), 8.14 (s, 1H), 8.10 (d, 1H), 8.04 (d, 1H), 7.92 (d, 1H), 7.85 (d, 1H), 7.75 (d, 1H), 4.46 (t, 2H), 2.71 (s, 3H), 2.66 (t, 2H), 2.24 (s, 6H).

HPLC-MS: Rt 3.16 m/z 558.8 (MH+).

Example 54: N-(5-cyano-6-(2-(dimethylamino)ethoxy)pyridin-2-yl)-6-(2-cyclopropyl-4-(5-methyl-1,2,4-oxadiazol-3-yl)phenyl)nicotinamide $^1$H-NMR (400 MHz, DMSO-d$^6$): δ=11.31 (s, 1H), 9.22 (s, 1H), 8.43 (d, 1H), 8.26 (d, 1H), 7.92 (d, 2H), 7.86 (d, 1H), 7.63 (m, 2H), 4.55 (s, 2H), 2.69 (s, 5H), 2.26 (s, 6H), 2.18 (s, 1H), 0.92 (d, 2H), 0.69 (d, 2H).

HPLC-MS: Rt 2.88 m/z 510.0 (MH+).

Example 55: N-(5-cyano-6-(2-(dimethylamino)ethoxy)pyridin-2-yl)-6-(2-fluoro-4-(5-methyl-1,2,4-oxadiazol-3-yl)phenyl)nicotinamide $^1$H-NMR (400 MHz, DMSO-d$^6$): δ=11.32 (s, 1H), 9.24 (d, 1H), 8.45 (dd, 1H), 8.23 (dd, 2H), 8.02 (dd, 2H), 7.91 (d, 2H), 4.54 (t, 2H), 2.71 (s, 3H), 2.68 (d, 2H), 2.24 (s, 6H).

HPLC-MS: Rt 2.83 m/z 488.0 (MH+).

Example 56: 6-(2-chloro-4-(5-methyl-1,2,4-oxadiazol-3-yl)pheny)-N-(5-cyano-6-(2-(dimethylamino)ethoxy)pyridin-2-yl)nicotinamide $^1$H-NMR (400 MHz, DMSO-d$^6$): δ=11.36 (s, 2H), 9.21 (d, 1H), 8.44 (dd, 1H), 8.26 (d, 1H), 8.14 (d, 1H), 8.10 (dd, 1H), 7.92 (t, 2H), 7.85 (d, 1H), 4.54 (t, 2H), 2.71 (s, 3H), 2.70 (t, 2H), 2.25 (s, 6H).

HPLC-MS: Rt 2.84 m/z 504.0 (MH+).

Example 57: N-(5-bromo-4-(2-(dimethylamino)ethoxy)pyrimidin-2-yl)-6-(2-cyclopropyl-4-(5-methyl-1,2,4-oxadiazol-3-yl)phenyl)nicotinamide $^1$H-NMR (400 MHz, DMSO-d$^6$): δ=11.36 (s, 1H), 9.18 (s, 1H), 8.66 (s, 1H), 8.38 (d, 1H), 7.92 (d, 1H), 7.84 (d, 1H), 7.67-7.61 (m, 2H), 4.51 (t, 2H), 2.75-2.64 (m, [5H(2H+3H)]), 2.24 (s, 1H), 2.17 (dd, 1H), 0.92 (d, 2H), 0.69 (d, 2H).

HPLC-MS: Rt 2.66 m/z 565.9 (MH+).

Example 58: N-(5-bromo-4-(2-(dimethylamino)ethoxy)pyrimidin-2-yl)-6-(2-fluoro-4-(5-methyl-1,2,4-oxadiazol-3-yl)phenyl)nicotinamide $^1$H-NMR (400 MHz, DMSO-d$^6$): δ=11.38 (s, 1H), 9.19 (d, 1H), 8.65 (s, 1H), 8.40 (dd, 1H), 8.23 (t, 1H), 8.01 (ddd, 2H), 7.91 (dd, 1H), 4.47 (t, 2H), 2.70 (s, 3H), 2.66 (t, 2H), 2.20 (s, 6H).

HPLC-MS: Rt 2.61 m/z 543.9 (MH+).

Example 59: N-(5-bromo-4-(2-(dimethylamino)ethoxy)pyrimidin-2-yl)-6-(2-chloro-4-(5-methyl-1,2,4-oxadiazol-3-yl)phenyl)nicotinamide $^1$H-NMR (400 MHz, DMSO-d$^6$): δ=11.38 (s, 1H), 9.17 (d,1H), 8.65 (s, 1H), 8.39 (dd, 1H), 8.14 (d, 1H), 8.10 (dd, 1H), 7.91 (d, 1H), 7.85 (d, 1H), 4.48 (t, 2H), 2.71 (s, 3H), 2.67 (t, 2H), 2.22 (s, 6H).

HPLC-MS: Rt 2.64 m/z 559.8 (MH+).

Example 60: N-(5-cyano-4-(2-(dimethylamino)ethoxy)pyrimidin-2-yl)-6-(2-cyclopropyl-4-(5-methyl-1,2,4-oxadiazol-3-yl)phenyl)nicotinamide $^1$H-NMR (400 MHz, DMSO-d$^6$): δ=11.74 (s, 1H), 9.17 (d, 1H), 8.95 (s, 1H), 8.38 (dd, 1H), 7.92 (dd, 1H), 7.85 (d, 1H), 7.65 (d, 1H), 7.63 (d, 1H), 4.55 (t, 2H), 2.71-2.65 (m, 5H (2H+3H)), 2.22 (s, 6H), 2.17 (ddd, 1H), 0.96-0.89 (m, 2H), 0.72-0.66 (m, 2H).

HPLC-MS: Rt 2.46 m/z 511.1 (MH+).

Example 61: N-(5-cyano-4-(2-(dimethylamino)eithoxy)pyrimidin-2-yl)-6-(2-fluoro-4-(5-methyl-1,2,4-oxadiazol-3-yl)phenyl)nicotinamide $^1$H-NMR (400 MHz, DMSO-d$^6$): δ=11.67 (s, 1H), 9.20 (d, 1H), 8.97 (s, 1H), 8.41 (dd, 1H), 8.23 (t, 1H), 8.02 (td, 2H), 7.92 (m, 1H), 4.55 (t, 2H), 2.75 (t, 2H), 2.71 (s, 3H), 2.27 (s, 6H).

HPLC-MS: Rt 2.39 m/z 489.0 (MH+).

Example 62: 6-(2-chloro-4-(5-methyl-1,2,4-oxadiazol-3-yl)phenyl)-N-(5-cyano-4-(2-(dimethylamino)ethoxy)pyrimidin-2-yl)nicotinamide $^1$H-NMR (400 MHz, DMSO-d$^6$): δ=11.73 (s, 1H), 9.18 (d, 1H), 8.96 (s, 1H), 8.40 (dd, 1H), 8.15 (d,1H), 8.13-8.07 (m, 1H), 7.92 (d, 1H), 7.86 (d, 1H), 4.53 (t, 2H), 2.71 (s, 3H), 2.67 (t, 2H), 2.22 (s, 6H).

HPLC-MS: Rt 2.43 m/z 505.0 (MH+).

Example 63: N-(5-bromo-4-(2-(dimethylamino)ethoxy)pyridin-2-yl)-2-(2-cyclopropyl-4-(5-methyl-1,2,4-oxadiazol-3-yl)phenyl)pyrimidine-5-carboxamide $^1$H-NMR (400 MHz, DMSO-d$^6$): δ=11.49 (s, 1H), 9.43 (s, 2H), 8.43 (s, 1H), 8.07 (s, 1H), 7.92 (q, 2H), 7.67 (s, 1H), 4.28 (t, 2H), 2.75 (t, 2H), 2.69 (s, 3H), 2.63 (td, 1H), 2.28 (s, 6H), 0.98-0.88 (m, 2H), 0.66 (q, 2H).

HPLC-MS: Rt 2.89 m/z 565.0 (MH+).

Example 64: N-(5-cyano-4-(2-(dimethylamino)ethoxy)pyridin-2-yl)-2-(2-cyclopropyl-4-(5-methyl-1,2,4-oxadiazol-3-yl)phenyl)pyrimidine-5-carboxamide $^1$H-NMR (400 MHz, DMSO-d$^6$): δ=11.78 (s, 1H), 9.44 (s, 2H), 8.71 (s, 1H), 8.13 (s, 1H), 7.92 (q, 2H), 7.67 (s, 1H), 4.35 (t, 2H), 2.75 (t, 2H), 2.69 (s, 3H), 2.63 (td, 1H), 2.27 (s, 6H), 0.98-0.89 (m, 2H), 0.66 (q, 2H).
HPLC-MS: Rt 2.67 m/z 511.0 (MH+).

Example 65: 4-bromo-3-(2-(dimethylamino) ethoxy)-N-(6-(2-fluoro-4-(5-methyl-1,2,4-oxadiazol-3-yl)phenyl)pyridin-3-yl)benzamide Example of a General Procedure According to Scheme 7b

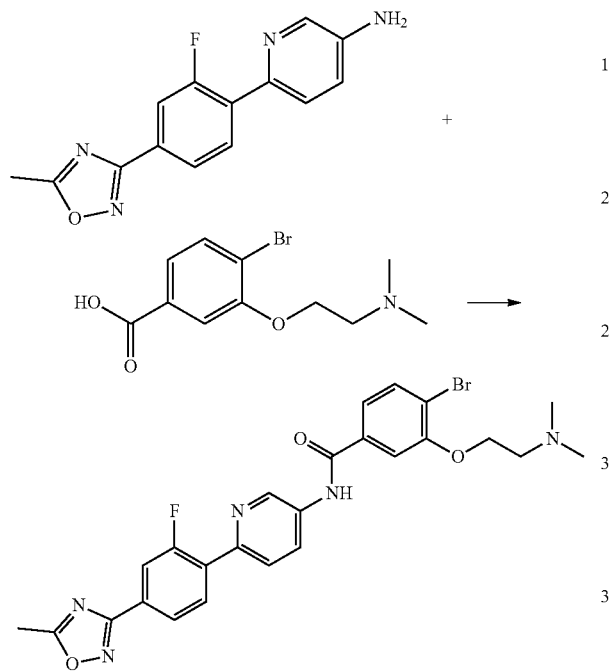

To a solution of 4-bromo-3-(2-(dimethylamino)ethoxy) benzoic acid (80 mg, 0.29 mmol), HATU (124.1 mg, 0.32 mmol) and DIPEA (0.11 mL, 0.65 mmol) in 0.5 mL of anhydrous DMF, was added dropwise 6-(2-fluoro-4-(5-methyl-1,2,4-oxadiazol-3-yl)phenyl)pyridin-3-amine (85.3 mg, 0.29 mmol) in 1.0 mL of anhydrous DMF. The mixture was stirred at room temperature overnight. The reaction was diluted with ethyl acetate and was washed with NaHCO$_3$ saturated two times. The organic layer was dried with sodium sulphate and concentrated. The crude was purified by combiflash chromatography column (DCM/MeOH) to afford 4-bromo-3-(2-(dimethylamino)ethoxy)-N-(6-(2-fluoro-4-(5-methyl-1,2,4-oxadiazol-3-yl)phenyl)pyridin-3-yl)benzamide (91.4 mg, 57.1%).
$^1$H-NMR (400 MHz, DMSO-d$^6$): δ=10.82 (s, 1H), 9.15 (d, 1H), 8.38 (dd, 1H), 8.20 (t, 1H), 7.96 (t, 2H), 7.86 (dd, 2H), 7.77 (d, 1H), 7.64 (dd, 1H), 4.59 (m, 2H), 3.63 (d, 2H), 2.95 (d, 6H), 2.70 (s, 3H).
HPLC-MS: Rt 2.98 m/z 542.0 (MH+).

Examples 66 to 76 have been obtained as shown in example 65 starting from the corresponding carboxylic acid and amine.

Example 66: 4-bromo-N-(6-(2-cyclopropyl-4-(5-methyl-1,2,4-oxadiazol-3-yl)phenyl)pyridin-3-yl)-3-(2-(dimethylamino)ethoxy)benzamide $^1$H-NMR (400 MHz, DMSO-d$^6$): δ=10.62 (s, 1H), 9.06 (s, 1H), 8.31 (d, 1H), 7.88 (d, 1H), 7.83 (d, 1H), 7.73 (d, 1H), 7.68 (s, 1H), 7.64-7.57 (m, 3H), 4.45-4.39 (m, 2H), 2.68 (s, 5H), 2.65 (s, 6H), 2.24-2.15 (m, 1H), 0.92 (d, 2H), 0.67 (d, 2H).
HPLC-MS: Rt 2.99 m/z 564.0 (MH+).

Example 67: 4-bromo-N-(6-(2-chloro-4-(5-methyl-1,2,4-oxadiazol-3-yl)phenyl)pyridin-3-yl)-3-(2-(dimethylamino)ethoxy)benzamide $^1$H-NMR (400 MHz, DMSO-d$^6$): δ=10.72 (s, 1H), 9.09 (d, 1H), 8.34 (dd, 1H), 8.12 (d, 1H), 8.07 (dd, 1H), 7.87 (d, 1H), 7.83 (d, 2H), 7.71 (s, 1H), 7.65 (dd, 1H), 4.55 (t, 2H), 3.63 (t, 2H), 2.96 (s, 6H), 2.71 (s, 3H).
HPLC-MS: Rt 3.01 m/z: 557.9 (MH+).

Example 68: 4-bromo-3-(2-(dimethylamino)ethoxy)-N-(6-(4-(5-methyl-1,2,4-oxadiazol-3-yl)-2-(trifluoromethyl)phenyl)pyridin-3-yl)benzamide $^1$H-NMR (400 MHz, DMSO-d$^6$): δ=10.76 (s, 1H), 9.06 (s, 1H), 8.36 (m, 3H), 7.84 (d, 1H), 7.81 (d, 1H), 7.74 (s, 1H), 7.63 (t, 2H), 4.52 (t, 2H), 3.44 (t, 2H), 2.81 (s, 6H), 2.72 (s, 3H).
HPLC-MS: Rt 3.06 m/z: 592.0 (MH+).

Example 69: 4-bromo-3-(2-(dimethylamino)ethoxy)-N-(6-(2-methoxy-4-(5-methyl-1,2,4-oxadiazol-3-yl)phenyl)pyridin-3-yl)benzamide $^1$H-NMR (400 MHz, DMSO-d$^6$): δ=10.62 (s, 1H), 9.05 (m, 1H), 8.25 (dd, 1H), 8.00 (dd, 2H), 7.84 (d, 1H), 7.71 (m, 3H), 7.62 (dd, 1H), 4.49 (s, 2H), 3.96 (s, 3H), 2.83 (s, 5H), 2.70 (s, 3H).
HPLC-MS: Rt 2.84 m/z 553.9 (MH+).

Example 70: 4-bromo-N-(6-(2-cyano-4-(5-methyl-1,2,4-oxadiazol-3-yl)phenyl)pyridin-3-yl)-3(2-(dimethylamino)ethoxy)benzamide $^1$H-NMR (400 MHz, DMSO-d$^6$): δ=10.75 (s, 1H), 9.12 (d, 1H), 8.45 (d, 1H), 8.42 (dd, 1H), 8.38 (dd, 1H), 8.13 (d, 1H), 8.03 (d, 1H), 7.86 (d, 1H) 7.70 (d, 1H), 7.63 (dd, 1H), 4.48 (t, 2H), 3.54 (t, 2H), 2.79 (s, 6H), 2.72 (s, 3H).
HPLC-MS: Rt 2.84 m/z: 548.9 (MH+).

Example 71: 4-cyano-N-(6-(2-cyclopropyl-4-(5-methyl-1,2,4-oxadiazol-3-yl)phenyl)pyridin-3-yl)-3(2-(dimethylamino)ethoxy)benzamide $^1$H-NMR (400 MHz, DMSO-d$^6$): δ=10.75 (s, 1H), 9.05 (d, 1H), 8.31 (dd, 1H), 7.96 (d, 1H), 7.88 (d, 1H), 7.79-7.72 (m, 2H), 7.68 (d, 1H), 7.64-7.57 (m, 2H), 4.38 (t, 2H), 2.84 (s, 2H), 2.68 (s, 3H), 2.35 (s, 6H), 2.25-2.16 (m, 1H), 0.92 (q, 2H), 0.72-0.63 (m, 2H).
HPLC-MS: Rt 2.74 m/z 509.1 (MH+).

Example 72: 4-cyano-3-(2-(dimethylamino)ethoxy)-N-(6-(2-fluoro-4-(5-methyl-1,2,4-oxadiazol-3-yl) phenyl)pyridin-3-yl)benzamide $^1$H-NMR (400 MHz, DMSO-d$^6$): δ=11.15 (s, 1H), 9.21 (d, 1H), 8.43 (dd, 1H), 8.19 (t, 1H), 8.00 (d, 1H), 7.96 (t, 3H), 7.87 (d, 1H), 7.78 (d, 1H), 4.73 (m, 2H), 3.64 (d, 2H), 2.92 (d, 6H), 2.70 (s, 3H).
HPLC-MS: Rt 2.71 m/z 487.1 (MH+).

Example 73: N-(6-(2-chloro-4-(5-methyl-1,2,4-oxadiazol-3-yl)phenyl)pyridin-3-yl)-4-cyano-3-(2-(dimethylamino)ethoxy)benzamide $^1$H-NMR (400 MHz, DMSO-d$^6$): δ=11.11 (s, 1H), 9.17 (d, 1H), 8.42 (dd, 1H), 8.12 (d, 1H), 8.07 (dd, 1H), 8.02 (d, 1H), 7.94 (s, 1H), 7.85 (d, 1H), 7.83 (d, 1H), 7.79 (d, 1H), 4.72 (t, 2H), 3.65 (t, 2H), 2.93 (d, 6H), 2.70 (s, 3H).
HPLC-MS: Rt 2.74 m/z: 503.1 (MH$^+$).

Example 74: 4-cyano-3-(2-(dimethylamino)ethoxy)-N-(6-(4-(5-methyl-1,2,4-oxadiazol-3-yl)-2-(trifluoromethyl)phenyl)pyridin-3-yl)benzamide $^1$H-NMR (400 MHz, DMSO-d$^6$): δ=10.82 (s, 1H), 9.02 (d, 1H), 8.36 (m, 2H), 8.33 (d, 1H), 7.99 (d, 2H), 7.81 (d, 1H), 7.78 (s, 1H), 7.71 (d, 1H), 7.65 (d, 1H), 4.46 (t, 2H), 3.09 (t, 2H), 2.72 (s, 3H), 2.53 (s, 6H).
HPLC-MS: Rt 2.81 m/z: 537.1 (MH$^+$).

Example 75: 4-cyano-3-(2-(dimethylamino)ethoxy)-N-(6-(2-methoxy-4-(5-methyl-1,2,4-oxadiazol-3-yl)phenyl)pyridin-3-yl)benzamide $^1$H-NMR (400 MHz, DMSO-d$^6$): δ=10.73 (s, 1H), 9.04 (d, 1H), 8.25 (dd, 1H), 7.99 (m, 3H), 7.77 (d, 1H), 7.72 (dd, 1H), 7.69 (m, 2H), 4.41 (t, 2H), 3.96 (m, 3H), 2.91 (s, 2H), 2.70 (s, 3H), 2.40 (s, 6H).
HPLC-MS: Rt 2.59 m/z 499.0 (MH$^+$).

Example 76: 4-cyano-N-(6-(2-cyano-4-(5-methyl-1,2,4-exadiazol-3-yl)phenyl)pyridin-3-yl)-3-(2-(dimethylamino)ethoxy)benzamide $^1$H-NMR (400 MHz, DMSO-d$^6$): δ=10.89 (s, 1H), 9.12 (d, 1H), 8.45 (d, 1H), 8.42 (dd, 1H), 8.38 (dd, 1H), 8.13 (d, 1H), 8.03 (t, 2H), 7.79 (d, 1H), 7.75 (dd, 1H), 4.56 (t, 2H), 3.39 (t, 2H), 2.76 (s, 6H), 2.72 (s, 3H).
HPLC-MS: Rt 2.56 m/z 494.0 (MH$^+$).

The invention claimed is:

1. A compound of formula (I):

and pharmaceutically acceptable salts thereof, wherein:
G represents a group selected from:
a) —C(O)NH—, or
b) —NHC(O)—;
$X^1$, $X^2$, $X^3$ and $X^4$ represent a N atom or C-R$^5$ group;
$R^1$ and $R^2$ are independently selected from the group consisting of:
a) hydrogen atom,
b) linear or branched $C_1$-$C_6$ alkyl optionally substituted by 1, 2 or 3 substituents selected from —N(R$^6$)R$^7$, —OR$^6$, halogen atom and $C_3$-$C_6$ cycloalkyl, and
c) $C_3$-$C_6$ cycloalkyl,
or R$^1$ and R$^2$ form together with the nitrogen atom to which they are attached a four to six-membered heterocyclic group, comprising additionally a second heteroatom selected from N and O;
R$^3$ represents a group selected from:
a) cyano group, or
b) halogen atom;
R$^4$ represents a group selected from:
a) halogen atom,
b) $C_3$-$C_4$ cycloalkyl group,
c) $C_1$-$C_3$ alkoxy group,
d) $C_1$-$C_3$ haloalkyl group, or
e) cyano group;
R$^5$ represents a group selected from:
a) hydrogen atom,
b) $C_1$-$C_3$ alkyl, or
c) halogen atom; and
R$^6$ and R$^7$ represent independently a group selected from:
a) $C_1$-$C_3$ alkyl, or
b) hydrogen atom,
with the proviso that at least one of the $X^1$, $X^2$, $X^3$ and $X^4$ represents a N atom.

2. The compound according to claim 1, wherein R$^1$ and R$^2$ are methyl groups.

3. The compound according to claim 1, wherein G represents —C(O)NH— wherein the carbonyl group is linked to the cycle comprising $X^3$ and $X^4$ and the amine group is linked to the cycle comprising $X^1$ and $X^2$.

4. The compound according to claim 1, wherein R$^3$ is cyano group.

5. The compound according to claim 1, wherein R$^4$ is selected from halogen atom or $C_3$-$C_4$ cycloalkyl group.

6. The compound according to claim 5, wherein R$^4$ is selected from chlorine atom, fluorine atom or cyclopropyl group.

7. The compound according to claim 1, wherein a core of formula (I) represented as:

is selected from:

(i)

wherein X³ is N and X¹, X², X⁴ are a N atom or C—R⁵ group, wherein R⁵ represents a group selected from: a hydrogen atom, a C₁-C₃alkyl, or a halogen atom, and G represents a group selected from —C(O)NH— or —NHC(O)—;

(ii)

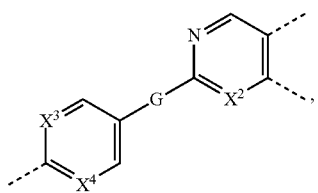

wherein X¹ is N and X², X³, X⁴ are a N atom or C—R⁵ group, wherein R⁵ represents a group selected from: a hydrogen atom, a C₁-C₃ alkyl, or a halogen atom, and G represents a group selected from —C(O)NH— or —NHC(O)—; and (iii)

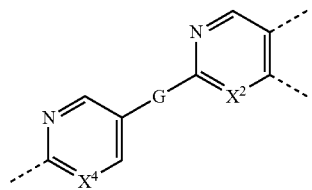

wherein X¹ and X³ are N and X², X⁴ are a N atom or C—R⁵ group, wherein R⁵ represents a group selected from: a hydrogen atom, a C₁-C₃ alkyl, or a halogen atom, and G represents a group selected from —C(O)NH— or —NHC(O)—.

8. The compound according to claim 7, wherein the core is:

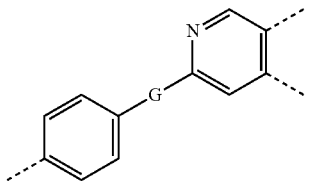

wherein G represents a group selected from —C(O)NH— or —NHC(O)—.

9. The compound according to claim 7, wherein the core is:

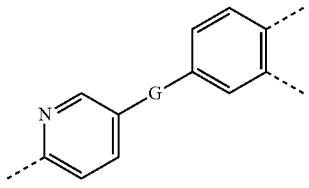

wherein G represents a group selected from —C(O)NH— or —NHC(O)—.

10. The compound according to claim 1, having one of the following formulas (Ia), (Ib) and (Ic)

(Ia)

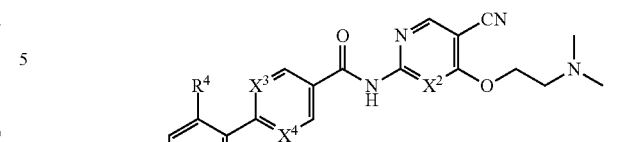

(Ib)

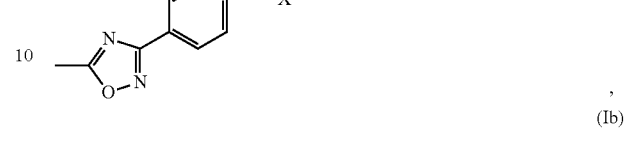

or (Ic)

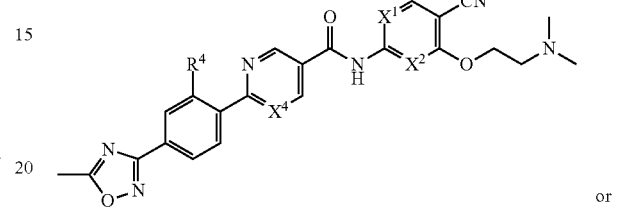

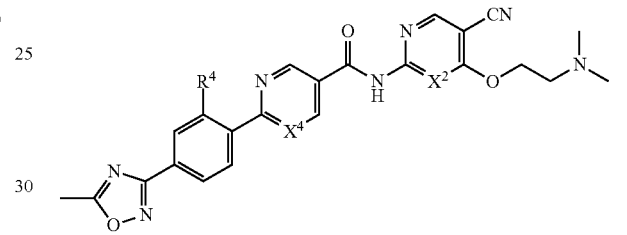

wherein R⁴ represents a group selected from halogen atom or cyclopropyl group.

11. The compound according to claim 1, which is selected from the group consisting of:
N-(4-bromo-3-(2-(dimethylamino)ethoxy)phenyl)-6-(2-cyclopropyl-4-(5-methyl-1,2,4-oxadiazol-3-yl) phenyl) nicotinamide,
N-(4-bromo-3-(2-(dimethylamino)ethoxy)phenyl)-6-(2-fluoro-4-(5-methyl-1,2,4-oxadiazol-3-y1) phenyl)nicotinamide,
N-(4-bromo-3-(2-(dimethylamino)ethoxy)phenyl)-6-(2-chloro-4-(5-methyl-1,2,4-oxadiazol-3-yl) phenyl)nicotinamide,
N-(4-bromo-3-(2-(dimethylamino)ethoxy)phenyl)-6-(4-(5-methyl-1,2,4-oxadiazol-3-yl)-2-(trifluoromethyl) phenyl)nicotinamide,
N-(4-bromo-3-(2-(dimethylamino)ethoxy)phenyl)-6-(2-methoxy-4-(5-methyl-1,2,4-oxadiazol-3-yl)phenyl) nicotinamide,
N-(4-bromo-3-(2-(dimethylamino)ethoxy)phenyl)-6-(2-cyano-4-(5-methyl-1,2,4-oxadiazol-3-yl)phenyl)nicotinamide,
N-(4-cyano-3-(2-(dimethylamino)ethoxy)phenyl)-6-(2-cyclopropyl-4-(5-methyl-1,2,4-oxadiazol-3-yl)phenyl) nicotinamide,
N-(4-cyano-3-(2-(dimethylamino)ethoxy)phenyl)-6-(2-fluoro-4-(5-methyl-1,2,4-oxadiazol-3-yl)phenyl)nicotinamide,
6-(2-chloro-4-(5-methyl-1,2,4-oxadiazol-3-yl) phenyl)-N-(4-cyano-3-(2-(dimethylamino) ethoxy)phenyl) nicotinamide,
N-(4-bromo-3-(2-(dimethylamino)ethoxy)phenyl)-6-(4-(5-methyl-1,2,4-oxadiazol-3-yl)-2-(trifluoromethyl) phenyl)nicotinamide, N-(4-bromo-3-(2-(dimethylamino)ethoxy)phenyl)-6-(2-methoxy-4-(5-methyl-1,2,4-oxadiazol-3-yl)phenyl)nicotinamide, N-(4-bromo-3-(2-(dimethylamino)ethoxy)phenyl)-6-(2-cyano-4-(5-methyl-1,2,4-oxadiazol-3-yl)phenyl)nicotinamide, N-(4-bromo-3-(2-(dimethylamino)ethoxy)phenyl)-2-(2-cyclopropyl-4-(5-methyl-1,2,4-oxadiazol-3-yl)phenyl)pyrimidine-5-carboxamide, N-(4-cyano-3-(2-(dimethylamino) ethoxy)phenyl)-2-(2-cyclopropyl-4-(5-methyl-1,2,4-oxadiazol-3-yl)phenyl)pyrimidine-5-carboxamide, N-(5-bromo-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide, N-(5-bromo-4-(2-(dimethylamino)ethoxy)pyridin-2-yl)-2'-fluoro-4'-(5-methyl-1,2,4-oxadiazol-3-yl)-[1,1'-biphenyl]-4-carboxamide, N-(5-bromo-4-(2-(dimethylamino)ethoxy)pyridin-2-yl)-2'-chloro-4'-(5-methyl-1,2,4-oxadiazol-3-yl)-[1,1'-biphenyl]-4-carboxamide, N-(5-bromo-4-(2-(dimethylamino)ethoxy)pyridin-2-yl)-4'-(5-methyl-1,2,4-oxadiazol-3-yl)-2'-(trifluoromethyl)-[1,1'-biphenyl]-4-carboxamide, N-(5-bromo-4-(2-(dimethylamino)ethoxy)pyridin-2-yl)-2'-methoxy-4'-(5-methyl-1,2,4-oxadiazol-3-yl)-[1,1'-biphenyl]-4-carboxamide, N-(5-bromo-4-(2-(dimethylamino)ethoxy)pyridin-2-yl)-2'-cyano-4'-(5-methyl-1,2,4-oxadiazol-3-yl)-[1,1'-biphenyl]-4-carboxamide, N-(5-bromo-4-(2-(dimethylamino)ethoxy)pyridin-2-yl)-2'-cyclopropyl-4'-(5-methyl-1,2,4-oxadiazol-3-yl)-[1,1'-biphenyl]-4-carboxamide, N-(5-bromo-4-(2-(dimethylamino)ethoxy)pyridin-2-yl)-2'-fluoro-4'-(5-methyl-1,2,4-oxadiazol-3-yl)-[1,1'-biphenyl]-4-carboxamide, 2'-chloro-N-(5-cyano-4-(2-(dimethylamino)ethoxy)pyridin-2-yl)-4'-(5-methyl-1,2,4-oxadiazol-3-yl)-[1,1'-biphenyl]-4-carboxamide, N-(5-cyano-4-(2-(dimethylamino)ethoxy)pyridin-2-yl)-4'-(5-methyl-1,2,4-oxadiazol-3-yl)-2'-(trifluoromethyl)-[1,1'-biphenyl]-4-carboxamide, N-(5-cyano-4-(2-(dimethylamino)ethoxy)pyridin-2-yl)-2'-methoxy-4'-(5-methyl-1,2,4-oxadiazol-3-yl)-[1,1'-biphenyl]-4-carboxamide, 2'-cyano-N-(5-cyano-4-(2-(dimethylamino)ethoxy)pyridin-2-yl)-4'-(5-methyl-1,2,4-oxadiazol-3-yl)-[1,1'-biphenyl]-4-carboxamide, N-(5-bromo-6-(2-(dimethylamino)ethoxy)pyridin-2-yl)-2'-cyclopropyl-4'-(5-methyl-1,2,4-oxadiazol-3-yl)-[1,1'-biphenyl]-4-carboxamide, N-(5-bromo-6-(2-(dimethylamino)ethoxy)pyridin-2-yl)-2'-fluoro-4'-(5-methyl-1,2,4-oxadiazol-3-yl)-[1,1'-biphenyl]-4-carboxamide, N-(5-bromo-6-(2-(dimethylamino)ethoxy)pyridin-2-yl)-2'-chloro-4'-(5-methyl-1,2,4-oxadiazol-3-yl)-[1,1'-biphenyl]-4-carboxamide, N-(5-cyano-6-(2-(dimethylamino)ethoxy)pyridin-2-yl)-2'-cyclopropyl-4'-(5-methyl-1,2,4-oxadiazol-3-yl)-[1,1'-biphenyl]-4-carboxamide, N-(5-cyano-6-(2-(dimethylamino)ethoxy)pyridin-2-yl)-2'-fluoro-4'-(5-methyl-1,2,4-oxadiazol-3-yl)-[1,1'-biphenyl]-4-carboxamide, 2'-chloro-N-(5-cyano-6-(2-(dimethylamino)ethoxy)pyridin-2-yl)-4'-(5-methyl-1,2,4-oxadiazol-3-yl)-[1,1'-biphenyl]-4-carboxamide, N-(5-bromo-4-(2-(dimethylamino)ethoxy)pyrimidin-2-yl)-2'-cyclopropyl-4'-(5-methyl-1,2,4-oxadiazol-3-yl)-[1,1'-biphenyl]-4-carboxamide, N-(5-bromo-4-(2-(dimethylamino)ethoxy)pyrimidin-2-yl)-2'-fluoro-4'-(5-methyl-1,2,4-oxadiazol-3-yl)-[1,1'-biphenyl]-4-carboxamide, N-(5-bromo-4-(2-(dimethylamino)ethoxy)pyrimidin-2-yl)-2'-chloro-4'-(5-methyl-1,2,4-oxadiazol-3-yl)-[1,1'-biphenyl]-4-carboxamide, N-(5-cyano-4-(2-(dimethylamino)ethoxy)pyrimidin-2-yl)-2'-cyclopropyl-4'-(5-methyl-1,2,4-oxadiazol-3-yl)-[1,1'-biphenyl]-4-carboxamide, N-(5-cyano-4-(2-(dimethylamino)ethoxy)pyrimidin-2-yl)-2'-fluoro-4'-(5-methyl-1,2,4-oxadiazol-3-yl)-[1,1'-biphenyl]-4-carboxamide, 2'-chloro-N-(5-cyano-4-(2-(dimethylamino)ethoxy)pyrimidin-2-yl)-4'-(5-methyl-1,2,4-oxadiazol-3-yl)-[1,1'-biphenyl]-4-carboxamide, N-(5-bromo-4-(2-(dimethylamino)ethoxy)pyridin-2-yl)-6-(2-cyclopropyl-4-(5-methyl-1,2,4-oxadiazol-3-yl)phenyl)nicotinamide, N-(5-bromo-4-(2-(dimethylamino)ethoxy)pyridin-2-yl)-6-(2-fluoro-4-(5-methyl-1,2,4-oxadiazol-3-yl)phenyl)nicotinamide, N-(5-bromo-4-(2-(dimethylamino)ethoxy)pyridin-2-yl)-6-(2-chloro-4-(5-methyl-1,2,4-oxadiazol-3-yl)phenyl)nicotinamide, N-(5-bromo-4-(2-(dimethylamino)ethoxy)pyridin-2-yl)-6-(4-(5-methyl-1,2,4-oxadiazol-3-yl)-2-(trifluoromethyl)phenyl)nicotinamide, N-(5-bromo-4-(2-(dimethylamino)ethoxy)pyridin-2-yl)-6-(2-methoxy-4-(5-methyl-1,2,4-oxadiazol-3-yl)phenyl)nicotinamide, N-(5-bromo-4-(2-(dimethylamino)ethoxy)pyridin-2-yl)-6-(2-cyano-4-(5-methyl-1,2,4-oxadiazol-3-yl)phenyl)nicotinamide, N-(5-cyano-4-(2-(dimethylamino)ethoxy)pyridin-2-yl)-6-(2-cyclopropyl-4-(5-methyl-1,2,4-oxadiazol-3-yl)phenyl)nicotinamide, N-(5-cyano-4-(2-(dimethylamino)ethoxy)pyridin-2-yl)-6-(2-fluoro-4-(5-methyl-1,2,4-oxadiazol-3-yl)phenyl)nicotinamide, 6-(2-chloro-4-(5-methyl-1,2,4-oxadiazol-3-yl)phenyl)-N-(5-cyano-4-(2(dimethylamino)ethoxy) pyridin-2-yl)nicotinamide, N-(5-cyano-4-(2-(dimethylamino)ethoxy)pyridin-2-yl)-6-(4-(5-methyl-1,2,4-oxadiazol-3-yl)-2-(trifluoromethyl)phenyl)nicotinamide, N-(5-cyano-4-(2-(dimethylamino)ethoxy)pyridin-2-yl)-6-(2-methoxy-4-(5-methyl-1,2,4-oxadiazol-3-yl)phenyl)nicotinamide, N-(5-cyano-4-(2-(dimethylamino)ethoxy)pyridin-2-yl)-6-(2-cyano-4-(5-methyl-1,2,4-oxadiazol-3-yl)phenyl)nicotinamide, N-(5-bromo-6-(2-(dimethylamino)ethoxy)pyridin-2-yl)-6-(2-cyclopropyl-4-(5-methyl-1,2,4-oxadiazol-3-yl)phenyl)nicotinamide, N-(5-bromo-6-(2-(dimethylamino)ethoxy)pyridin-2-yl)-6-(2-fluoro-4-(5-methyl-1,2,4-oxadiazol-3-yl)phenyl)nicotinamide, N-(5-bromo-6-(2-(dimethylamino)ethoxy)pyridin-2-yl)-6-(2-chloro-4-(5-methyl-1,2,4-oxadiazol-3-yl)phenyl)nicotinamide, N-(5-bromo-6-(2-(dimethylamino)ethoxy)pyridin-2-yl)-6-(2-cyclopropyl-4-(5-methyl-1,2,4-oxadiazol-3-yl)phenyl)nicotinamide, N-(5-bromo-6-(2-(dimethylamino)ethoxy)pyridin-2-yl)-6-(2-fluoro-4-(5-methyl-1,2,4-oxadiazol-3-yl)phenyl)nicotinamide,
6-(2-chloro-4-(5-methyl-1,2,4-oxadiazol-3-yl)phenyl)-N-(5-cyano-6-(2-(dimethylamino)ethoxy)pyridin-2-yl)nicotinamide,
N-(5-bromo-4-(2-(dimethylamino)ethoxy)pyrimidin-2-yl)-6-(2-cyclopropyl-4-(5-methyl-1,2,4-oxadiazol-3-yl)phenyl)nicotinamide,
N-(5-bromo-4-(2-(dimethylamino)ethoxy)pyrimidin-2-yl)-6-(2-fluoro-4-(5-methyl-1,2,4-oxadiazol-3-yl)phenyl)nicotinamide,
N-(5-bromo-4-(2-(dimethylamino)ethoxy)pyrimidin-2-yl)-6-(2-chloro-4-(5-methyl-1,2,4-oxadiazol-3-yl)phenyl)nicotinamide,
N-(5-cyano-4-(2-(dimethylamino)ethoxy)pyrimidin-2-yl)-6-(2-cyclopropyl-4-(5-methyl-1,2,4-oxadiazol-3-yl)phenyl)nicotinamide,
N-(5-cyano-4-(2-(dimethylamino)ethoxy)pyrimidin-2-yl)-6-(2-fluoro-4-(5-methyl-1,2,4-oxadiazol-3-yl)phenyl)nicotinamide,
6-(2-chloro-4-(5-methyl-1,2,4-oxadiazol-3-yl)phenyl)-N-(5-cyano-4-(2-(dimethylamino)ethoxy)pyrimidin-2-yl)nicotinamide,
N-(5-bromo-4-(2-(dimethylamino)ethoxy)pyridin-2-yl)-2-(2-cyclopropyl-4-(5-methyl-1,2,4-oxadiazol-3-yl)phenyl)pyrimidine-5-carboxamide,
N-(5-cyano-4-(2-(dimethylamino)ethoxy)pyridin-2-yl)-2-(2-cyclopropyl-4-(5-methyl-1,2,4-oxadiazol-3-yl)phenyl)pyrimidine-5-carboxamide,
4-bromo-3-(2-(dimethylamino)ethoxy)-N-(6-(2-fluoro-4-(5-methyl-1,2,4-oxadiazol-3-yl)phenyl)pyridin-3-yl)benzamide,
4-bromo-N-(6-(2-cyclopropyl-4-(5-methyl-1,2,4-oxadiazol-3-yl)phenyl)pyridin-3-yl)-3-(2-(dimethylamino)ethoxy)benzamide,
4-bromo-N-(6-(2-chloro-4-(5-methyl-1,2,4-oxadiazol-3-yl) phenyl)pyridin-3-yl)-3-(2-(dimethylamino)ethoxy)benzamide,
4-bromo-3-(2-(dimethylamino)ethoxy)-N-(6-(4-(5-methyl-1,2,4-oxadiazol-3-yl)-2-(trifluoromethyl)phenyl)pyridin-3-yl)benzamide,
4-bromo-3-(2-(dimethylamino)ethoxy)-N-(6-(2-methoxy-4-(5-methyl-1,2,4-oxadiazol-3-yl)phenyl)pyridin-3-yl)benzamide,
4-bromo-N-(6-(2-cyano-4-(5-methyl-1,2,4-oxadiazol-3-yl) phenyl)pyridin-3-yl)-3-(2-(dimethylamino)ethoxy)benzamide,
4-cyano-N-(6-(2-cyclopropyl-4-(5-methyl-1,2,4-oxadiazol-3-yl)phenyl)pyridin-3-yl)-3-(2-(dimethylamino)ethoxy)benzamide,
4-cyano-3-(2-(dimethylamino)ethoxy)-N-(6-(2-fluoro-4-(5-methyl-1,2,4-oxadiazol-3-yl) phenyl)pyridin-3-yl)benzamide,
N-(6-(2-chloro-4-(5-methyl-1,2,4-oxadiazol-3-yl)phenyl)pyridin-3-yl)-4-cyano-3-(2-(dimethylamino)ethoxy)benzamide,
4-cyano-3-(2-(dimethylamino)ethoxy)-N-(6-(4-(5-methyl-1,2,4-oxadiazol-3-yl)-2-(trifluoromethyl)phenyl) pyridin-3-yl)benzamide,
4-cyano-3-(2-(dimethylamino)ethoxy)-N-(6-(2-methoxy-4-(5-methyl-1,2,4-oxadiazol-3-yl)phenyl)pyridin-3-yl)benzamide, and
4-cyano-N-(6-(2-cyano-4-(5-methyl-1,2,4-oxadiazol-3-yl) phenyl)pyridin-3-yl)-3-(2-(dimethylamino)ethoxy)benzamide.

12. A pharmaceutical composition comprising a compound as defined in claim 1 and a pharmaceutically acceptable diluent or carrier.

13. A combination product comprising a compound as defined in claim 1 and a therapeutic agent selected from (a) at least one chemotherapy drug selected from the group consisting of Vincristine, Daunorubicin, Cytarabine, 6-mercaptopurine, Methotrexate, Cyclophosphamide, Prednisone, Dexamethasone, and Nelarabine, and (b) one or more immunotherapeutic agent selected from the group consisting of antibodies anti-PD1, antibodies anti-PDL1 and antibodies anti-CTLA4.

14. The combination product of claim 13, wherein the one or more immunotherapeutic agent is selected from the group consisting of ipilimumab, tremelimumab, nivolumab, pembrolizumab, CT-011, AMP-224, MPDL3280A, MEDI4736, and MDX-1105.

* * * * *